United States Patent [19]
Galumbeck et al.

[11] Patent Number: 4,725,886
[45] Date of Patent: Feb. 16, 1988

[54] COMMUNICATIONS SYSTEM HAVING AN ADDRESSABLE RECEIVER

[75] Inventors: Alan D. Galumbeck, Virginia Beach, Va.; Pryce N. Hales, Centerville, Utah; Duane I. Fetters, Virginia Beach, Va.; Roger S. Simister, Sandy, Utah; Nicholas E. Worth, Norfolk, Va.; Everett W. Otto, Jr., Farmington, Utah

[73] Assignee: The Weather Channel, Inc., Atlanta, Ga.

[21] Appl. No.: 487,244

[22] Filed: Apr. 21, 1983

[51] Int. Cl.$^4$ .......................... H04N 7/087; H04N 7/08
[52] U.S. Cl. ...................................... 358/147; 358/141; 358/142; 358/146; 358/84; 340/825.47
[58] Field of Search ................ 358/141, 142, 146, 147, 358/84, 188, 86; 340/825.07, 825.52, 721, 802, 825.5, 825.51, 825.47; 455/32, 132, 133, 137, 140; 370/85, 86, 94

[56] References Cited
U.S. PATENT DOCUMENTS

| | | | |
|---|---|---|---|
| 4,131,881 | 12/1978 | Robinson | 340/825.47 |
| 4,383,257 | 5/1983 | Gallanza et al. | 340/825.47 |
| 4,394,687 | 7/1983 | Hutt et al. | 358/147 |
| 4,429,385 | 1/1984 | Cichelli et al. | 358/146 |
| 4,430,731 | 2/1984 | Gimple et al. | 358/84 |

OTHER PUBLICATIONS

Signetics Corp., "Philips I. C. Product Line Summary, May 1981," (pp. 1, 15 and 16).
Wegener Communications, Inc., "Asynchronous Data Transmission System-Series 2100 Vidata" (2 pp.).
Zenith Radio Corporation, "Virtext®" (7 pp.).
Document entitled "Teletext Timing Chain Circuit," Aug. 1978 (9 pp.).
Document entitled "Teletext Video Processor," Dec. 1979 (9 pp.).
Document entitled "Teletext Acquisition and Control Circuit," Jun. 1980 (16 pp.).
British Broadcasting Corporation, Independent Broadcasting Authority and British Radio Equipment Manufacturer's Association, "Broadcast Teletext Specification," Sep. 1976, United Kingdom (27 pp.).
Colormax Electronic Corp., "Colormax-Cable Captioning-16,000,000 Subs NEED IT!" (3 pp.).
Group W Satellite Communications, Westinghouse Broadcasting Co., Inc., "7609 Sat-A-Dat Decoder/-Controller" (2 pp.).

*Primary Examiner*—James J. Groody
*Assistant Examiner*—Michael D. Parker
*Attorney, Agent, or Firm*—Kilpatrick & Cody

[57] ABSTRACT

A communications system having programmable, addressable receivers that receive, store, process and send digital and conventional video, audio and control signals for use in, among other things, a cable video network. Receivers in this system may receive conventional audio and composite video and digital data signals from sources such as a satellite transponder and video and audio from local sources. The digital data may be processed into textual video data by character generation techniques, as may be other digital dtat received from a local keyboard, local weather sensors or other digital data communications interfaces. The receivers may be addressed in units or groups for purposes of receiving individually, locally or regionally tailored text information and are typically controlled simultaneously from one control source. The system of the preferred embodiment is particularly well adapted for a weather cable network, since it fulfills the needs of data consumers throughout a large geographic area to have continual, current local and national weather information.

19 Claims, 43 Drawing Figures
Microfiche Appendix Included
(3 Microfiche, 244 Pages)

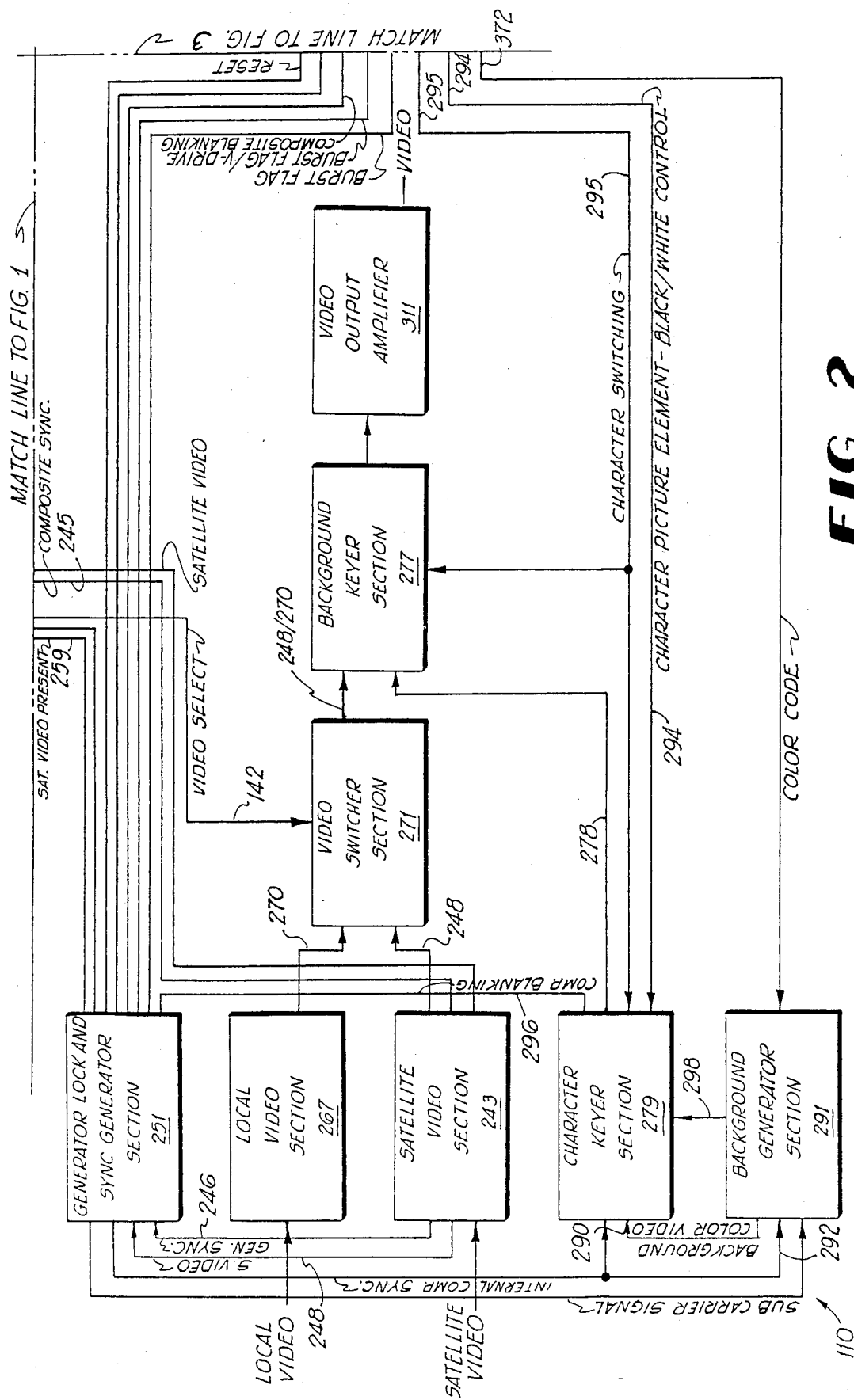

FIG. 18

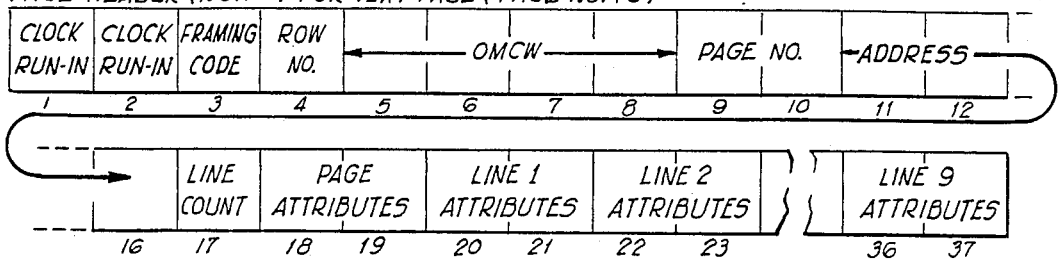
FIG 40
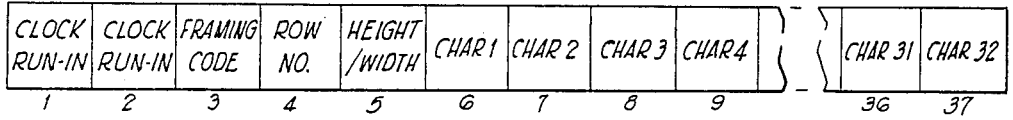
FIG 41
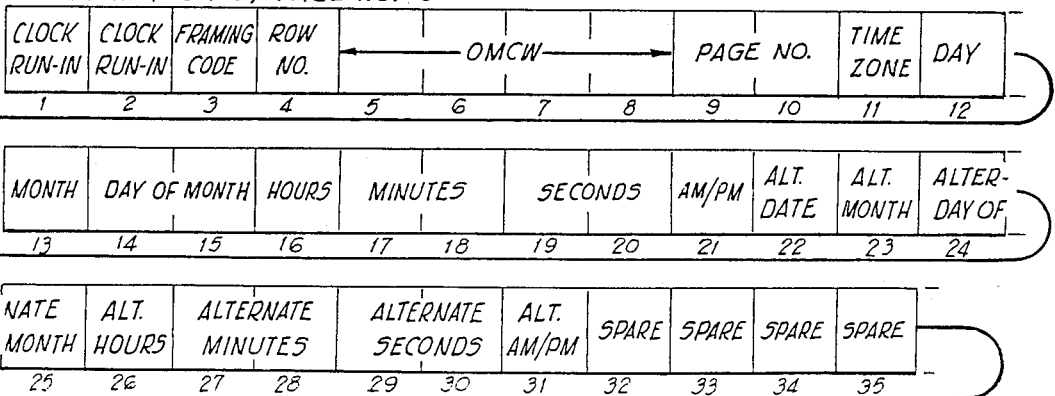
FIG 42
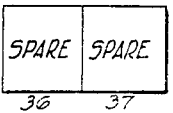

COMMUNICATIONS SYSTEM HAVING AN ADDRESSABLE RECEIVER

Reference is made to the Microfiche Appendix which forms a part of this document and is incorporated herein by reference. The Microfiche Appendix comprises 244 frames located on 3 microfiche.

BACKGROUND OF THE INVENTION

This invention relates to a communications system for transmission of audio and combined video, data and control signals to remote receiving locations for retransmission under the command of the control signals.

Transmission of audio and video signals to local receiving stations for immediate use, rebroadcast or recordation for later broadcast is well established practice, particularly in connection with distribution of television programming by various television networks. Utilization of data to generate characters which are displayed on a video screen over a single color background or another video signal background is also established practice.

However, expansion in the availability of data of both general and specific interest to various groups of data consumers and the need for a system capable of efficiently transmitting such data to specific remote locations and to control the further broadcast, display or transmission of such data at those locations have resulted in the need for audio, video and data transmission systems with associated control capabilities not previously available.

SUMMARY OF THE INVENTION

The present invention comprises a communications system utilizing a novel hardware and software configuration simultaneously to transmit conventional video and audio program material and data and control commands within the constraints of conventional television signal specifications (such as National Television System Committee (NTSC) standards) to remote signal processors or receivers within the system which receive the entire transmission and process it in a predetermined manner such that the data and conventional video and audio signals may be utilized at the remote receivers, under network control, particularly for broadcast on a local cable television system.

The system of the preferred embodiment of the present invention transmits, typically utilizing a satellite transponder, a first conventional video and audio television signal together with a digital data stream transmitted in the vertical blanking interval of the first video signal. The data stream in the first video signal comprises digital control and address data and digital text data. A local receiver according to the preferred embodiment may process and retransmit the first video (and audio) signal and, utilizing a character generator as discussed below, may store the digital text data and process it into a second ("satellite") text video signal containing text for transmission. In addition, the receiver may receive and retransmit a third video (and audio) signal from a local source such as a video recorder, so that local commercials or other material may be displayed, and it provides a synchronization signal which may be input to the local source to synchronize signals from it with other video signals processed or generated by the receiver. So that local cable operators may also be able to compose and display textual data, the receiver may also receive digital data from a keyboard. This data, as well as data from local weather sensors, is processed by the receiver into a fourth video signal containing text. On command from network control, the receiver may select for output the first satellite video (and audio) signal, the third local video (and audio) signal, or a solid color background video signal, and may combine with any of these signals the second (satellite) and/or fourth local textual video signals.

The digital control and address data in the data stream of the first video signal control the operating states, or modes, of the receiver of the preferred embodiment and determine the video, audio and other outputs of a particular receiver. Control data sent in the "Output Mode Control Word" ("OMCW") of the data stream determine, among other things, which video signals or combinations thereof will be presented and which audio signals will be presented, by controlling whether satellite video, local video, or character generator input will be processed and sent by the receiver.

The address words of the data stream and the control words following them allow each receiver or a group of receivers to accept, store and process particular text data and to display this text in a particular format. Thus, different digital text data may be sent to different receivers and groups of receivers for simultaneous presentation in response to the OMCW control data which controls timing of such presentation.

The referred embodiment of the present invention herein described may be utilized for a network of local affiliates receiving transmissions from a single source dedicated to television programming related to weather information and advertising. Accordingly, the hierarchy of addressability utilized in the described embodiment contemplates geographic organization of local receivers consistent with weather patterns, and the data sensors input to the local receivers may be weather sensors. However, as will be apparent to those skilled in the art, the invention may also be adapted to use for transmission of entirely different programming and data for other types of commercial broadcasting and for noncommercial communications, including teletext only communications, and aspects of the invention may be adapted to other uses such as various remote control networks.

BRIEF DESCRIPTION OF THE DRAWINGS

FIGS. 4-39 are detailed schematic diagrams of the receiver shown in FIGS. 1-3, not including the power supply.

FIG. 40 is a block diagram of the data framing scheme for a page header for a text page of data for transmission in accordance with the preferred embodiment of the present invention.

FIG. 41 is a diagram similar to FIG. 40 for any text page row 1-9.

FIG. 42 is a diagram similar to FIG. 40 for a date/time row.

DETAILED DESCRIPTION OF THE DRAWINGS

A. Hardware

Figure 1:
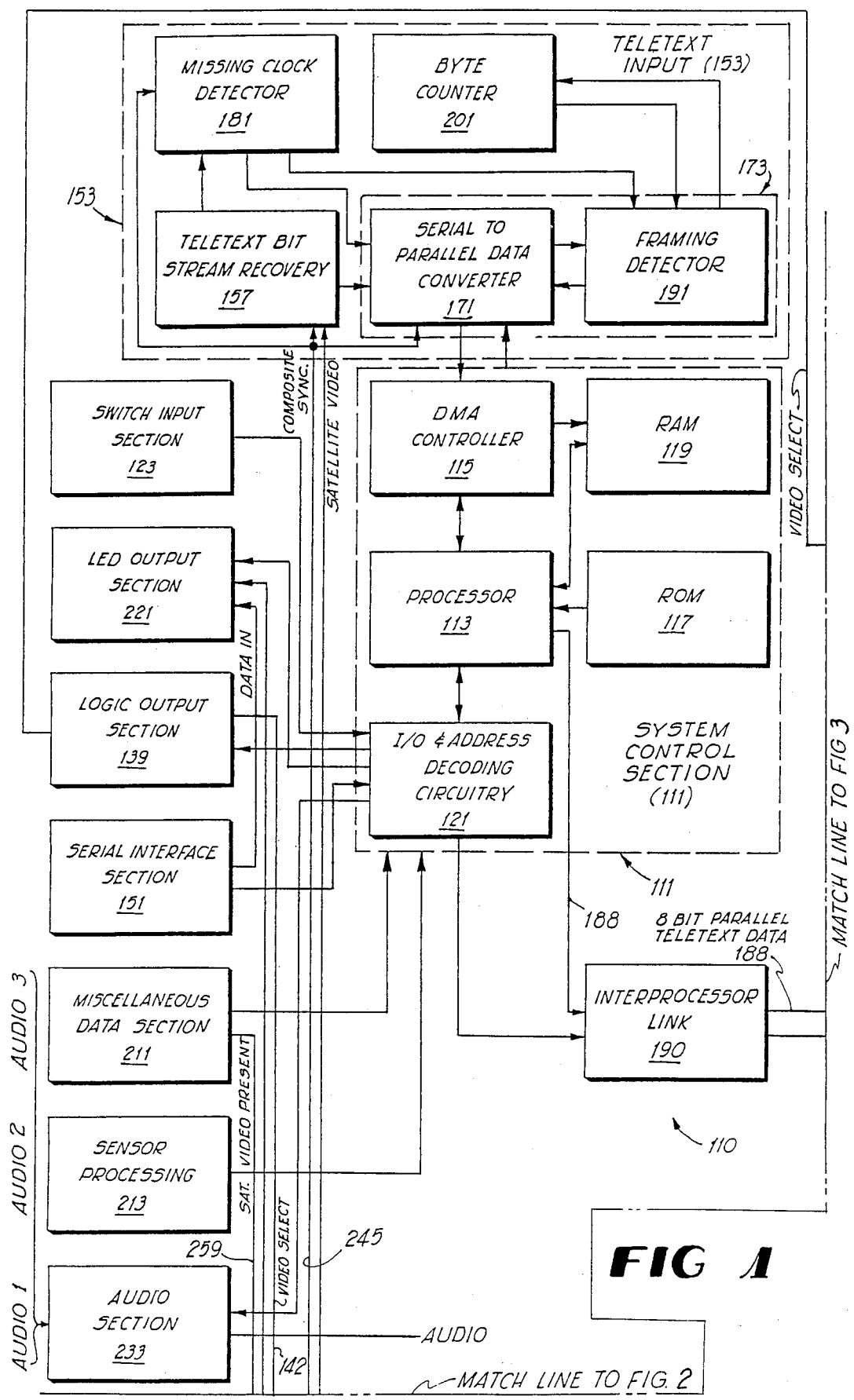
FIGS. 1-3 and 3A are a block diagram of the receiver of the present invention.
Figure 3:
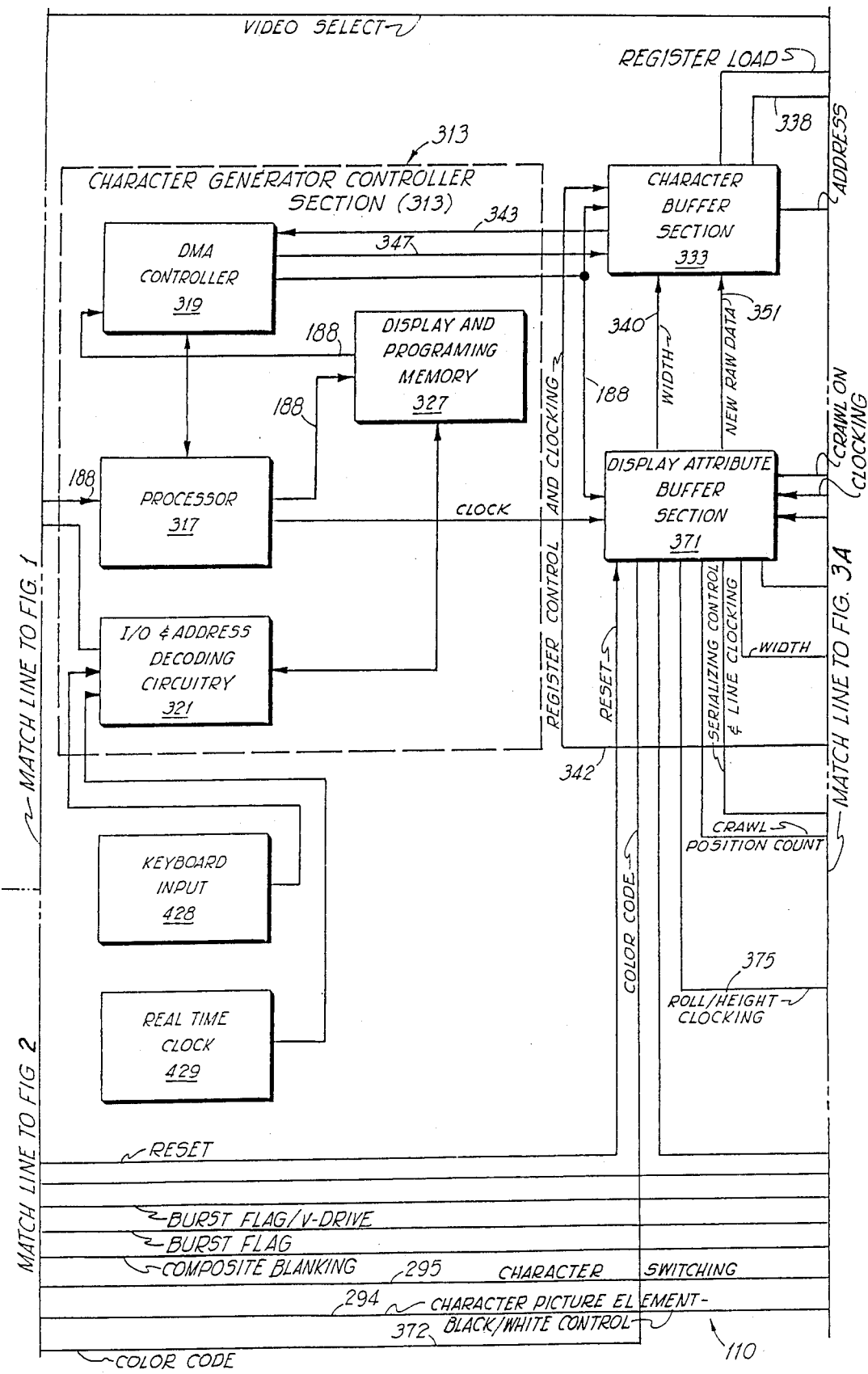
Figure 3A:
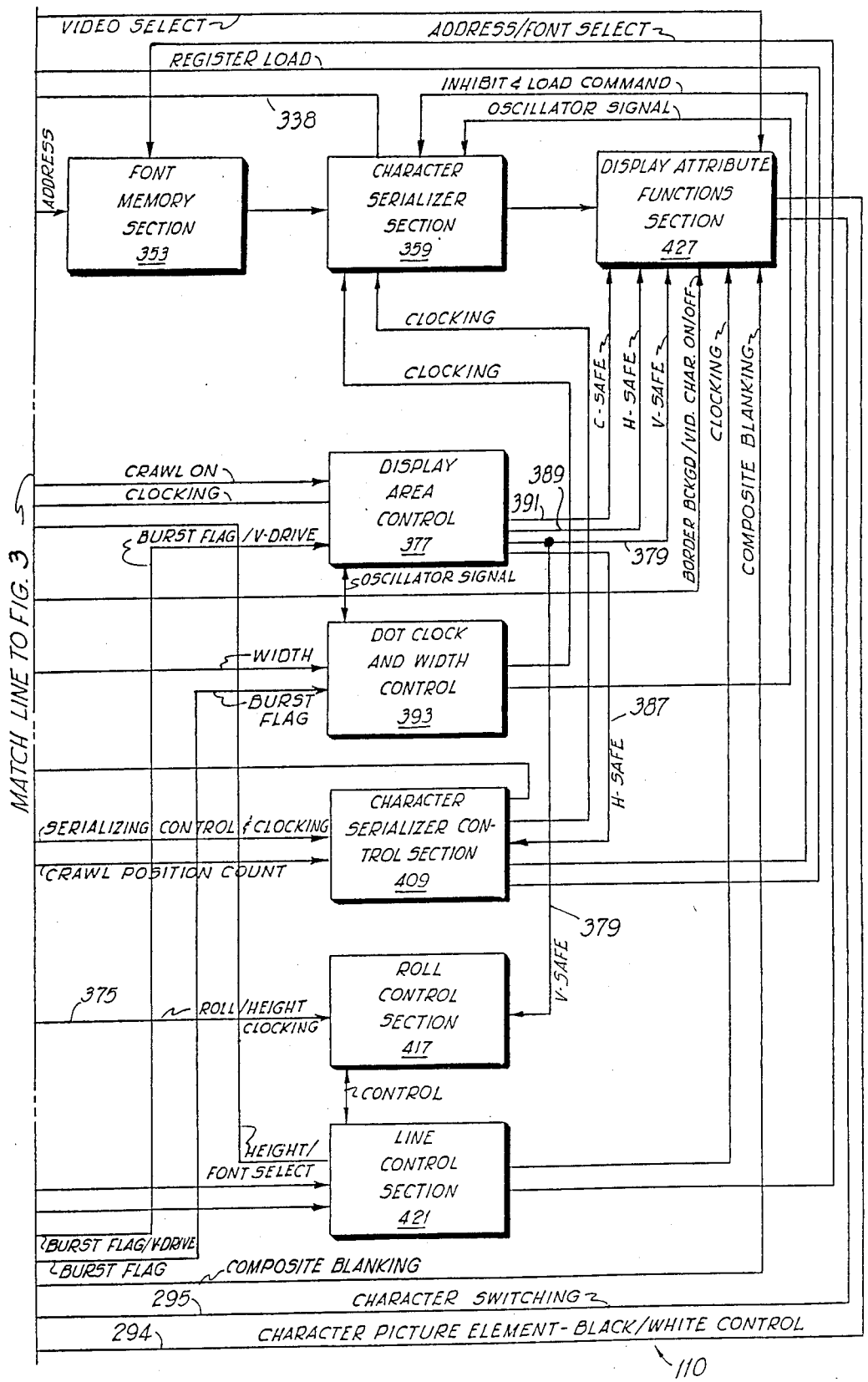
Figure 2A:
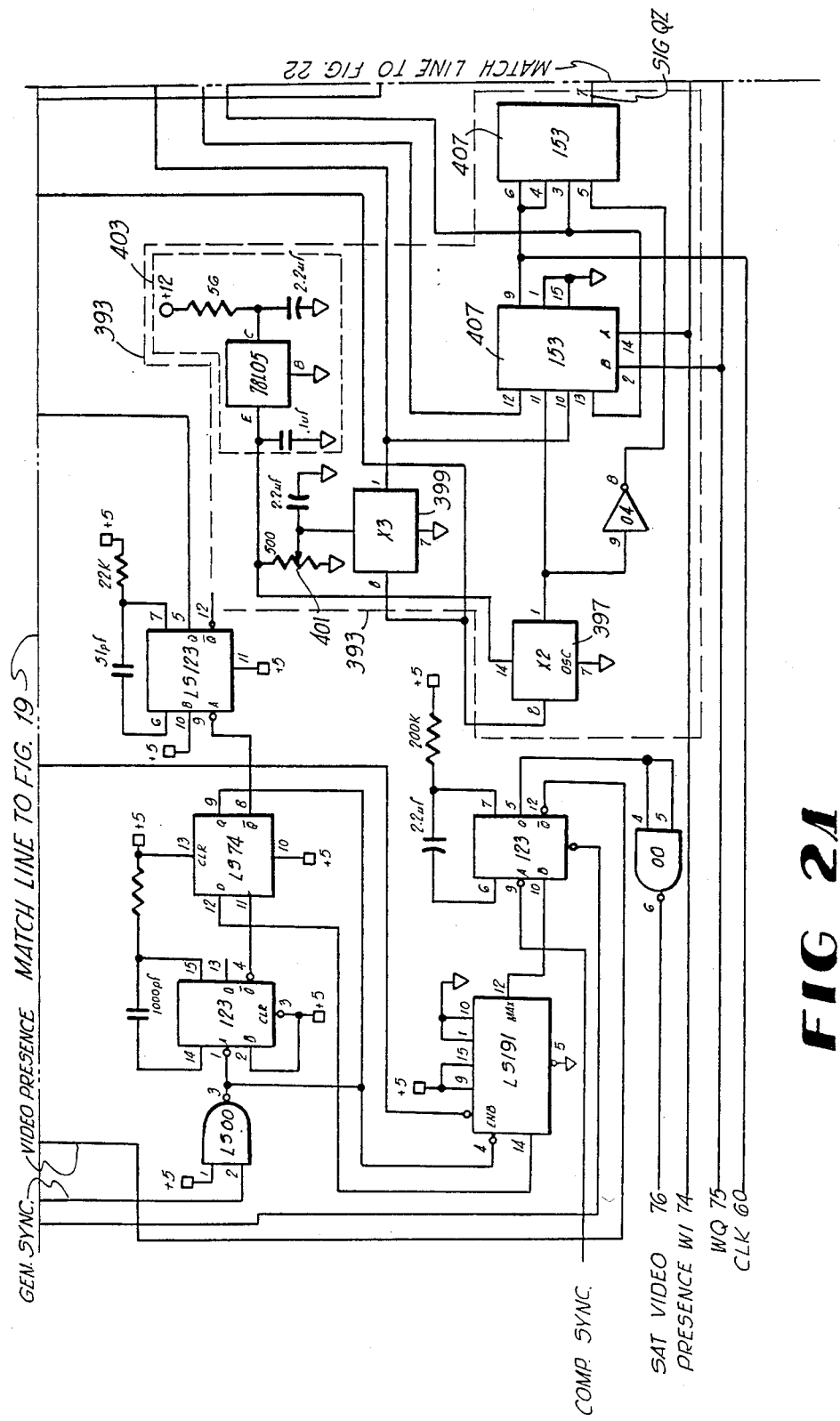

FIGS. 1 through 3 are a block diagram of the preferred embodiment of the receiver 110 of the present invention. This diagram can be divided for purposes of description into three groups of sections: the teletext group, the control group, and the video group. FIGS. 4–39 are schematic diagrams of portions of receiver 110, and those figures will also be referred to in the following description of the sections and signal flow among these sections of receiver 110 as presented in FIGS. 1–3. To facilitate understanding of the following description, receiver 110 sections shown on FIGS. 1–3 are generally set forth with initial letters capitalized in the following description, while discrete components and circuitry shown on FIGS. 4–39 are generally referred to below in lower case letters.

1. Teletext Group

In the teletext group (FIG. 1) of receiver 110 of the depicted embodiment, as shown in FIGS. 1, 2 and 3, System Control Section 111 controls or directs all functions of receiver 110. System Control Section 111 comprises, as shown in FIGS. 1 and 4–6, an Intel 8085A processor 113, an Intel 8257 direct memory access (DMA) controller 115, an 8K by eight bit read only memory (ROM) 117, a 2K by eight bit random access memory (RAM) 119, and Input/Output and Memory-Address Decoding Circuitry 121. A master clock signal is generated by 6 MHz Crystal Oscillator 118 (FIG. 30) and provided to the clock input pin of processor 113. This signal also passes through divider circuit 116 (FIG. 12) and is provided to Serial Interface Section 151 and Sensor Processing Section 213, discussed below.

The elements of System Control Section 111 are interconnected by a common bus 120 as described in the Intel 8085A microprocessor manufacturer's application notes, which are incorporated herein by reference. ROM 117 contains the machine language embodiment of the teletext or system control program, a listing of the source code for which is set forth below. In the present embodiment, these elements utilize the satellite signal to provide control signals to or receive and process control and video signals from the other portions of the teletext group (FIG. 1), the video group (FIG. 2) and the character generator group (FIG. 3) as described below.

Figure 7:
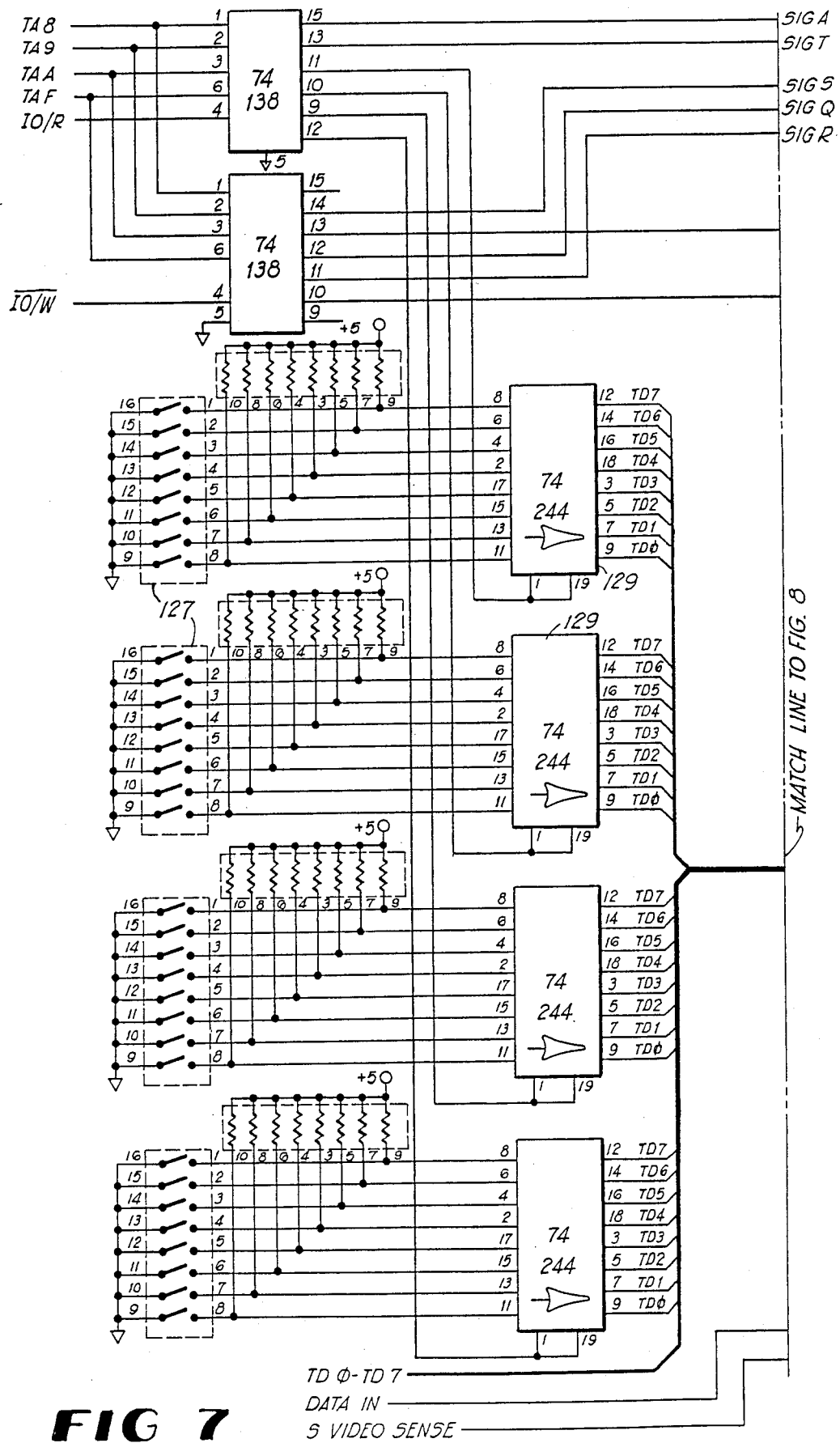

Switch Input Section 123 comprises thirty-two switches 127 (FIG. 7), each of which provides a "0" or a "1" input into System Control Section 111. Twenty-one of these switches are for coding the proper address into receiver 110; three are for the time zone in which receiver 110 is to be used; three are for time offset hours and each of the remaining switches is for auxiliary time zone, time offset direction, remote weather sensor, radar enable, and test mode, respectively. In other embodiments, some or all of the switches may be used for other purposes. In groups of eight, as shown in FIG. 7, the switches 127 are connected to System Control Section 111 through buffers 129, which are addressed by processor 113 under software control.

Figure 8:
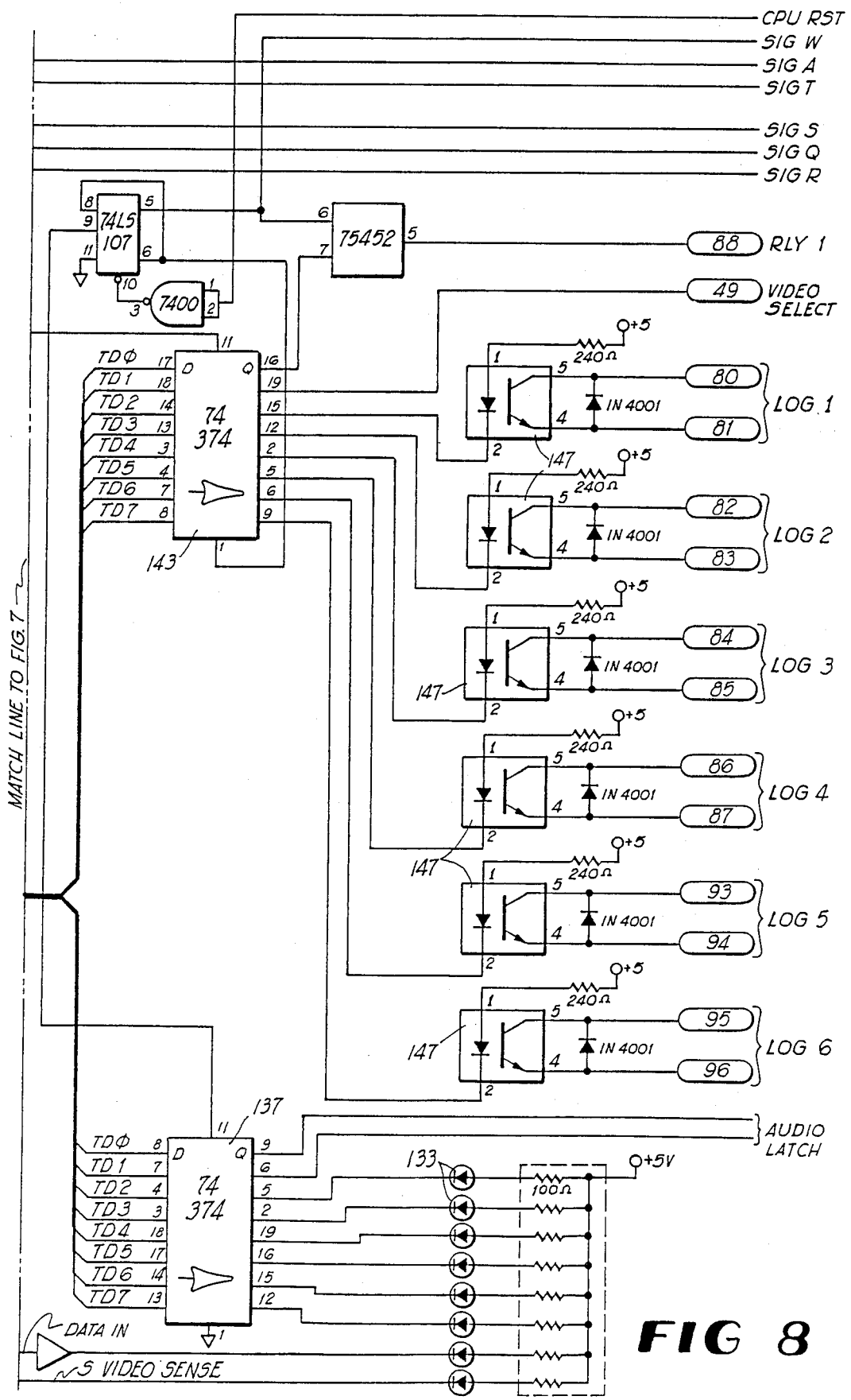

System Control Section 111, acting through processor 113, controls LED Display Output Section 221, which comprises eight LED indicators 133 shown on FIG. 8 in the present embodiment. Six of the indicators 133 are activated by tri-state latches 137, which are controlled by processor 113. One indicator 133 is driven by the data-in signal 152 from Serial Interface Section 151, described below and shown in FIG. 4. The remaining indicator 133 is driven by the satellite video sense signal 252 from Gen Lock and Sync Generator Section 251, described below and shown in FIGS. 19–21. In the present embodiment, these indicators 133 indicate the following: addressing of the receiver, keyboard data being received, local television input selected for output, tape activation signal on, auxiliary audio on, teletext being received, local video being received and satellite video being received.

System Control Section 111, acting through processor 113, also controls Logic Output Section 139. Logic Output Section 139 comprises, as shown on FIG. 8, a tristate latch 143 controlled by processor 113, and the terminations of latch 143 outputs. Six of the eight latch 143 outputs are opto-isolated solid state switches 147, which ar terminated on the exterior of receiver 110 and which are utilized for control of external devices by the receiver 110 as follows: local commercial pre-roll for cueing local video programming, local commercial on-air, auxiliary audio on-air, weather warning for the weather warning mode of receiver 110 described below, radar for display of local radar information, and a spare. The seventh output 141 is an electromechanical relay 149 which may be terminated on the exterior of the receiver 110, for use in connection with the weather warning mode of receiver 110 to activate a cable station voice-over all channel capability. The eighth output of latch 143 is a video select signal which serves as an input to the Video Switcher Section 271 of the video group (FIG. 2) and the character generator group (FIG. 3).

Figure 4:
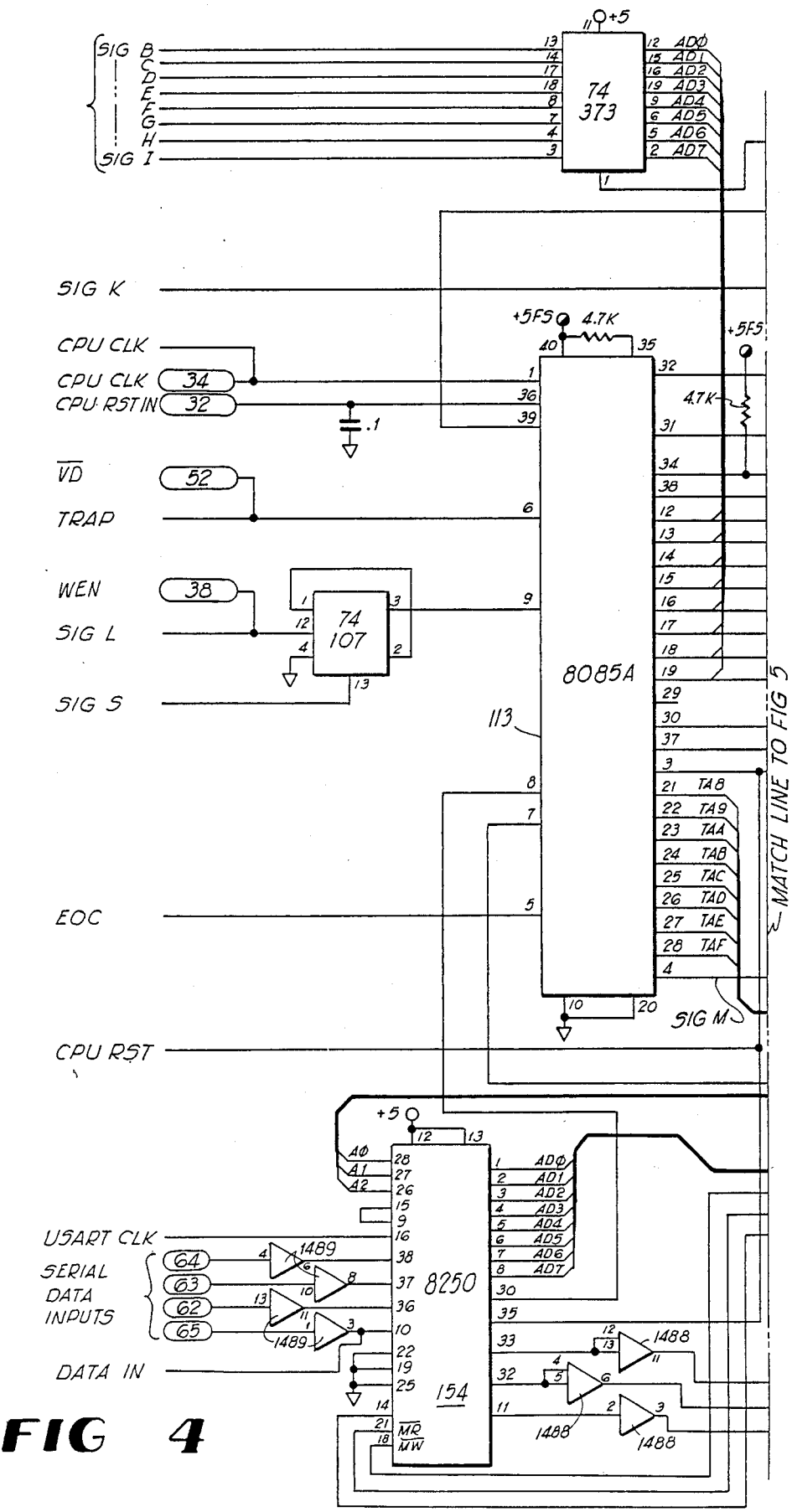
Figure 5:
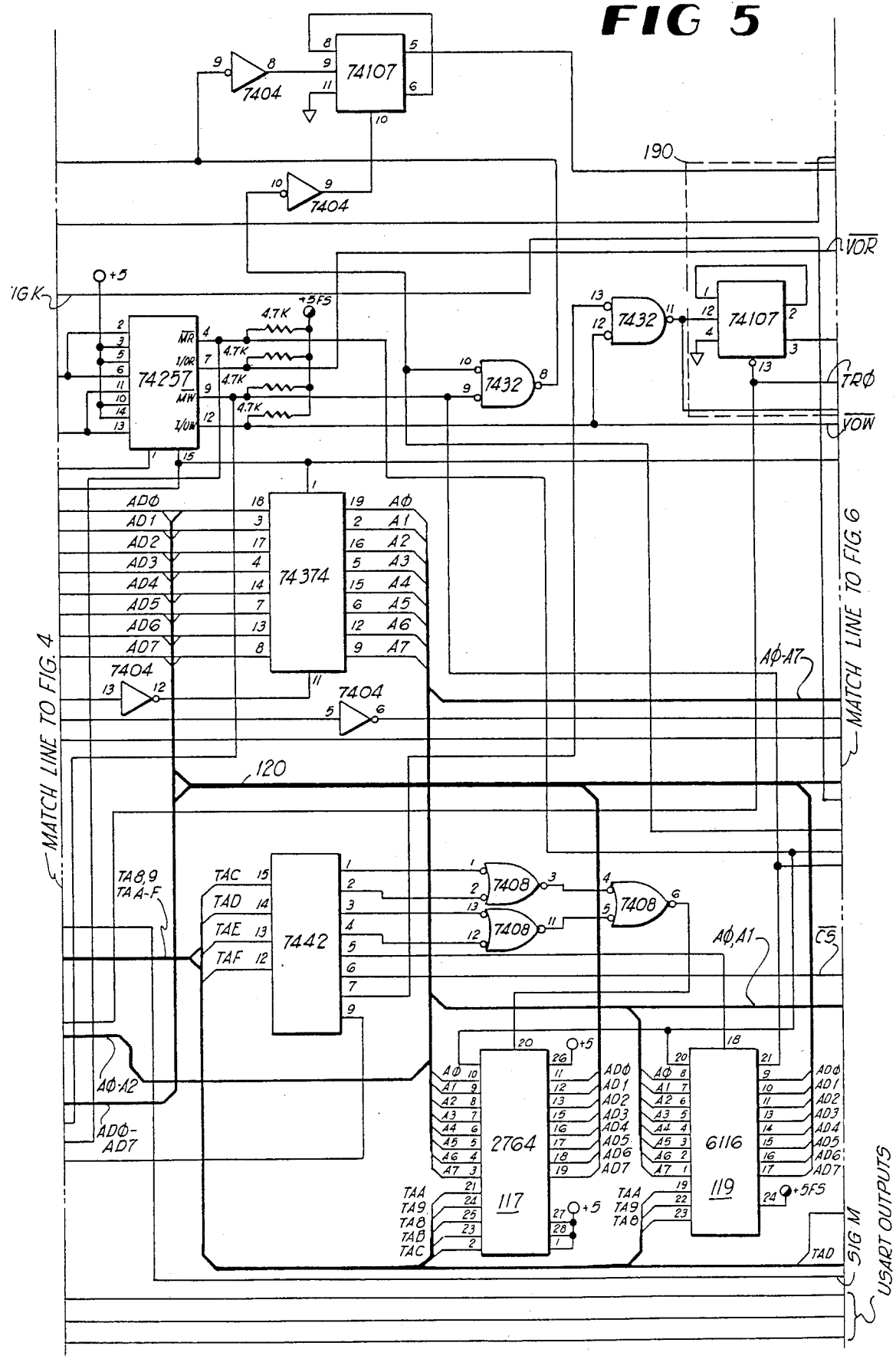
Figure 6:
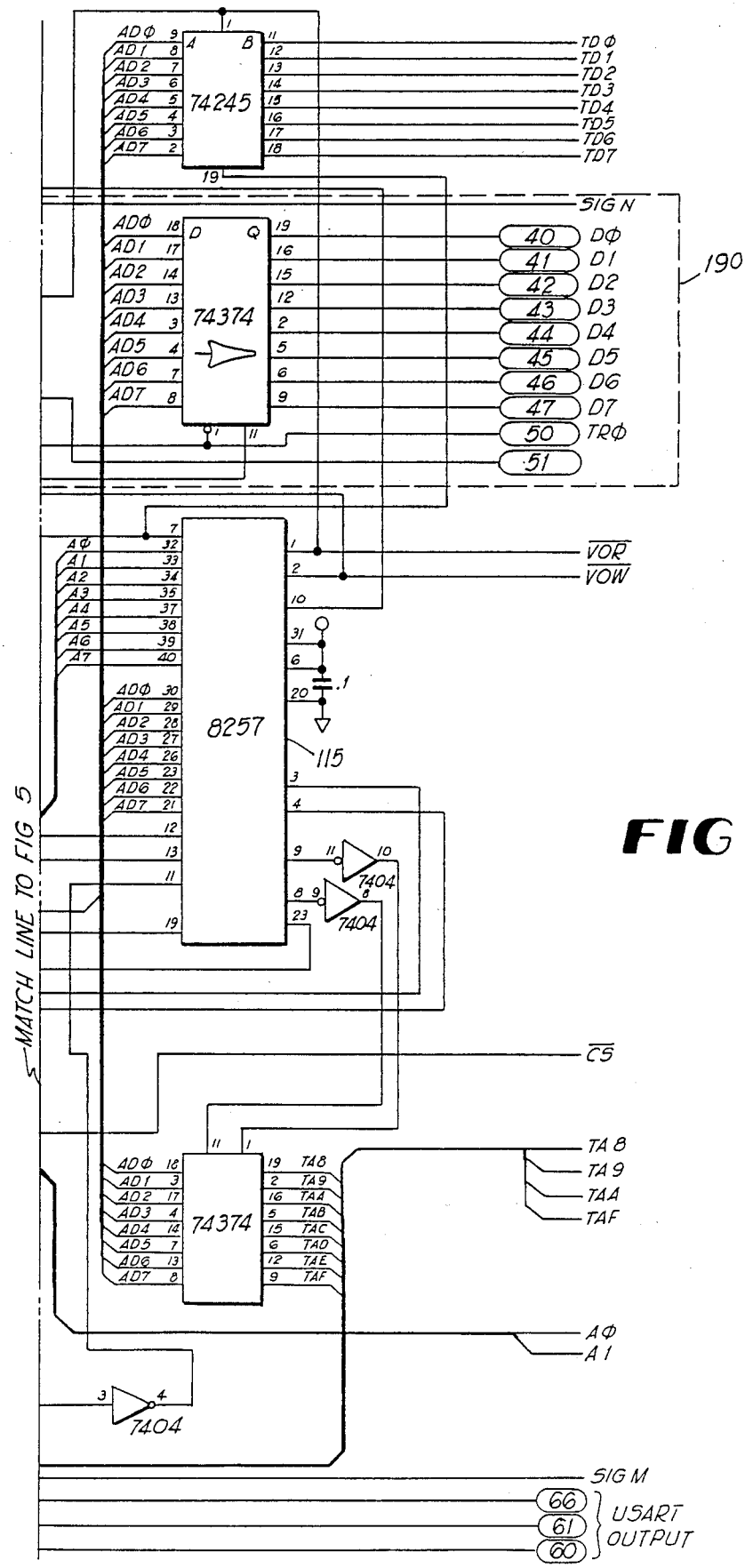

Access by System Control Section 111 to external bi-directional EIA RS-232 compatible serial data communications is made possible by Serial Interface Section 151. In Section 151, as depicted in FIGS. 2 and 4, an 8250 universal synchronous asynchronous receiver transmitter (USART) 154 interfaces with the common bus 120 of System Control Section 111. This capability may be used for, inter alia, reception by receiver 110 of line signals from remotely located weather sensors.

Figure 9:
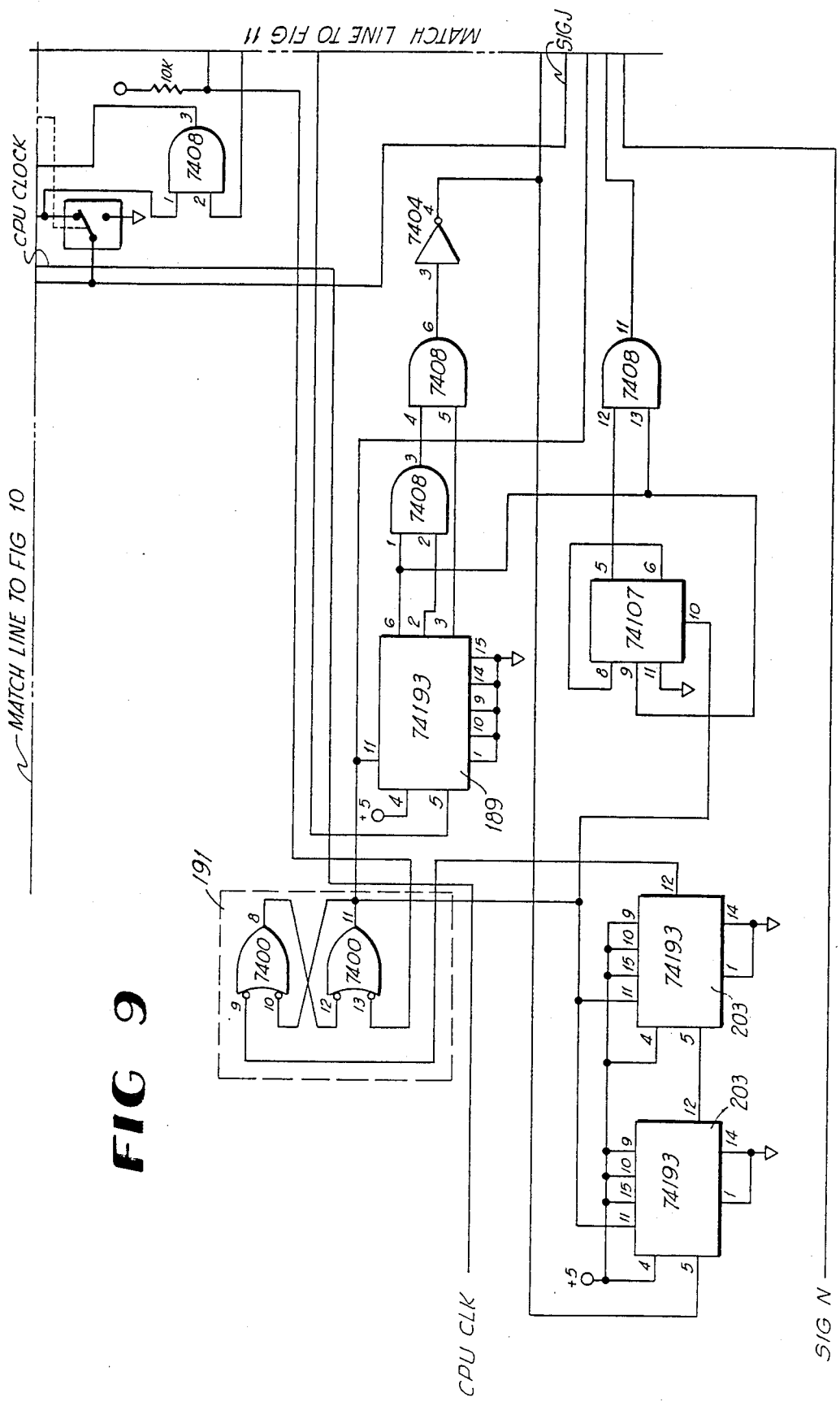
Figure 10:
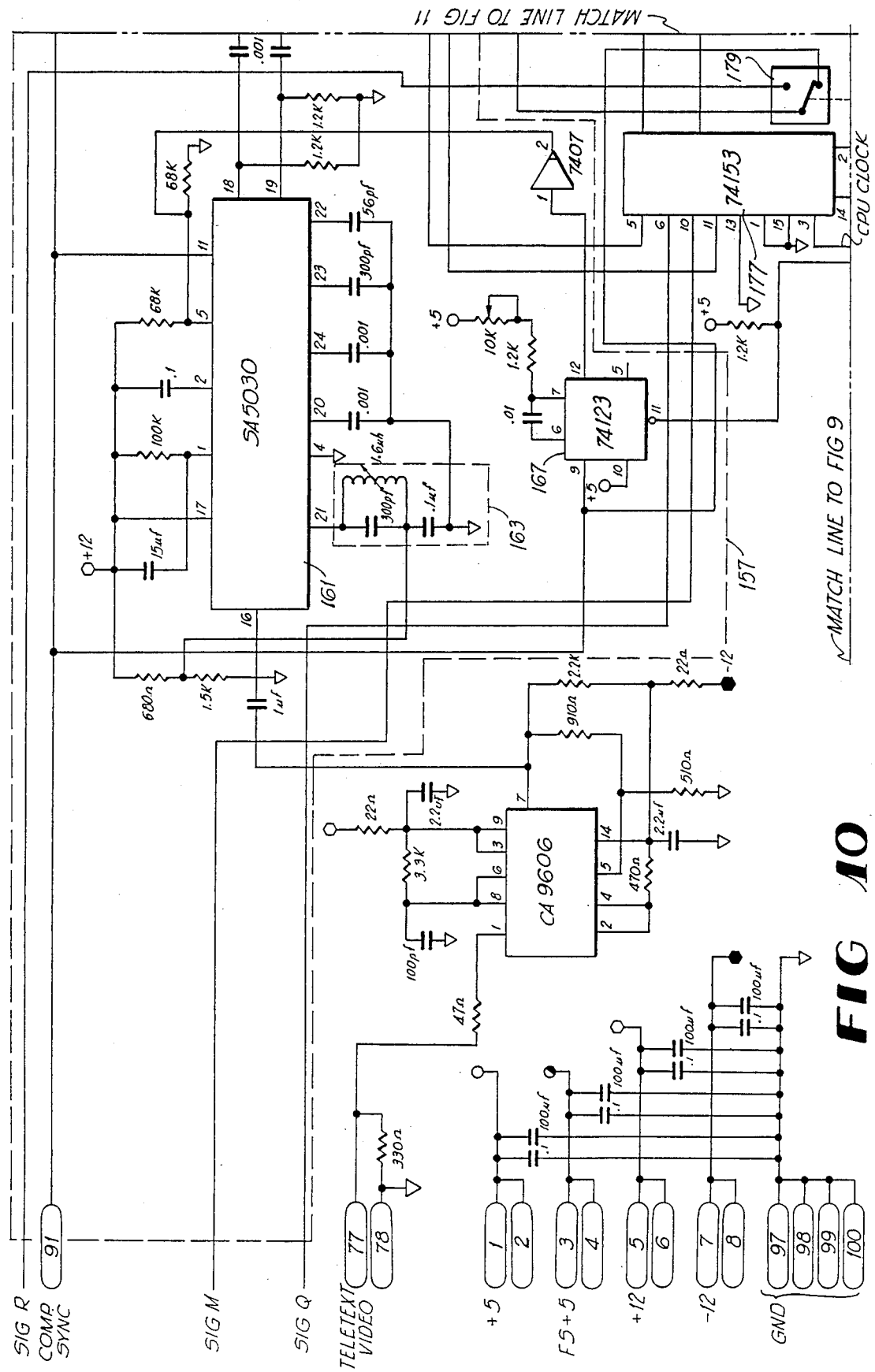
Figure 11:
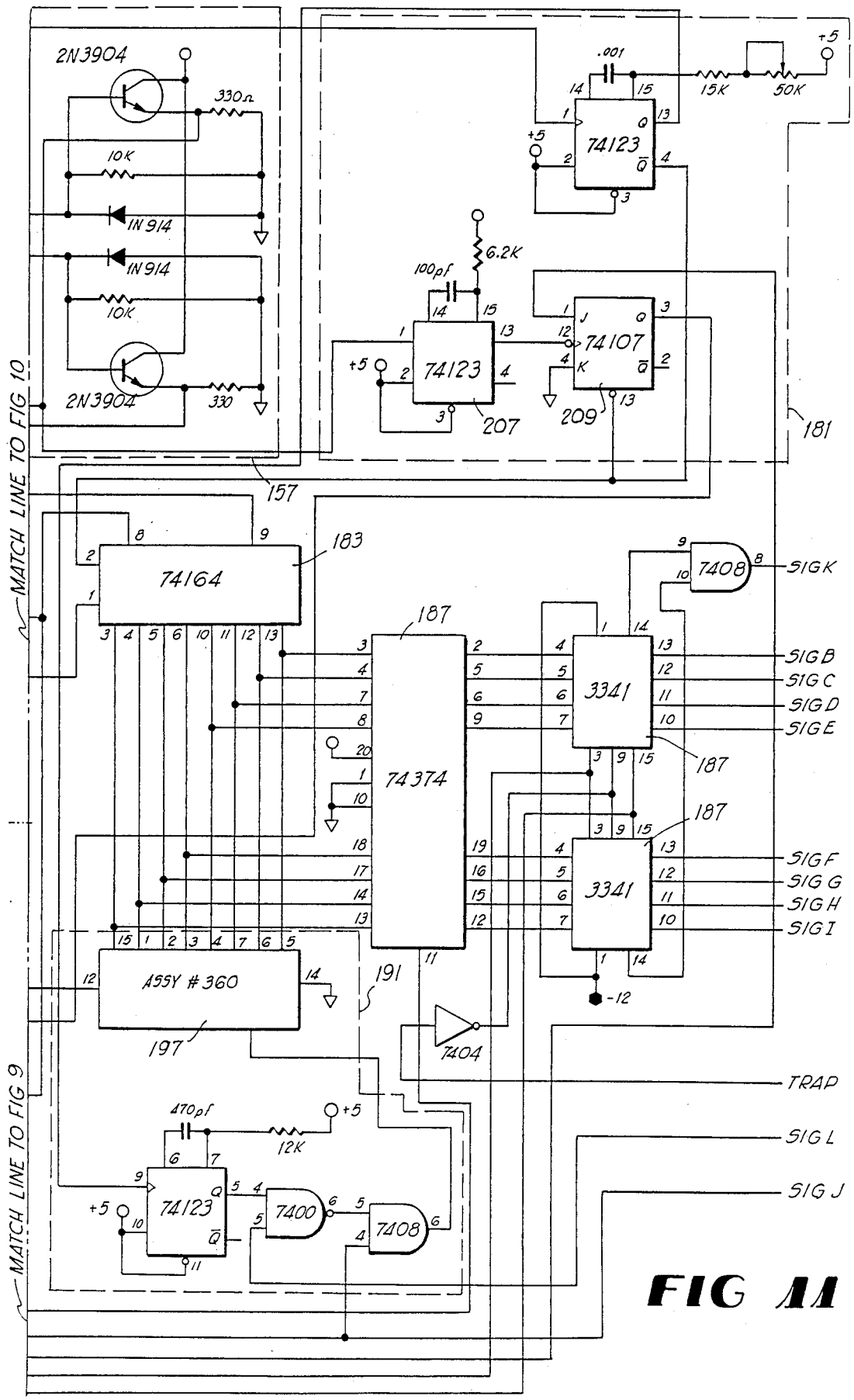

DMA controller 115 of System Control Section 111 is provided access to satellite teletext information by Teletext Input Section 153, shown in FIGS. 1, 4 and 9–11. In section 153, teletext bit stream recovery circuitry 157, depicted in FIGS. 10 and 11, strips the teletext data from the satellite video signal input from Satellite Video Section 243 further described below. In the present embodiment, the satellite video signal containing 5.7272 MHz teletext data is amplified and fed to the composite video pin of a Signetics SAA 5030 teletext video processor 161. Video processor 161 samples this video and causes a high Q oscillator tank circuit 163 to become phase-locked to the teletext data. A separate one-shot 167, triggered by the leading edge of each video sync pulse in the satellite video signal, applies a signal to the Sandcastle input of the teletext video processor 161 for 11 microseconds. The components connected to the remaining pins of the teletext video processor 161 are in accordance with the manufacturer's application notes, which are incorporated herein by reference, and in the present embodiment such components are as depicted in FIGS. 10 and 11. The data and clock outputs of the teletext video processor 161 are fed to the Serial to Parallel Conversion Circuitry 171 in Synchronous Serial to Parallel Data Converter 173 (all circuitry on FIGS. 9–11 not including circuit 157).

In Serial to Parallel Conversion Circuitry 171, a multiplexer 177 (FIG. 10) selects one of three serial clock and data input sources. Typically, Teletext Bit Stream Recovery Circuitry 157 is selected; however, System Control Section 111 is selected when test mode switch 179 (FIG. 10) is in the test position, and in the event that one or more clock pulses are lost in the teletext data from Teletext Bit Stream Recovery Circuitry 157, a signal from Missing Clock Detector 181 causes the data input to be in the form of all zeroes and the clock input to be provided by System Control Section 111. The selected clock input is utilized to clock the selected data into an eight bit serial-in to parallel-out shift register 183, shown in FIG. 11. The parallel output of the serial-in to parallel-out shift register 183 is fed to Framing Detector 191 shown in FIGS. 9 and 11, and is also loaded into parallel data buffer 187 pursuant to a load signal from binary counter 189.

Binary counter 189 (FIG. 9) provides the load signal, upon receipt of an enable signal from Framing Detector 191, once every eight-bit times. The eight bit parallel teletext data from the serial-in to parallel-out shift register 183 thus passes through parallel data buffer 187 and is available for access on the common bus 120 by DMA controller 115 of System Control Section 111 on a first-in first-out basis, for storing in RAM 119 of System Control Section 111.

The eight bit parallel teletext data thus stored is accessed by processor 113 and fed under program control to Interprocessor Link Section 190, which provides an eight bit data path and a path for handshaking signals to Character Generator Control Section 313 discussed below.

Framing Detector 191 mentioned above operates on the framing byte of each teletext data line for synchronization purposes. A framing detector one-shot 193 enables this detector to use the parallel data from the Serial to Parallel Data Conversion Circuitry 171 to address framing ROM 197, shown in FIG. 11. Framing ROM 197 is encoded so that each location that corresponds to a valid framing character in a framing byte contains a zero and all other locations contain a one. The value fetched from the framing ROM 197 sets latch 199 when a framing character is detected. Latch 199 provides the enable signal mentioned above to Serial to Parallel Data Conversion Circuitry 171 and to Byte Counter 201. In this fashion, Serial to Parallel Data Conversion Circuitry 171 is synchronized with the boundary of the first byte of data in a teletext data line.

Byte Counter 201, shown in FIGS. 1 and 9, contains binary counters 203 that utilize the enable signal from latch 199 in Framing Detector 191 to ensure that exactly 34 bytes of data enter the parallel data buffer 187 of Serial to Parallel Conversion Circuitry 171 for each line of teletext. The output of Byte Counter 201 is provided to the reset input of latch 199 in Framing Detecter 191, which enables Serial to Parallel Conversion Circuitry 171 as described above.

Missing Clock Detector 181 mentioned above and shown in FIGS. 1 and 11 causes data input to Serial to Parallel Conversion Circuitry 171 to be in the form of all zeroes in the event that a clock pulse from Teletext Bit Stream Recovery Circuitry 157 is not sensed within 260 nanoseconds after the previous pulse. Missing Clock Detector 181 contains a one-shot 207 which is triggered by each clock pulse from Teletext Bit Stream Recovery Circuitry 157. If a clock pulse does not arrive within 260 nanoseconds after the previous pulse, the output of the one-shot 207 is terminated, thus setting missing clock latch 209, the output of which is routed to Serial to Parallel Conversion Circuitry 171.

Two other sections of the teletext group of receiver 110, in addition to Switch Input Section 123, Serial Interface Section 151 and Teletext Input Section 153, provide System Control Section 111 access to information. The first of these is Miscellaneous Data Section 211 (shown on FIGS. 1 and 14) which makes available on common bus 120 to System Control Section 111: (a) the status of the satellite video presence detector in the Gen Lock and Sync Generator Section 251, (b) the local video presence detector in Local Video Section 267, and (c) the position of the test mode switch in System Control Section 111. The second is Sensor Processing Section 213 (shown on FIGS. 1, 13 and 14) which processes inputs (shown on FIG. 13) from five externally connected weather sensor devices and makes their inputs available to System Control Section 111 on common bus 120. The weather input circuitry, shown on FIGS. 13 and 14, includes five circuits. Rain gauge processing circuitry processes signals from a rain gauge by conditioning and counting contact closures in the gauge. Wind velocity processing circuitry detects and counts the zero crossing of an alternating current input from a wind speed sensor. The three remaining processing circuits share an analog to digital converter 221 which is fed by three independent normalizing circuits. The first, a wind direction normalizing circuit, provides a signal to the analog to digital converter 221 that is proportional to the resistance of a variable resistance sensor element. The second, a humidity normalizing circuit, provides a voltage in the range of $-200$ to $+200$ millivolts that is proportional to the sensor input voltage to the analog to digital converter 221. The third, a temperature normalizing circuit, supplies a source voltage to a current regulating sensor and supplies a $-200$ to $+300$ microampere signal to the analog to digital converter 221 that is proportional to the current flow through the sensor. Sensor Processing Section 213 also includes precision voltage references 231 for the analog to digital converter 221 and for the three normalizing circuits.

Figure 12:
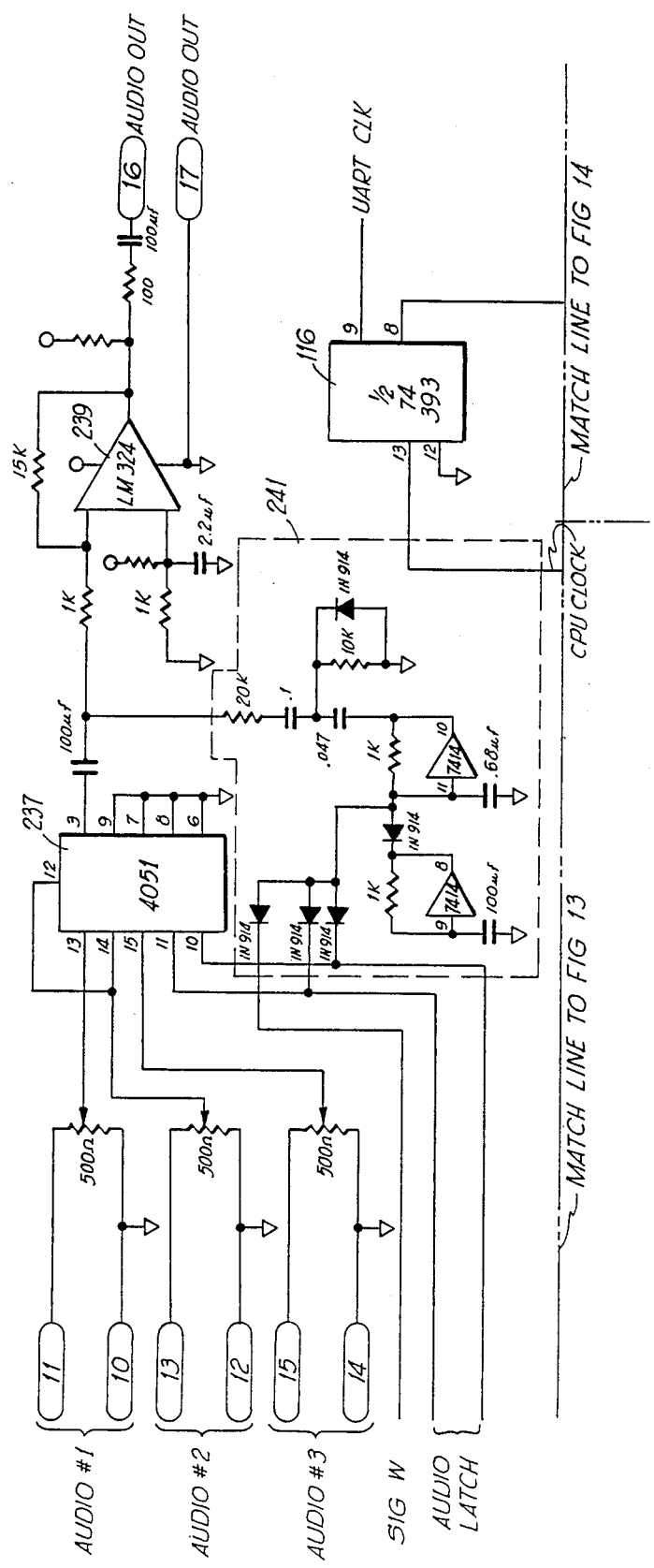
Figure 13:
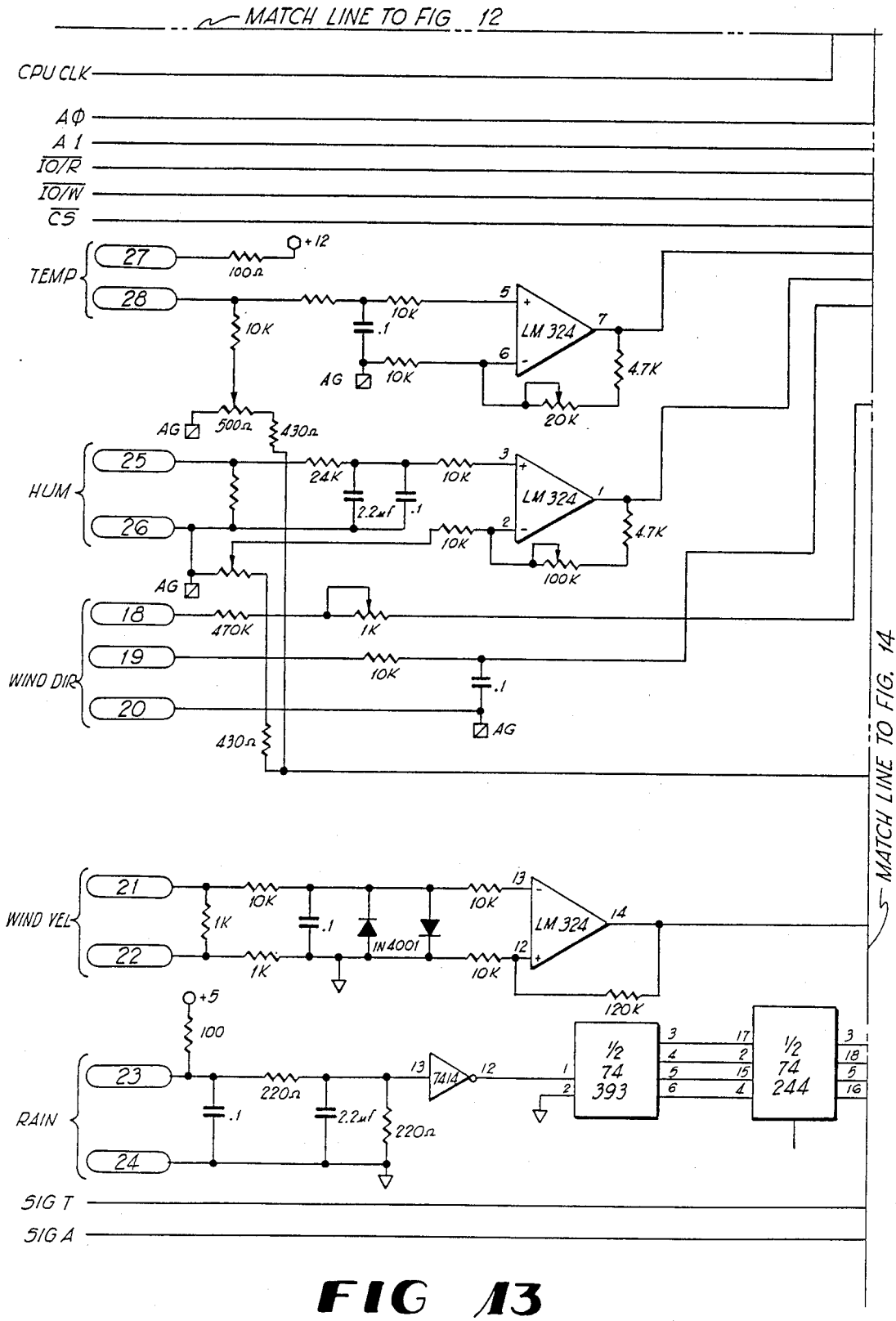
Figure 14:
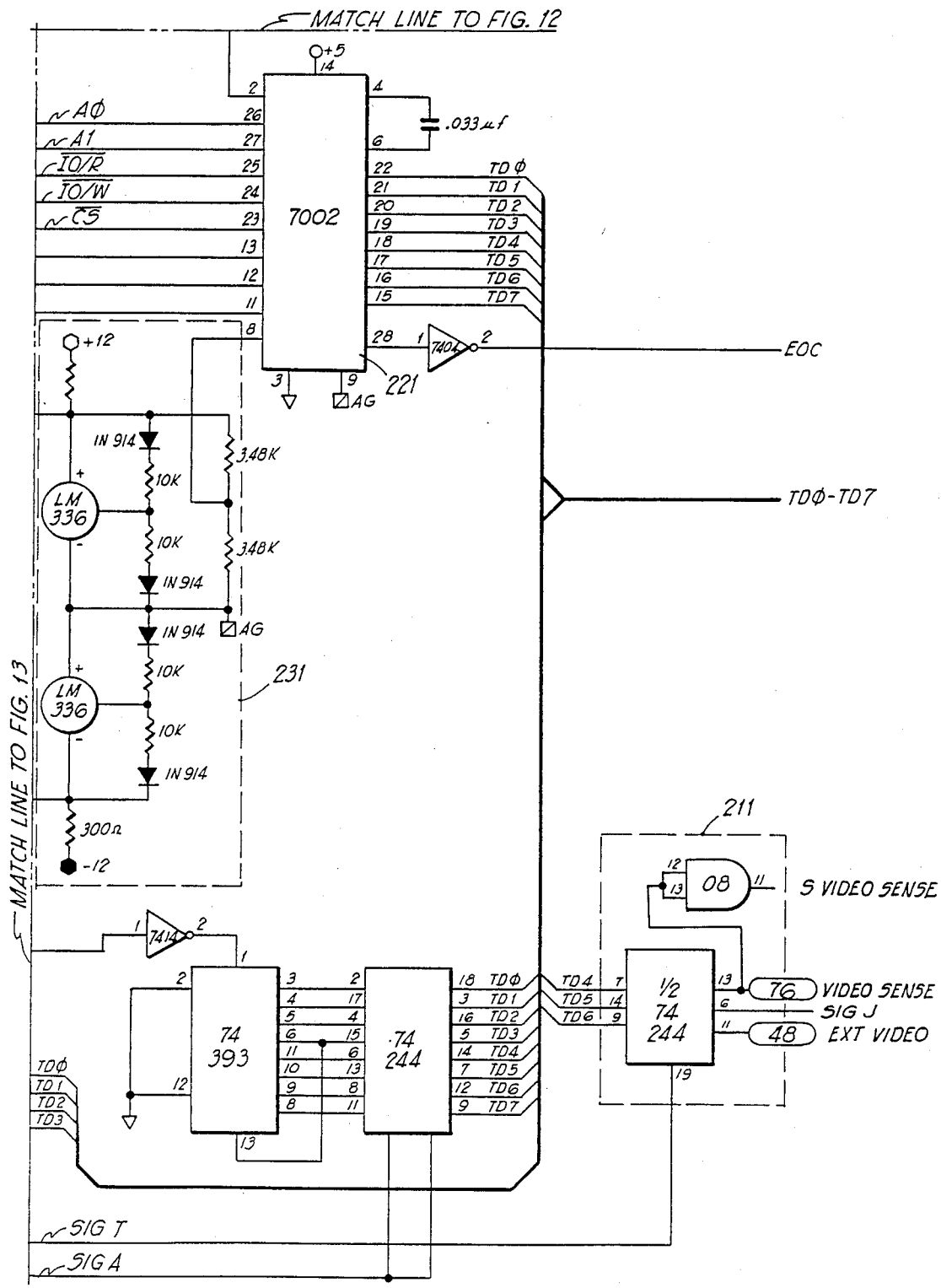

The teletext of the receiver 110 also comprises an Audio Section shown in FIGS. 1 and 12, that is under the control of System Control Section 111. Audio Section 233 contains an analog multiplexer 237 that receives three independent audio inputs from external connections on receiver 110. Under control of System Control Section 111, one of these three inputs is selected to feed a unity gain audio amplifier 239. An additional function of Audio Section 233 is to produce an audio beep heard in connection with the weather warning feature of the receiver 110 which is described in Section C below. An oscillator 241 produces this beep, which is mixed with the selected audio signal, and which can be turned on and off under control of System Control Section 111.

2. Video Group

The second group of sections of receiver 110 is the video group, shown in block diagram form on FIG. 2 and in detail on FIGS. 15-28. Essentially, this group comprises video switching, keying and amplification circuits.

Figure 15:
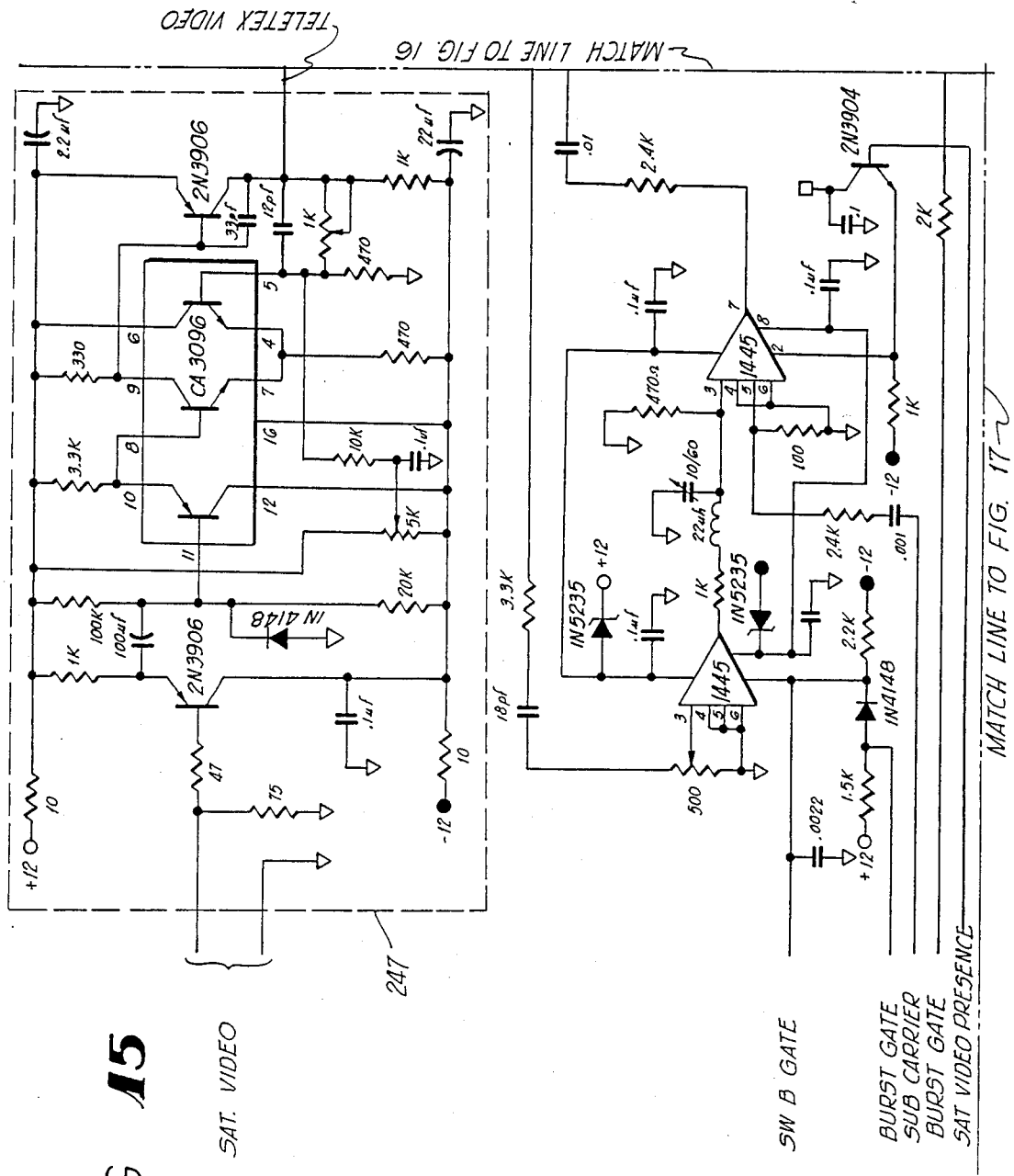
Figure 16:
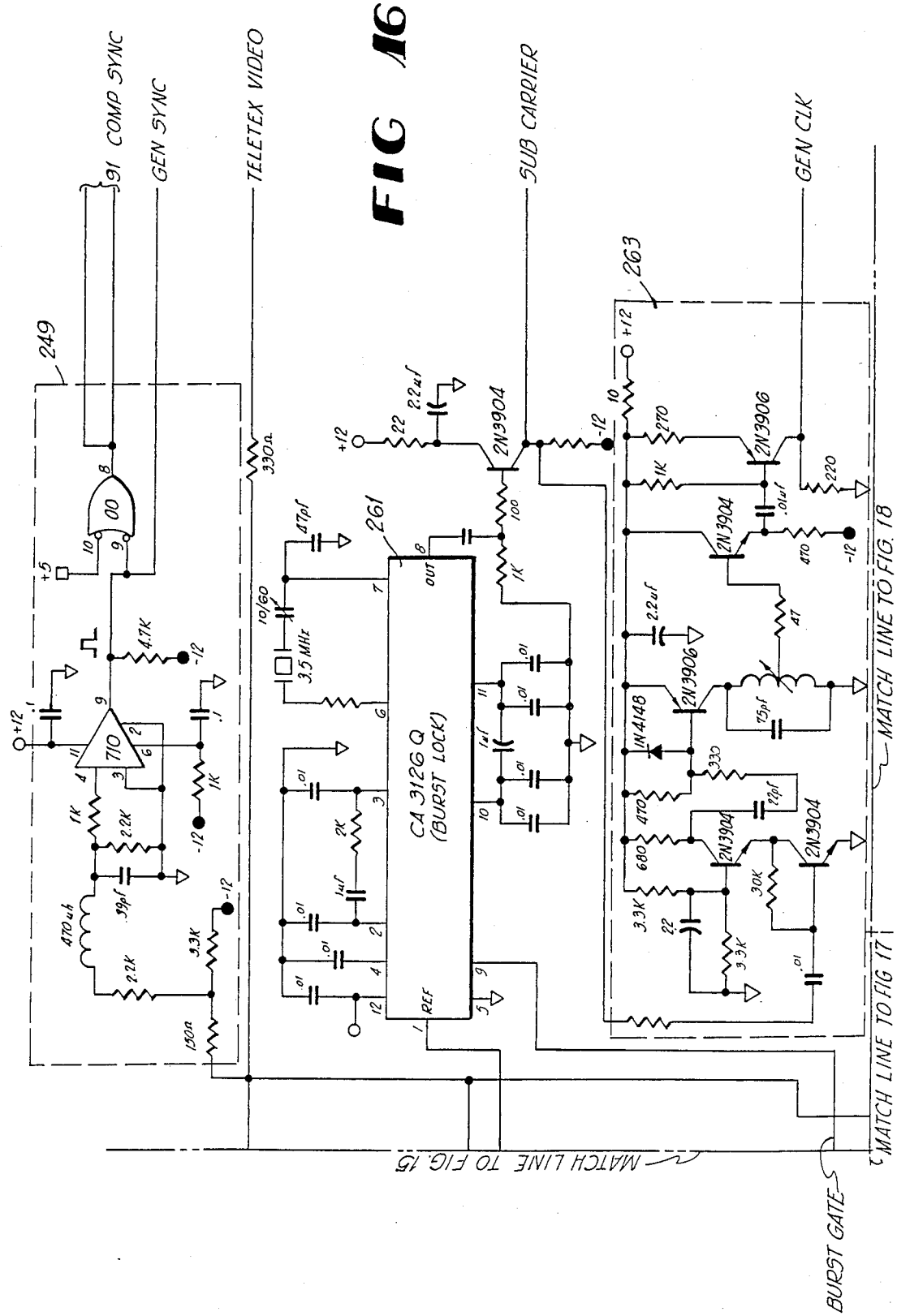

The satellite video signal, which may be from a conventional TVRO receiver, is input to Satellite Video Section 243 of receiver 110 shown in FIGS. 2 and 15 and 16. This Section comprises a conventional 6 dB amplifier and clamping circuit 247 shown in FIG. 15. The output of the amplifier and clamping circuit 247, amplified satellite video 248, is routed to Video Switcher Section 271, discussed below, for switching, amplification and eventual display; to Gen Lock and Sync Generator Section 251, also discussed below; to Teletext Bit Stream Recovery Circuitry 157 in the teletext group, for processing of the digital data in the vertical blanking interval; and to the sync stripper circuit 249 in this section 243 shown in FIG. 16. Sync stripper circuit 249 produces a normal 245 and an inverted composite 246 synchronization signal. The normal signal 245 is sent to Teletext Bit Stream Recovery Circuitry 157, Serial to Parallel Conversion Circuitry 171, and to Missing Clock Detector 181, all in the Synchronous Serial to Parallel Data Converter 173 discussed above in the teletext group. The inverted signal 246 is routed to the Gen Lock and Sync Generator Section 251.

Gen Lock and Sync Generator Section 251 of the video group shown in FIGS. 2, 15-16 and 19-22, and to which is input, inter alia, satellite video 248 from Satellite Video Section 243, provides National Television System Committee (NTSC) Standard timing signals to other sections of receiver 110. When an NTSC satellite video signal is supplied to this Section, these timing signals will be "Gen-Locked" or synchronized with that satellite video signal. This Section 251 contains a Fairchild 3262B television sync generator 253 that is coarsely synchronized to the satellite video signal 248 by comparison of the inverted composite or gen sync signal 246, supplied by Satellite Video Section 243 through digital delay networks 257, with the composite sync output of sync generator 253. Once coarse synchronization is achieved, as indicated by satellite video present signal 259 (which is routed to, inter alia, Miscellaneous Data Section 211 for input to System Control Section 111), the color burst from the satellite video signal 248 is applied to the reference input of an RCA CA 3126 burst lock chip 261 shown in FIG. 16. The phase locked burst frequency of this burst lock chip 261 passes through a multiply-by-four circuit 263 shown in FIG. 16 whose output is then used as the clock source for sync generator 253. The signals from this Gen Lock Section 251 are input to various circuits in the teletext, video and character generator groups of the receiver 110, as described below.

Figure 17:
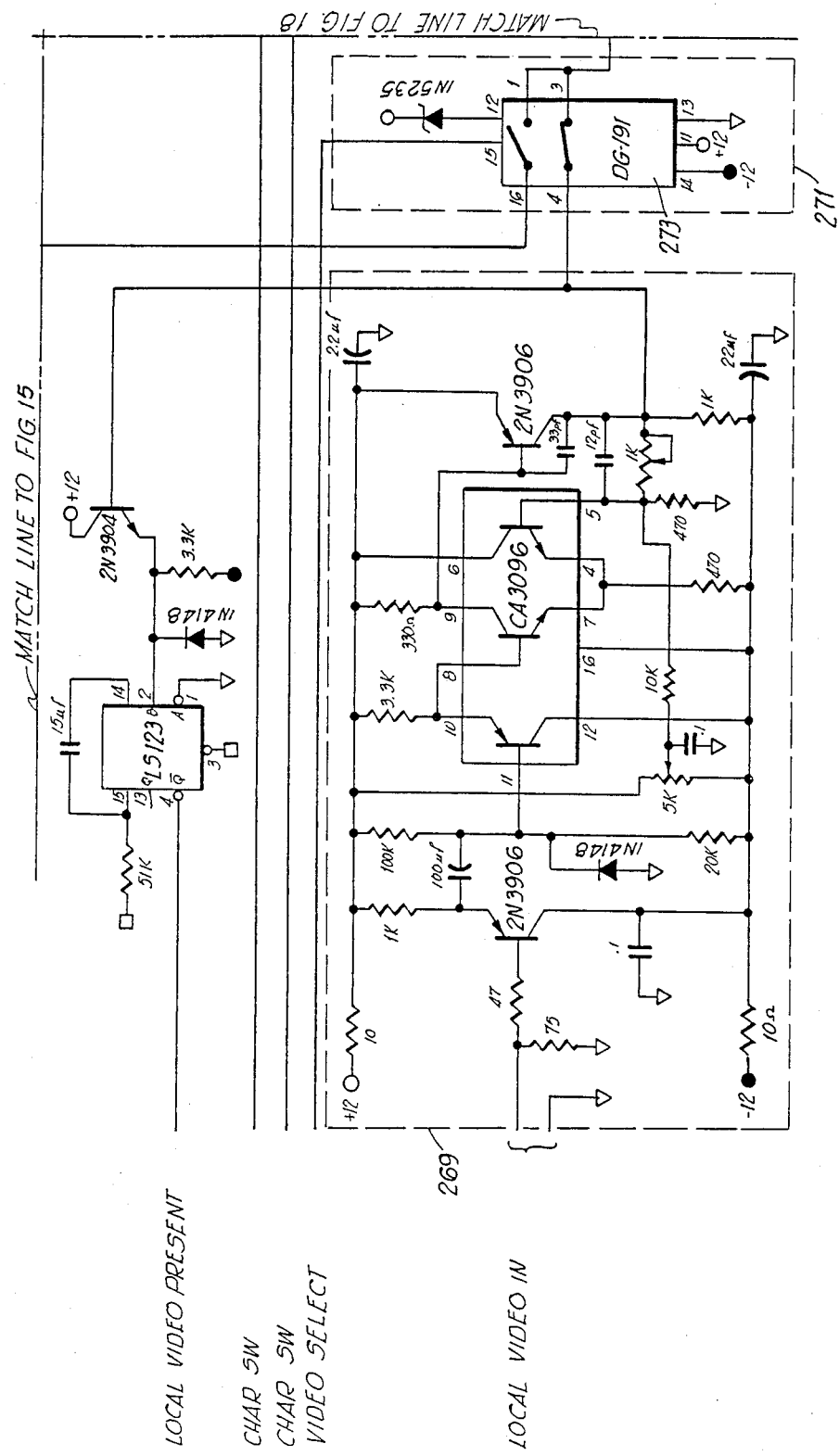
Figure 19:
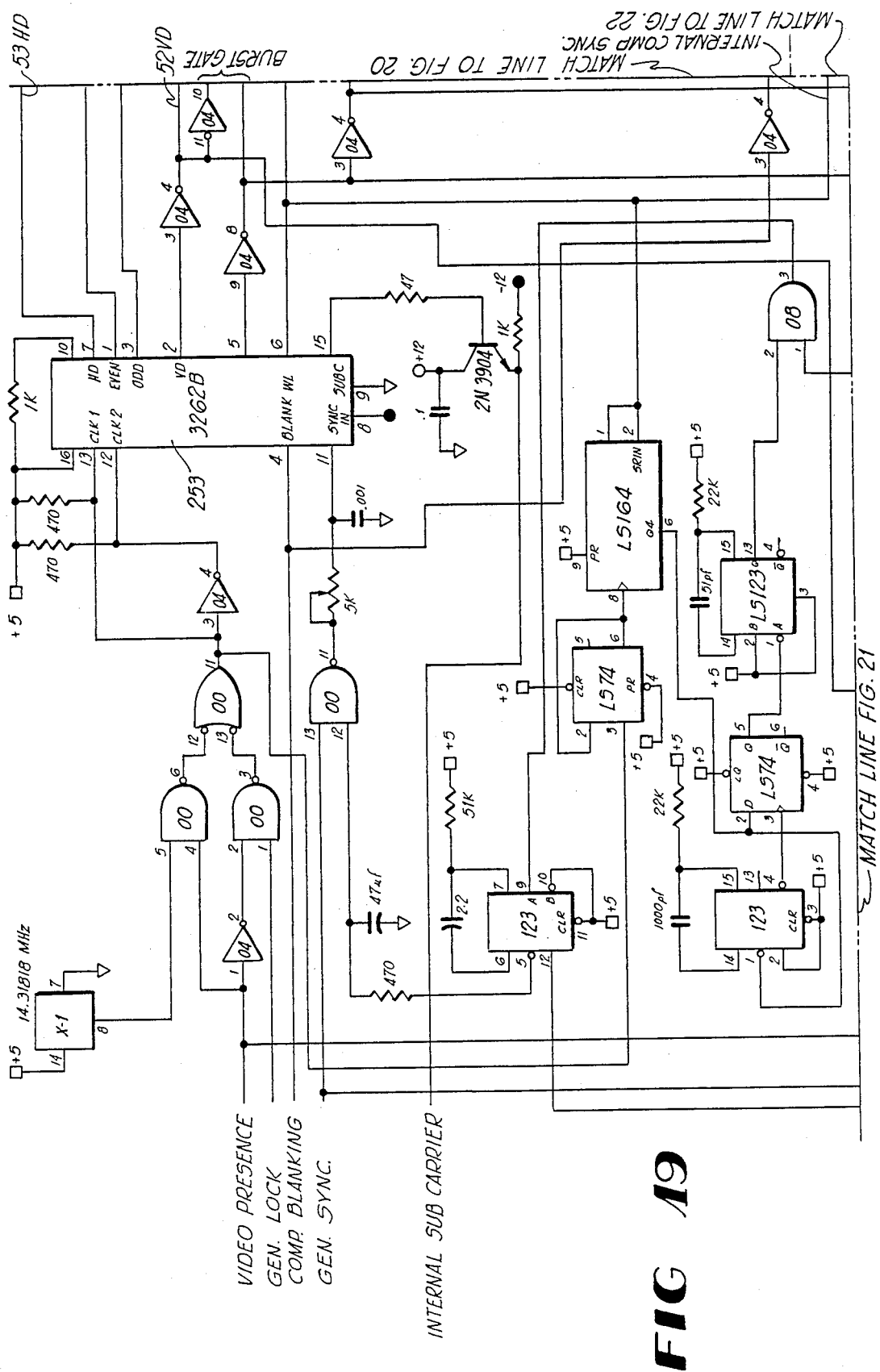

Local video signals are input to Local Video Section 267 of the video group of receiver 110 shown in FIG. 17. This section comprises a conventional 6 dB amplifier and clamping circuit 269 similar or identical to that in Satellite Video Section 243 mentioned above. The output of this amplifier and clamping circuit 269, a local video signal 270 similar to the video output of Satellite Video Section 243, is applied to Video Switcher Section 271 for switching, amplification and eventual display.

Video SWitcher Section 271 shown in FIG. 17, comprises a double pole analog solid state switch 273 which may be a Siliconix D6-191 and is controlled by video select signal 142 from Logic Output Section 139 of the teletext group. Switch 273 passes either the satellite video signal 248 from Satellite Video Section 243 or local video 270 from Local Video Section 267 to Background Keyer Section 277, discussed hereinbelow, for switching, amplification and eventual output for display.

Figure 23:
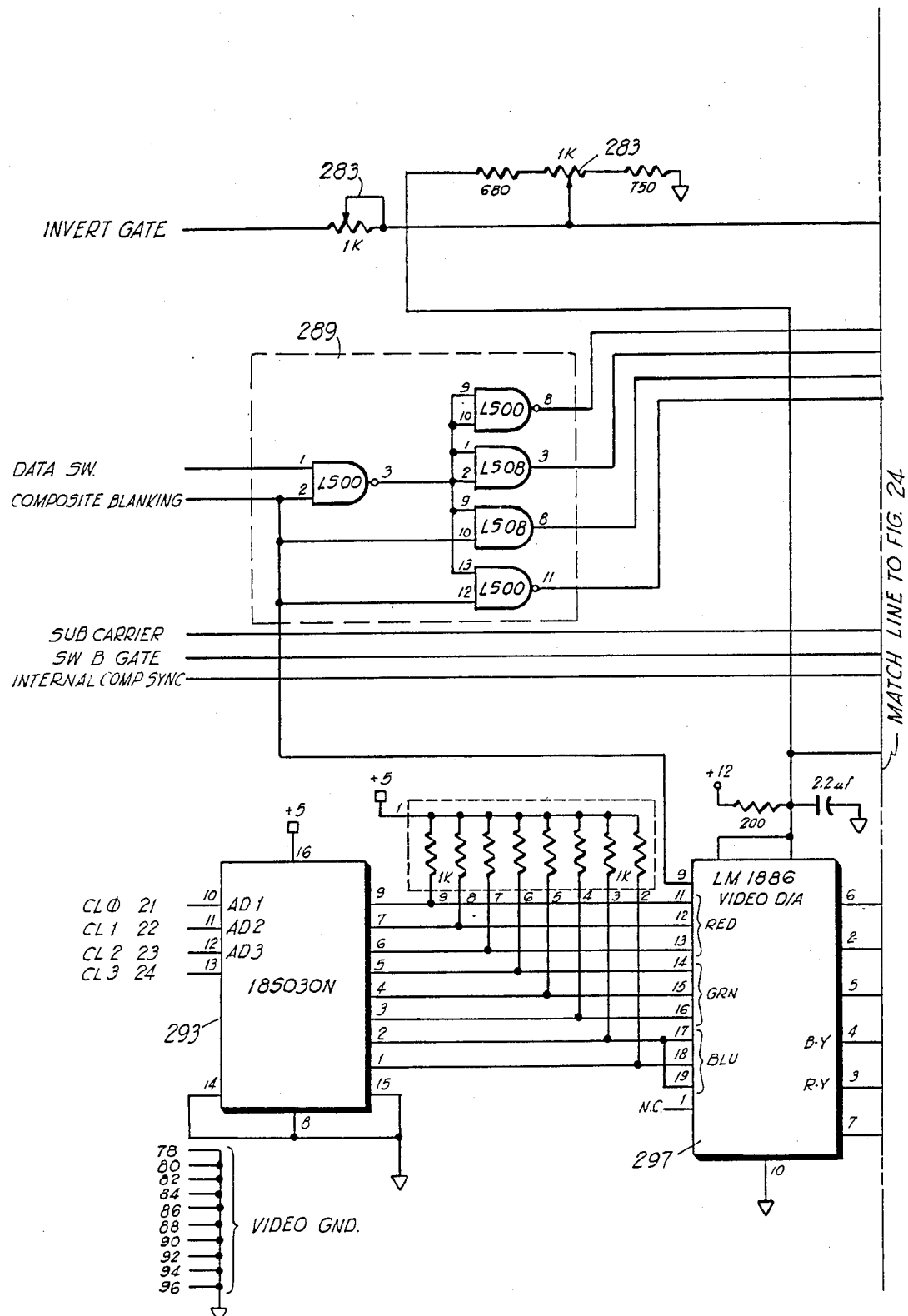
Figure 24:
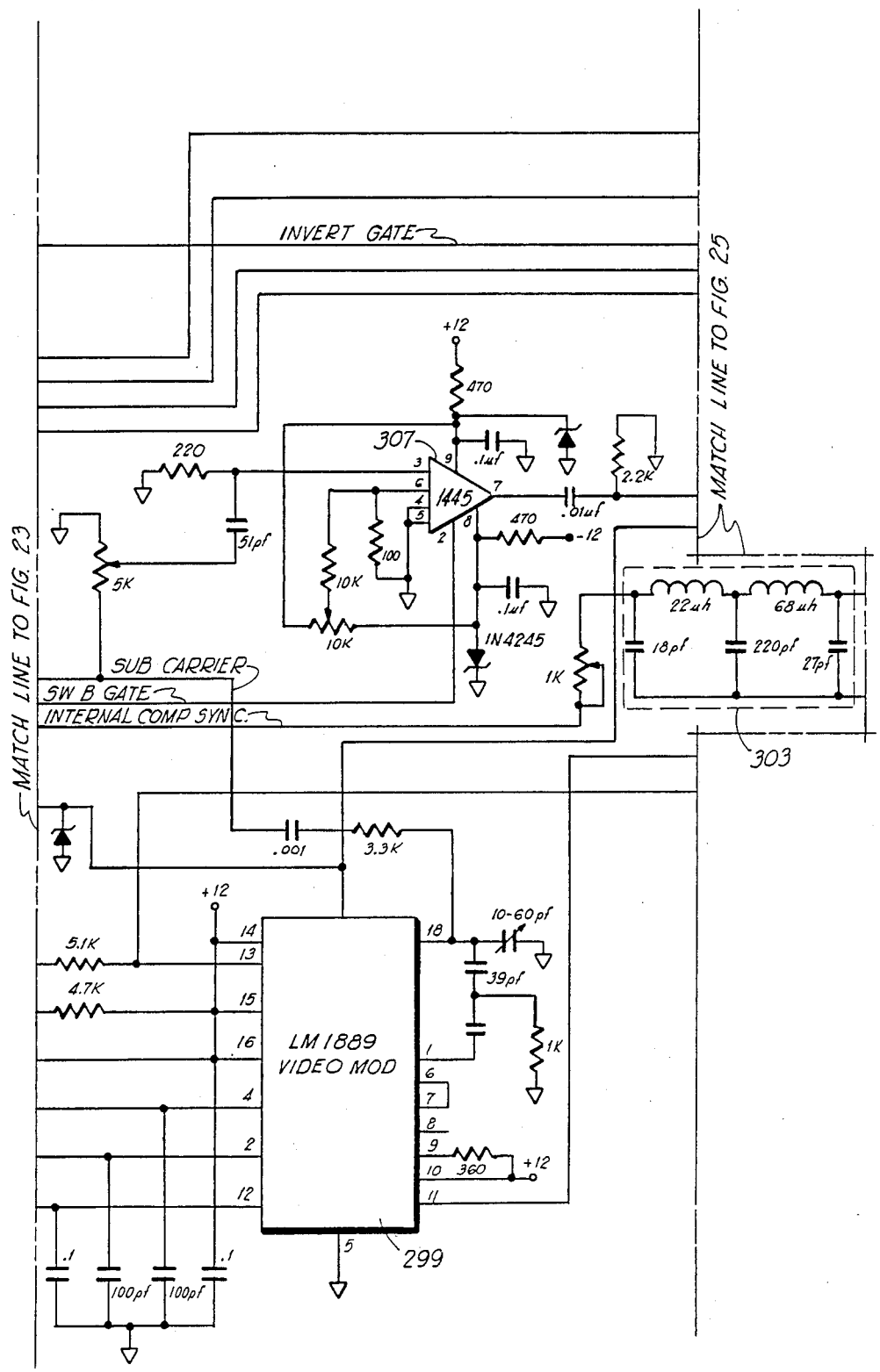
Figure 25:
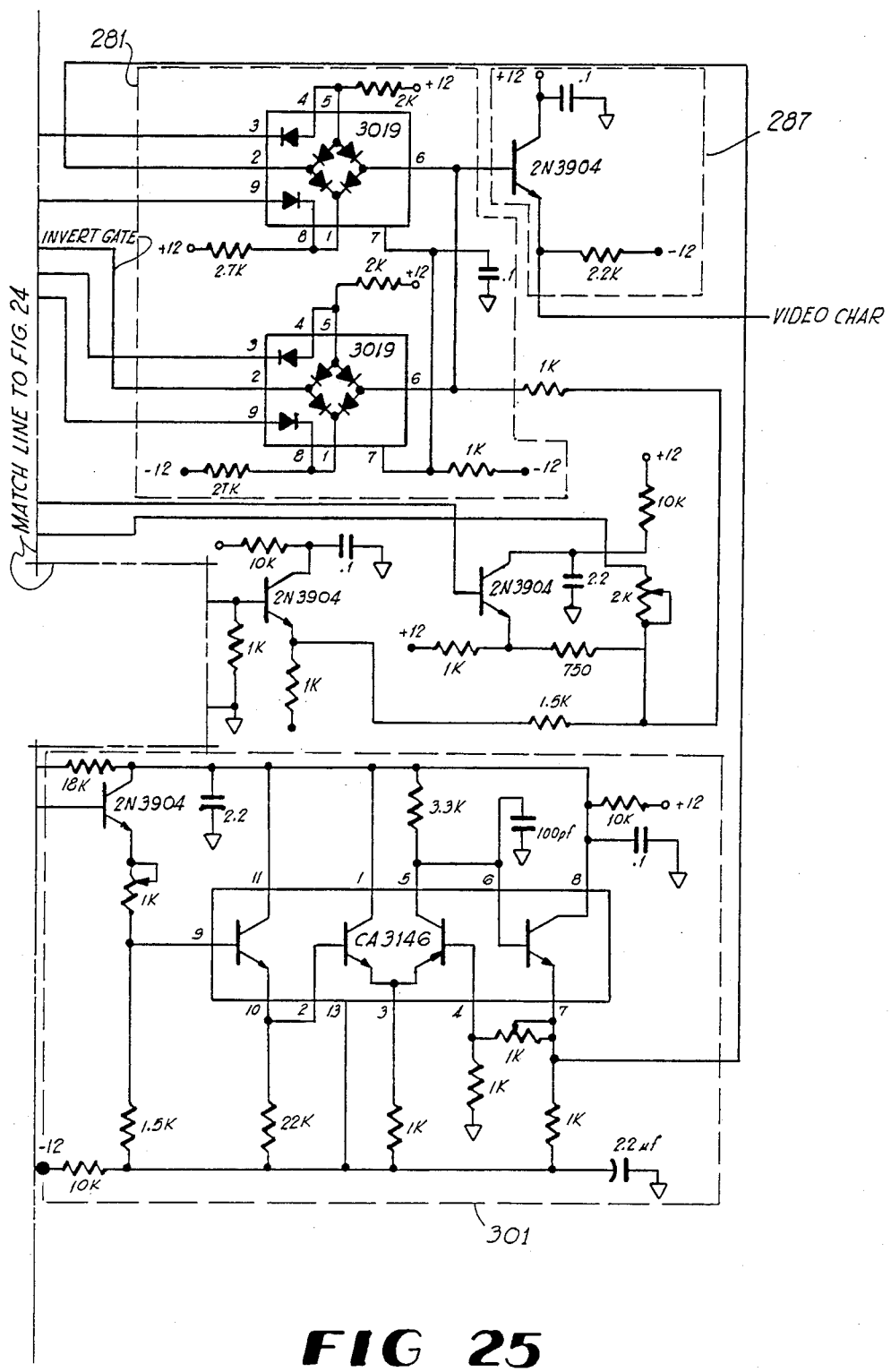

Also applied to Background Keyer Section 277 is output 278 from Character Keyer Section 279 which section is shown in FIGS. 23-25. This Section 279 comprises a high speed video switch 281 (FIG. 25) capable of selecting either of two video input signals for output or rapidly keying between the two signals to produce an output consisting of elements from both input signals. The input signals to a first side of video switch 281 are background color video 290 from Background Generator Section 291 and internal composite sync 292 from Gen Lock and Sync Generator Section 251. The input to the other side of video switch 281 is the character picture element black/white control 294 from the Display Attribute Functions Section 427 of the character generator group (FIG. 3) after black and white level potentiometers 283 (FIG. 23) adjust to provide standard NTSC signal levels. The output 278 of switch 281 is passed through a transistor buffer 287 (FIG. 25) and feeds Background Keyer Section 277. Switch 281 is controlled by character data switch signal 295 from Display Attribute Functions Section 427 of the character generator group, and the composite blanking signal 296 from Gen Lock and Sync Generator Section 251. These two switching control signals 295 and 296 are gated in logic circuit 289 (FIG. 23) so that the input of the first side of switch 281 mentioned above is selected throughout the vertical blanking interval of the satellite video signal and during periods when there are no character picture elements.

Background Generator Section 291, shown in FIGS. 2 and 23-25, includes a ROM 293 (FIG. 23) which is addressed by the four bit color code signals CL0-CL3 372 from Display Attribute Buffer Section 371 of the character generator group. The value in each of the sixteen memory positions that can be addressed provides digital red, green and blue input bits to a National Semiconductor LM1886 TV video matrix D to A chip 297. Chip 297 is connected to a National Semiconductor LM1889 video modulator 299 (FIG. 24) as shown in the manufacturer's application notes for video matrix D to A chip 297, which notes are included herein by reference. The color video signal from video modulator 299 is passed through a 4 dB chroma amplifier 301 (FIG. 25) to feed background color video signal 290 to Character Keyer Section 279. Background Generator Section 291 also provides a combined color burst and shaped internal composite sync signal 298 to Character Keyer Section 279. Internal composite sync signal 292 from Gen Lock and Sync Generator Section 251 is shaped by sine squared filter 303 and combined with a color burst from burst gate 307 (FIG. 24), whose inputs are the subcarrier signal and the burst gating signal from Gen Lock Sync Generator Section 251, to produce the composite sync signal 298.

Figure 18:
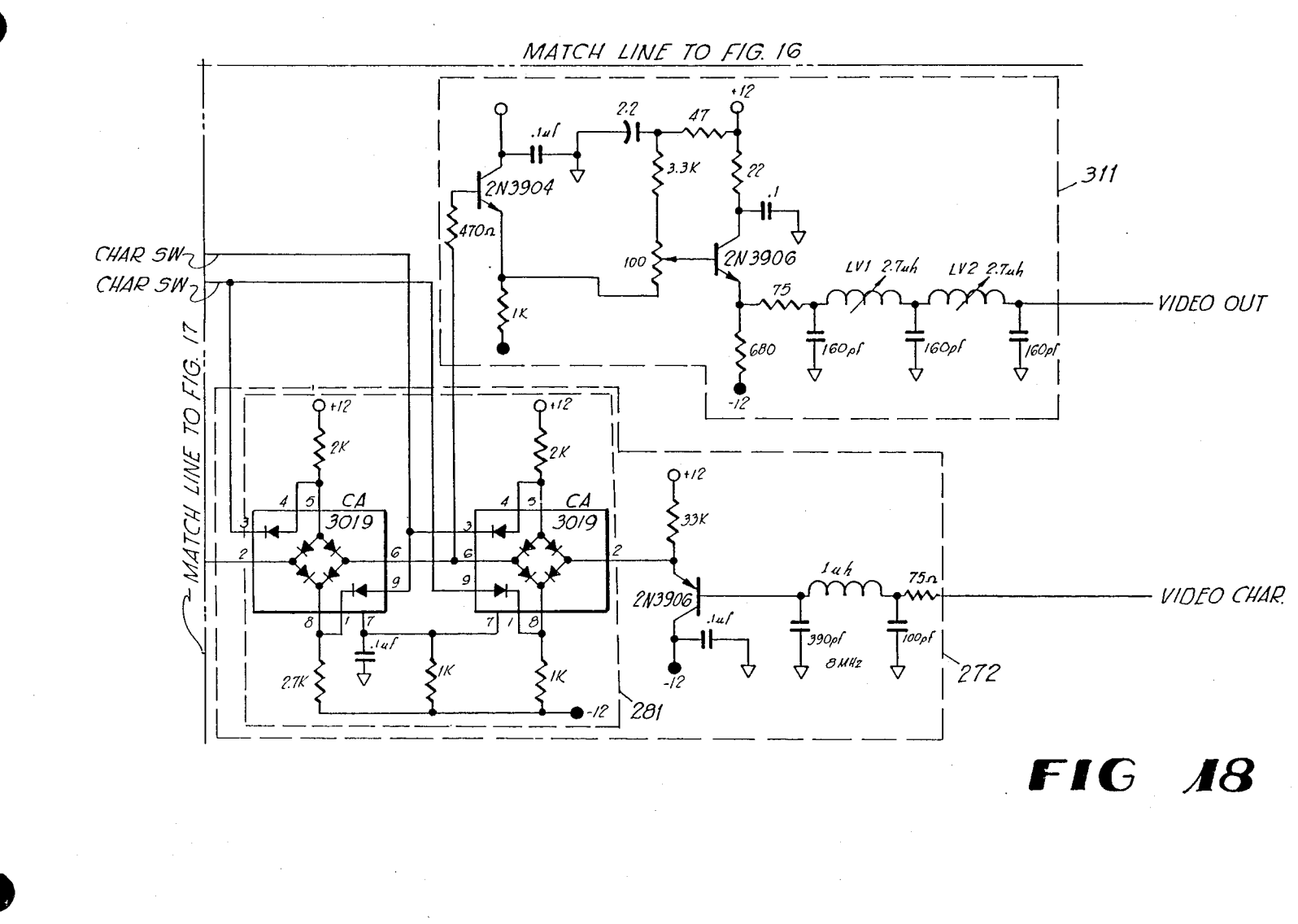

As shown in FIG. 18, Background Keyer Section 277 receives either local or satellite video signals from Video Switcher Section 271 and character and background video 278 from Character Keyer Section 279. Background Keyer Section 277 comprises a high speed video switch 281 capable of selecting either of these two video signals for output, or rapidly keying between them to allow characters to be "titled over" the local or satellite video rather than a plain color background. Switching between the two sources is controlled by the character switch signals 295 from Display Attribute Functions Section 427 of the character generator group. The output of Background Keyer Section 277 is applied to Video Output Amplifier Section 311 (FIG. 18), which comprises a conventional video driver stage adjusted to provide a one volt peak-to-peak signal to the video output connector on the exterior of receiver 110.

3. Character Generator Group

The third group of sections of receiver 110 is the character generator group, shown in FIGS. 3 and 29-39. This group uses eight bit parallel teletext data received from the teletext group to generate signals which control, inter alia, Background Generator Section 291, Character Keyer Section 279 and Background Keyer Section 277 in the video group to produce teletext video signals for display.

Figure 28:
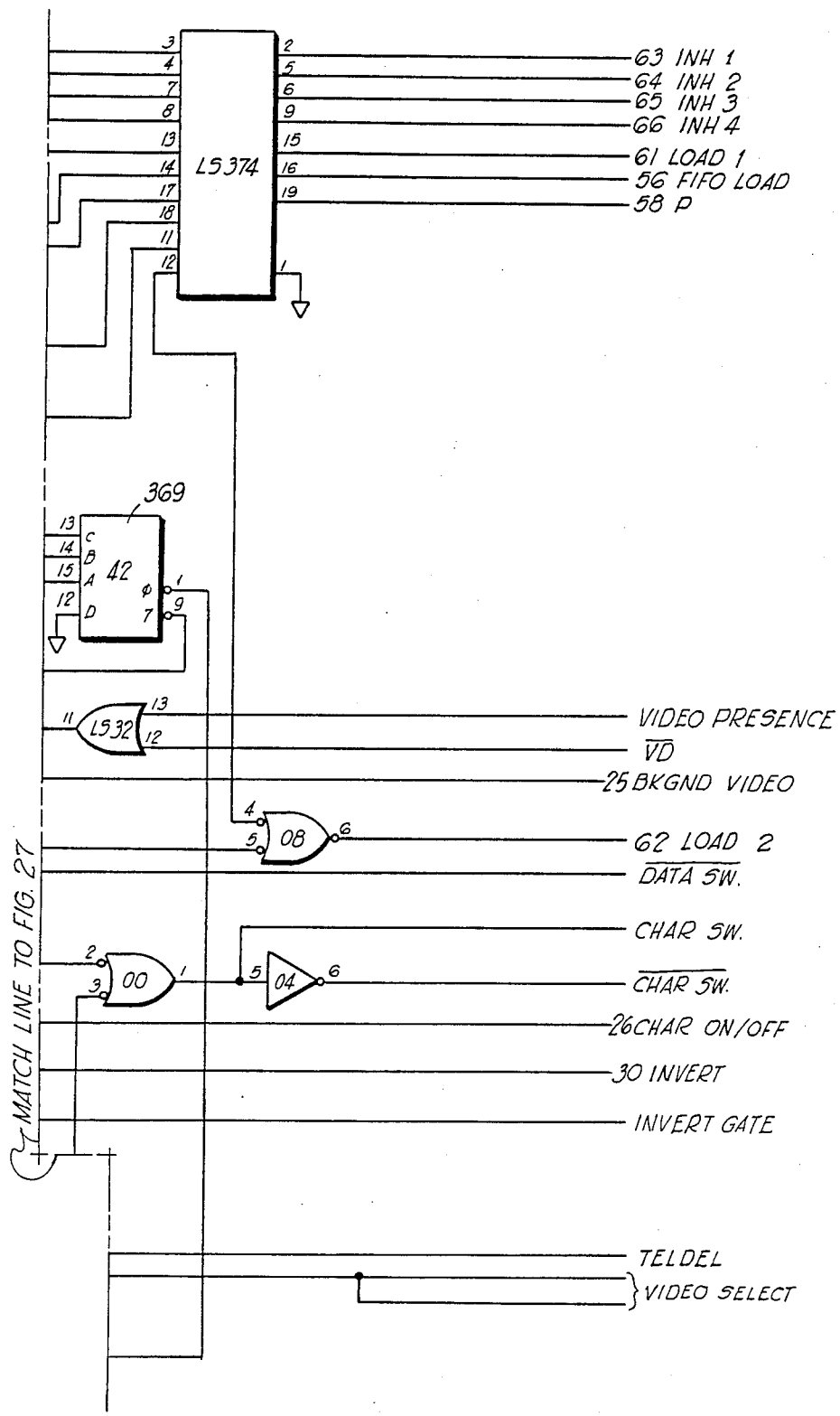
Figure 29:
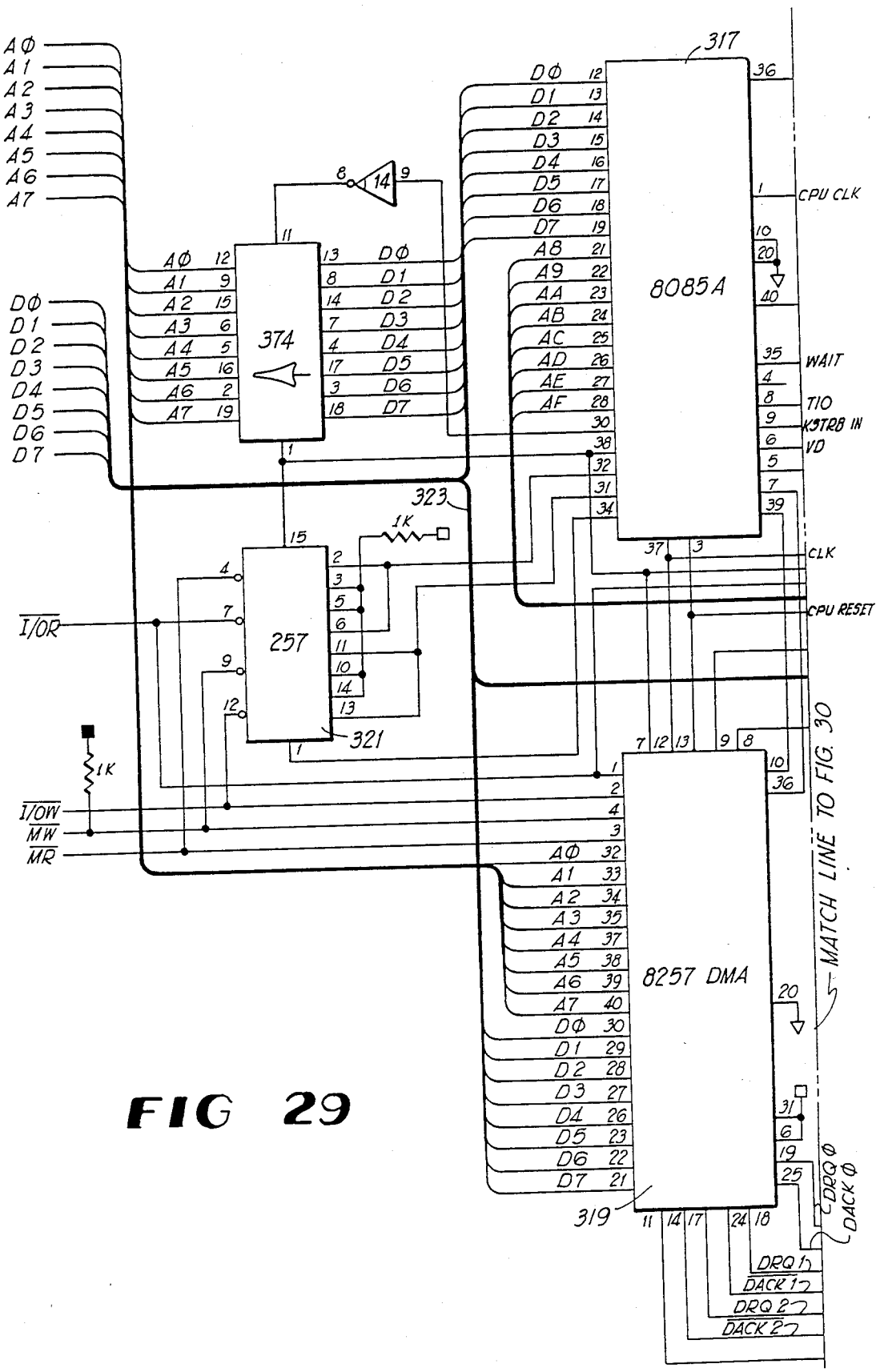

This group is controlled by Character Generator Controller Section 313, which includes, in the present embodiment, an Intel 8085A processor 317, an Intel 8257 DMA Controller 319, and Input/Output and Memory Address Decoding Circuitry 321 (FIG. 28). These elements are interconnected by a secondary common bus 323 as found in the manufacturer's application notes for a common data bus for the 8085A processor 317, which are incorporated herein by reference, and as illustrated principally in FIGS. 29–30. A 6 MHz master clock signal is provided to processor 317 from the 6 MHz crystal oscillator 118 in System Control Section 111. Processor 317 inputs the eight bit parallel teletext data from Interprocessor Link Section 190 into RAM 329 in the Display and Programming Memory Section 327 of the character generator group, discussed below, and otherwise implements character display functions of receiver 110 by execution of the program in ROM 331 of Display and Program Memory Section 327.

Figure 32:
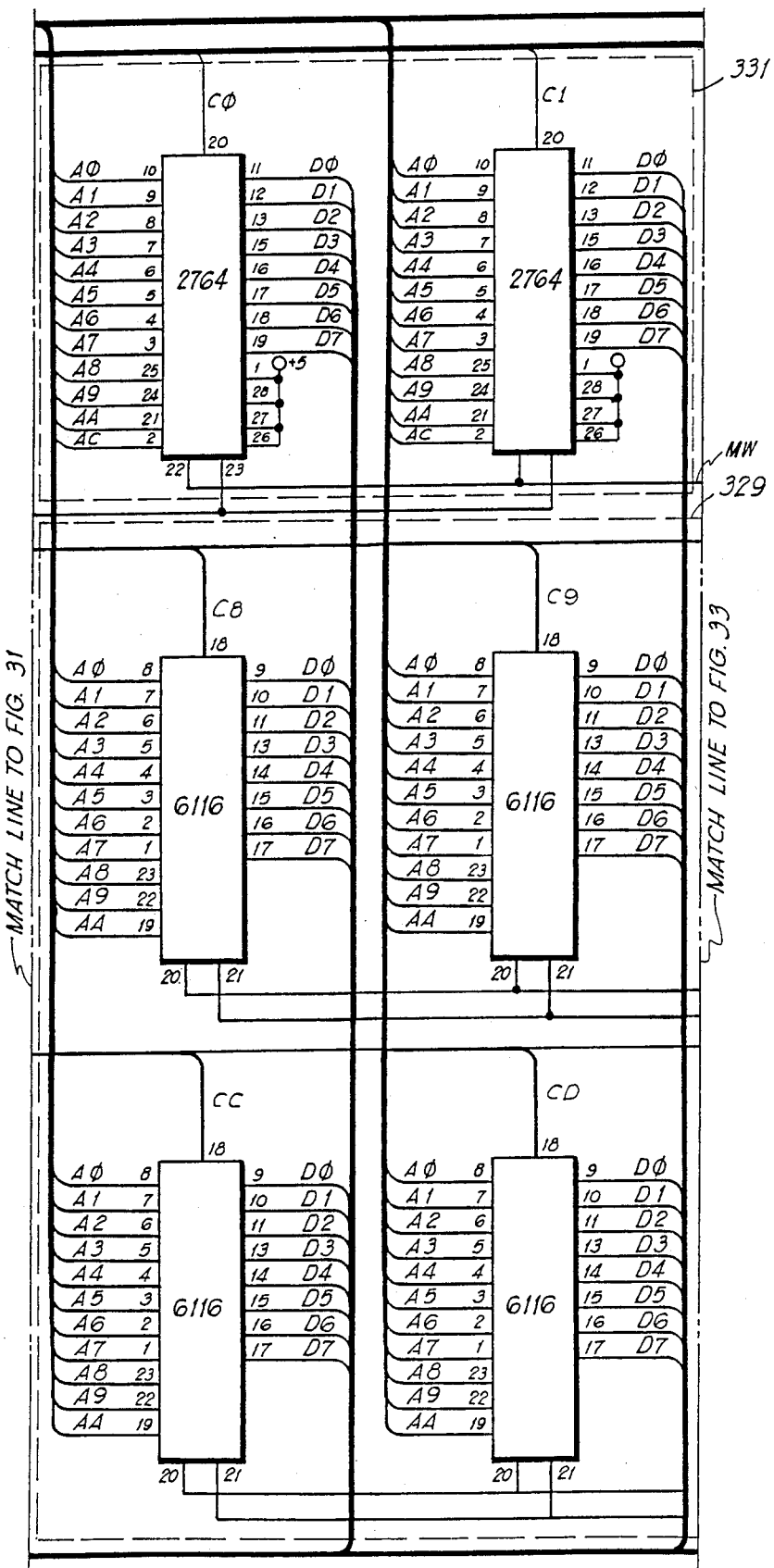
Figure 33:
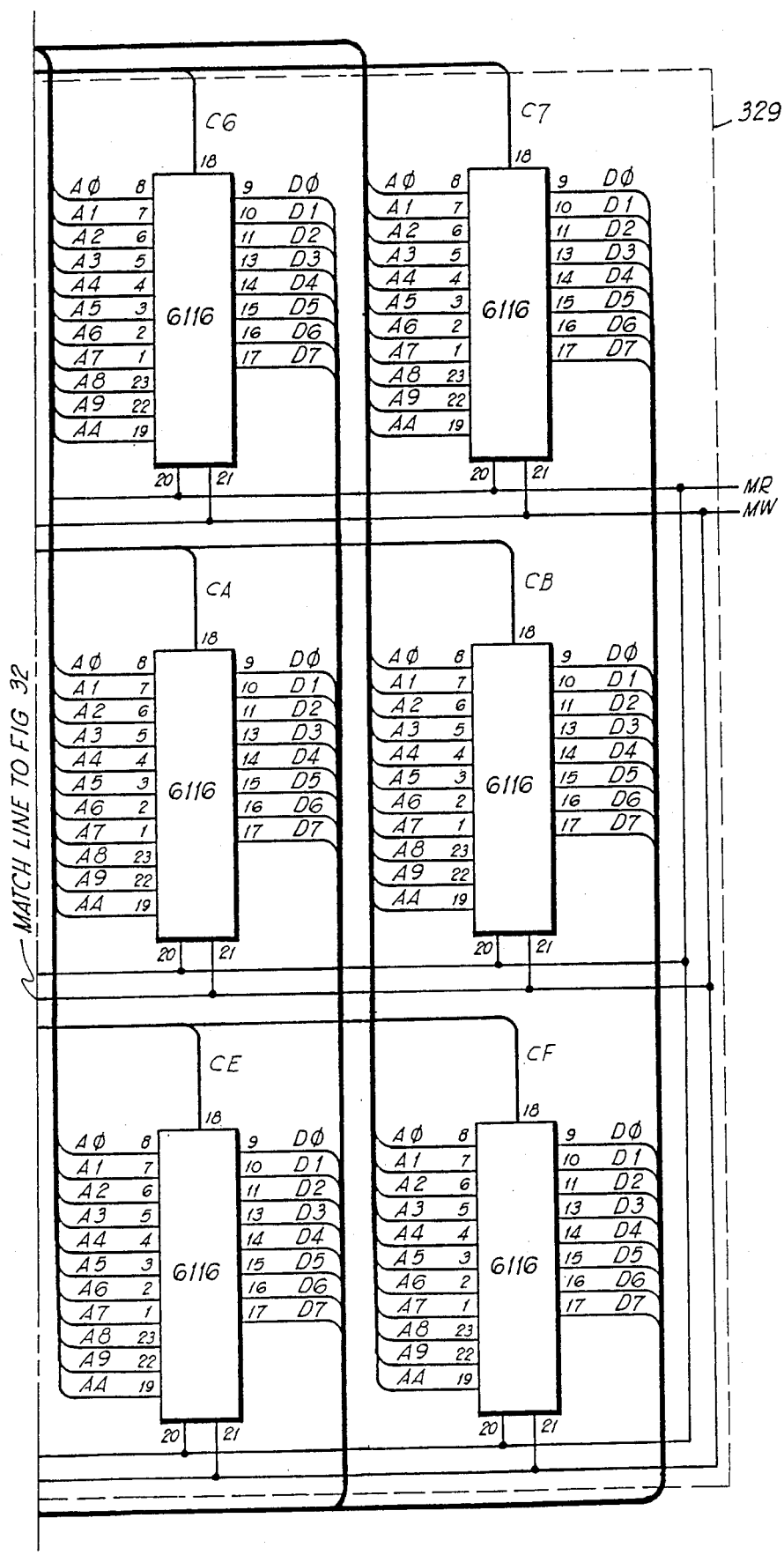

Display and Programming Memory Section 327, shown in FIGS. 3 and 31–33, comprises RAM 329 having 20K byte capacity and ROM 331 having 16K byte capacity, which are on secondary common bus 323 (FIG. 32). RAM 329, as mentioned above, is used for storage of 8 bit parallel teletext (or text-page) data storage, and also for scratch-pad memory by Character Generator Controller Section 313. ROM 331 contains the program for processor 317 of Character Generator Controller Section 313, which program is discussed and listed below.

After initialization by processor 317, DMA controller 319 transfers the 8 bit parallel teletext data from RAM 329 to Display Attribute Buffer Section 371 and to Character Buffer Section 333, discussed below, of the character generator group.

Input-Output and Memory Address Decoding Circuitry 321 (FIG. 31) provides enable signals to the following Sections which communicate on secondary common bus 323: Display and Programming Memory Section 327, Interprocessor Link Section 190, and Keyboard Input Section 428 and Real Time Clock Section 429, discussed below.

Figure 34:
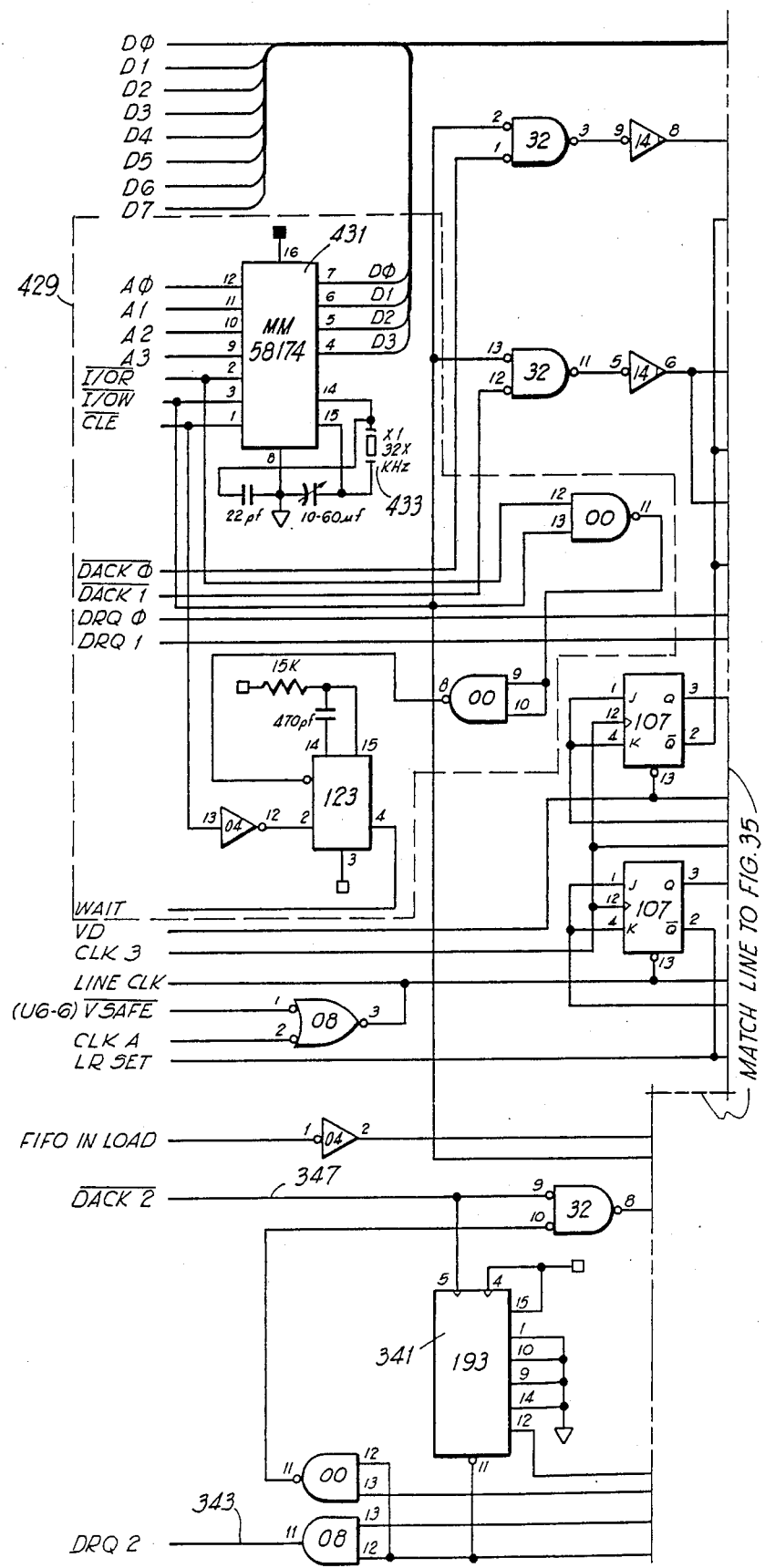
Figure 35:
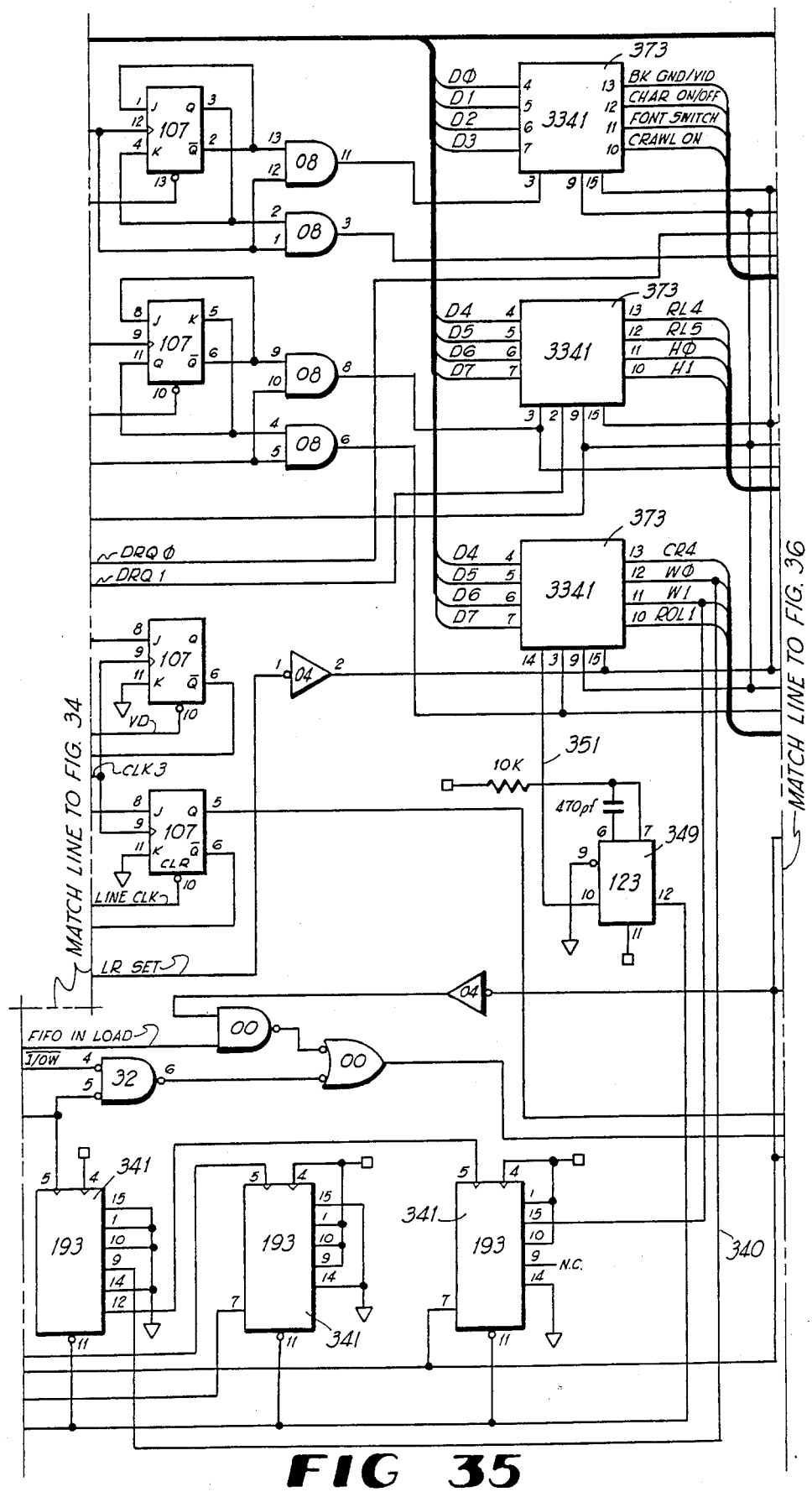
Figure 36:
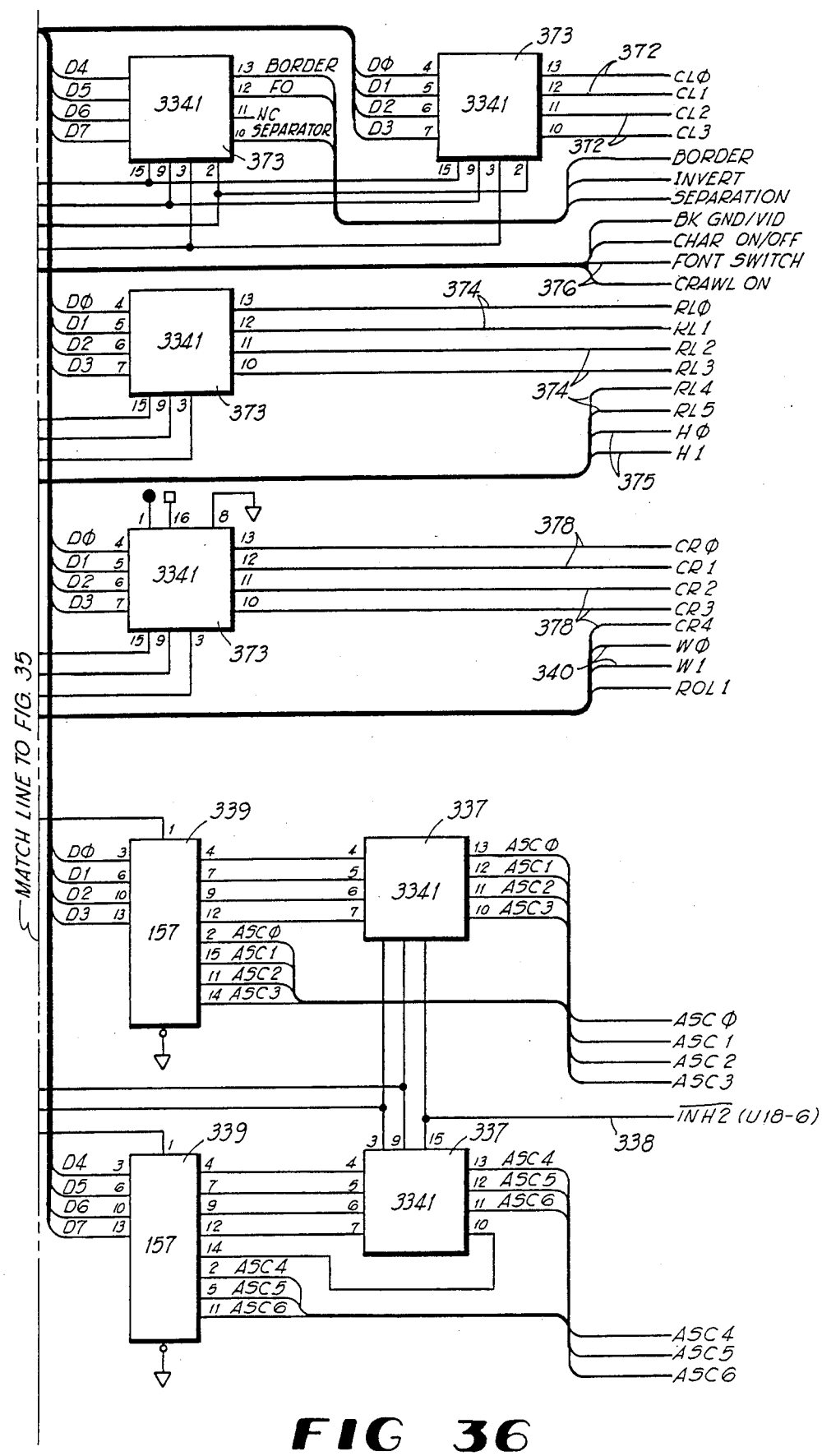

Character Buffer Section 333 (FIGS. 34–36) receives eight bit parallel teletext character data in American Standard Code for Information Interchange (ASCII) form from DMA controller 319 and buffers this data in a pair of sixtyfour by four bit wide first-in first-out registers 337 (FIG. 36). The up to thirty-two bytes of data corresponding to a text line of characters or part of such a text line are initially loaded into registers 337 (FIG. 36) under control of DMA controller 319, and counters 341 (FIGS. 34 and 35). Since each row of characters occupies (in height) a plurality of scan lines of video, the bytes corresponding to a text line of characters are recirculated by multiplexers 339 out of and back into registers 337 for each scan line associated with that row of characters. For each such scan line, signal NOT-INH2 338 from Character Serializer Section 359 clocks the eight bit parallel teletext data out of registers 337, byte-by-byte and into Font Memory Section 353, each such byte determining which character, and in particular which sequential horizontal portion of that character, is displayed in that portion of the scan line.

To control the number of bytes loaded into registers 337, Display Attribute Buffer Section 371, described hereinbelow, sends W0 and W1 width signals 340 to counters 341 in Character Buffer Section 333, which continuously presents to DMA controller 319 request signal DRQ2 343 until the corresponding DMA controller 379 acknowledgement signal NOT-DACK2 347 (FIG. 34) has been returned by DMA controller 319 enough times to satisfy the count. W0 and W1 width signals 340 are gated into counters 341 by a one-shot 349 controlled by NRD signal 351 from Display Attribute Buffer Section 371. Display Attribute Buffer Section 371 also clears registers 337 after data for the text line has been clocked out. Character Serializer Control Section 409, discussed below, provides recirculation clocking to registers 337 to sequentially recirculate bytes corresponding to a text line of characters.

Font Memory Section 353 (FIGS. 38 and 39) contains, in 32 bit by 32 bit cells in four 4K by 8 bit ROMS 357, the character fonts which may be addressed for display. In the present embodiment, two sizes of characters are stored (although more than two may be displayed by addressing more than once certain lines in each cell) but this capacity may be increased in other embodiments. Twelve input lines for each of the four ROMS 357, which are fed in parallel, carry signals as follows: Six carry address signals from Character Buffer Section 333 corresponding to a particular scan line of a text line of characters; five carry address signals from Character Line Control Section 421; and the twelfth carries a font-select signal from Character Line Control Section 421. Data output from this Section, in the form of parallel bits corresponding to horizontal portions of characters one line scan in height, are fed to Character Serializer Section 359.

Figure 39:
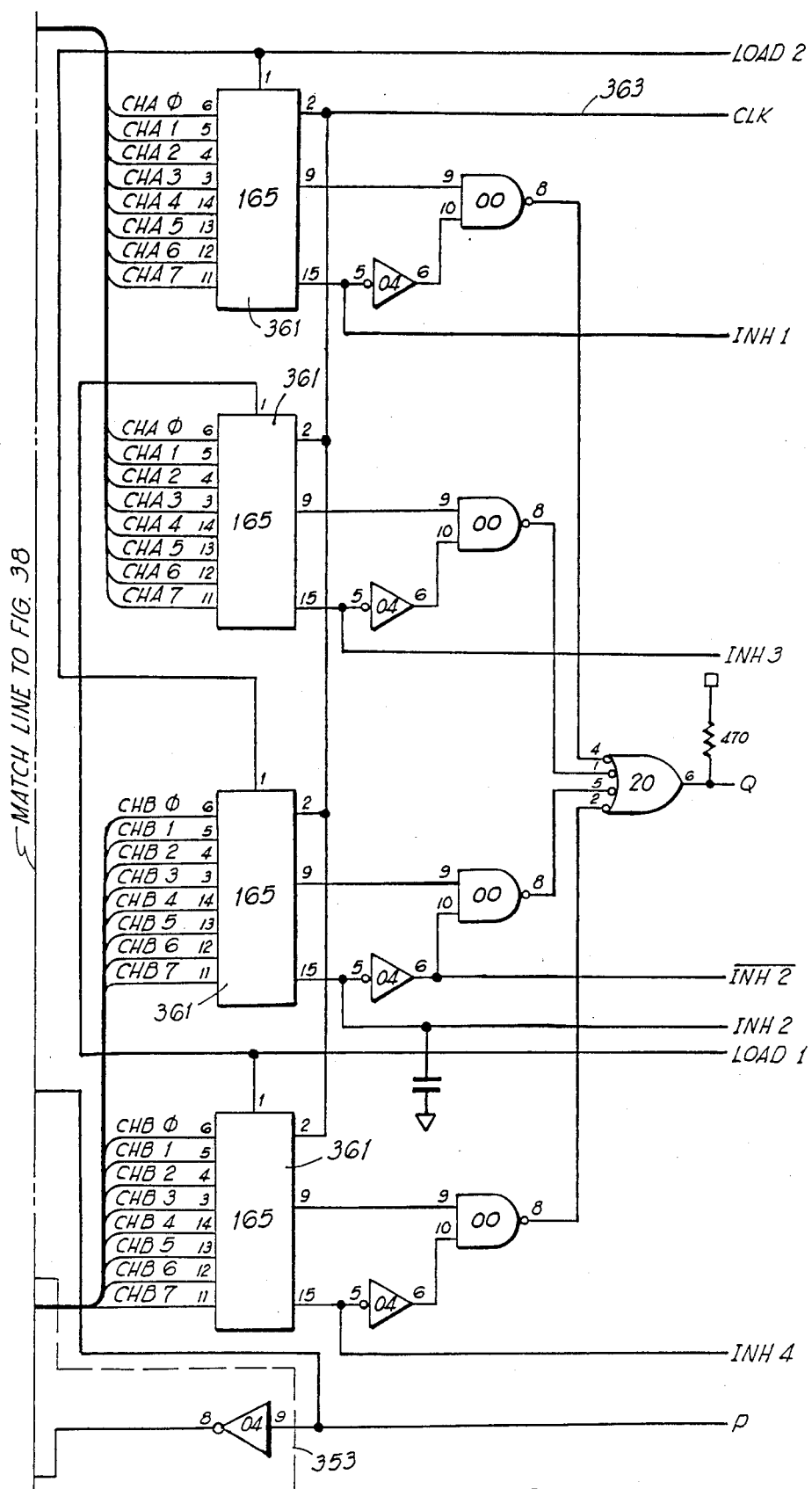

Character Serializer Section 359 (FIGS. 27–28 and 39), receives 16 bit data increments that form the left half, and 16 bit data increments that form the right half, of the horizontal portions of consecutive characters. These bits are loaded into parallel-in serial-out registers 361 (FIG. 39). The resulting serialized picture element bits are then shifted out of registers 361 by CLK Signal 363 from Dot Clock and Width Control Section 393 under control of Character Serializer Control Section 409, both of which are discussed below.

Figure 27:
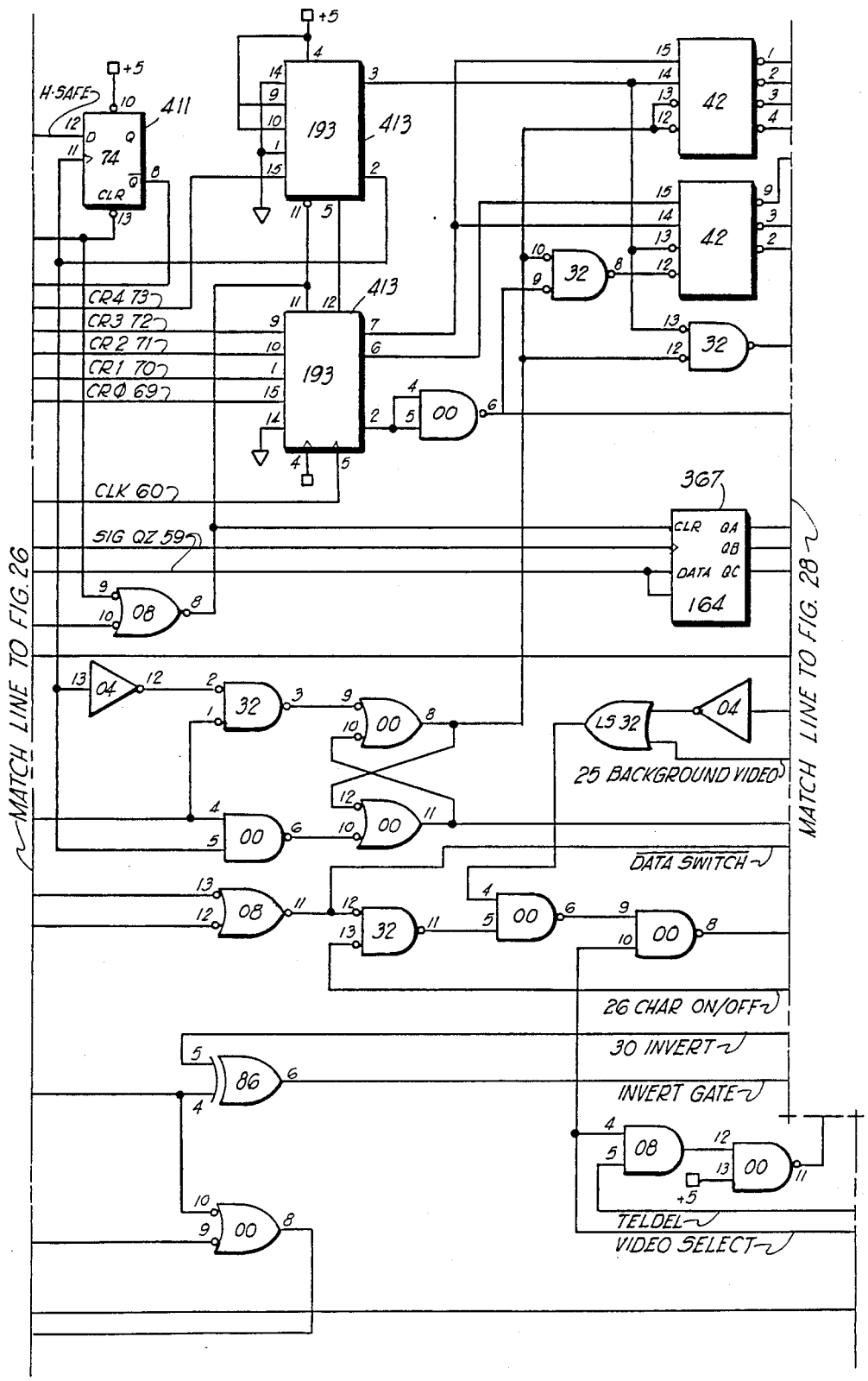

So that receiver 110 may produce characters that have border areas that provide contrast against background video, the resulting serialized picture element bits are shifted bit by bit into a three bit wide serial-in parallel-out shift register 367 (FIG. 27). For each bit shifted in, the register 367 drives a one of eight decoder circuit 369 (FIG. 28). Only two of the outputs of the decoder circuit 369 are used, resulting in three usable output states: one output active, the other output active, or both inactive. These states are imparted to the serialized picture element bit data stream and correspond to background video, internal character video, and character border area video, respectively. The data stream is routed to the Display Attribute Functions Section 427 of the character generator group, discussed below, for control of character display sections of the video group previously discussed.

DMA controller 319 of Character Generator Controller Section 313 also feeds eight bit parallel teletext data to Display Attribute Buffer Section 371, shown in FIGS. 3 and 34–36. DMA controller 319 is initiated by processor 317 to feed twenty-seven display attribute control bits for each text line, via secondary common bus 323, into seven sixty-four by four bit wide first-in first-out registers 373 in Display Attribute Buffer Section 371. Two DMA controller 319 channels are used: one transfers roll, crawl, height and width information to four of the seven registers 373 (FIGS. 35 and 36), while the other loads the remaining attribute information into the other three registers 373.

Data is clocked out of registers 373 once for each text line, under control of signals from Display Area Control Section 377 and Character Line Control Section 421 discussed below, as well as Character Generator Control Section 313. Signals from Gen Lock and Sync Generator Section 251 in the video group and Character Generator Controller Section 313 reset registers 373.

Registers 373 send control signals to other sections of the character generator group and the video group, including the following: CL0-CL3 color code signals 372 to Background Generator Section 291 of the video section; RL0-RL5 roll 374 and H0 and H1 height 375 signals to Roll Control Section 417 discussed below; font selection signals to Character Line Control Section 421 discussed below; a crawl select signal 376 to Display Area Control Section 377 discussed below; W0 and W1 width signals 340 to Dot Clock and Width Control Section 393 discussed below and to Character Buffer Section 333; CR0-CR4 character serializing signals 378 to Character Serializer Control Section 409 discussed below; border, invert, separator, background/video select, and character on/off signals to Display Attribute Functions Section 427 discussed below; new row data NRD signal 351 to Character Buffer Section 333; and clocking information to Roll Control Section 417 and Character Serializer Control Section 409 discussed below.

Figure 20:
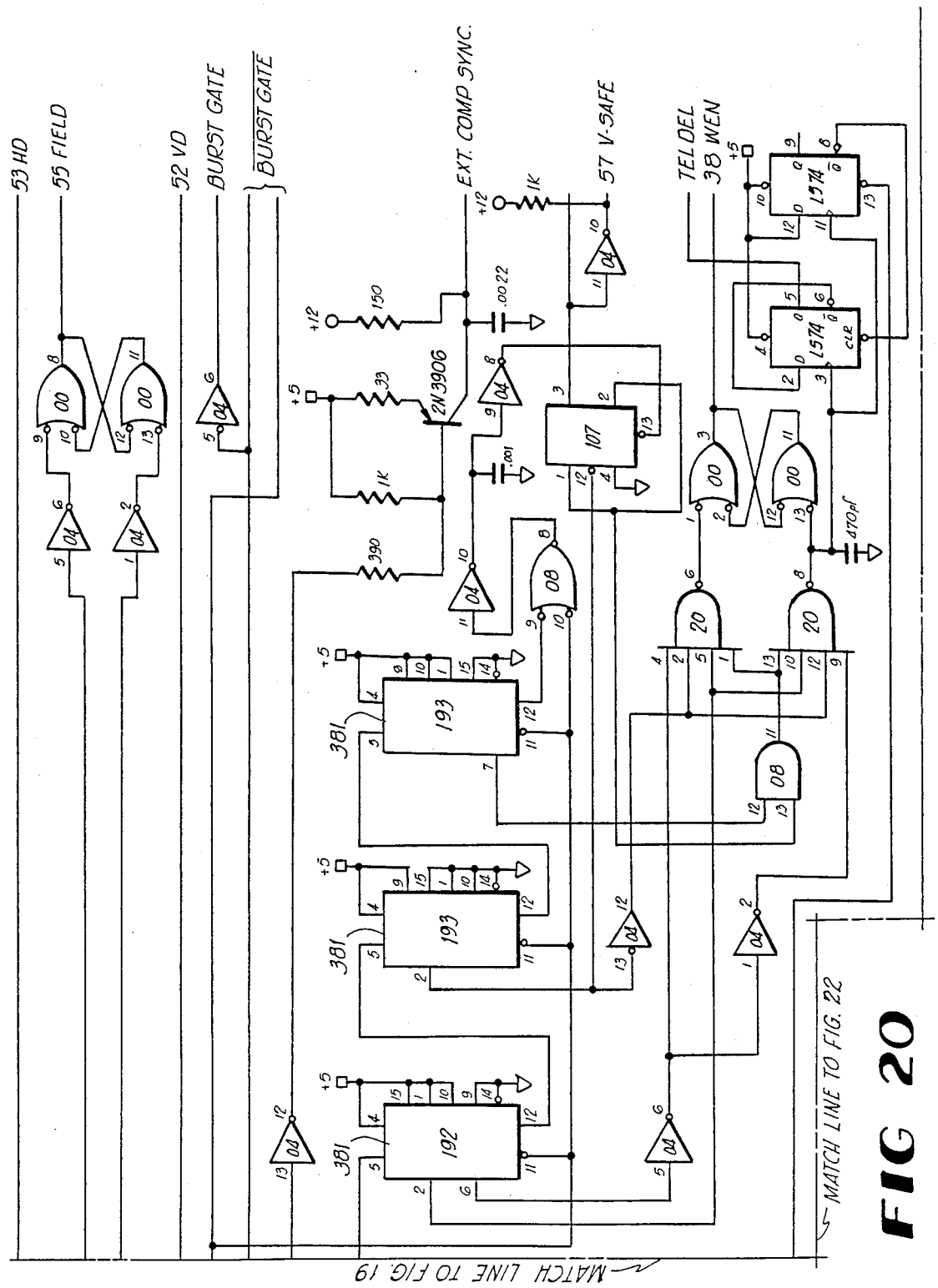
Figure 22:
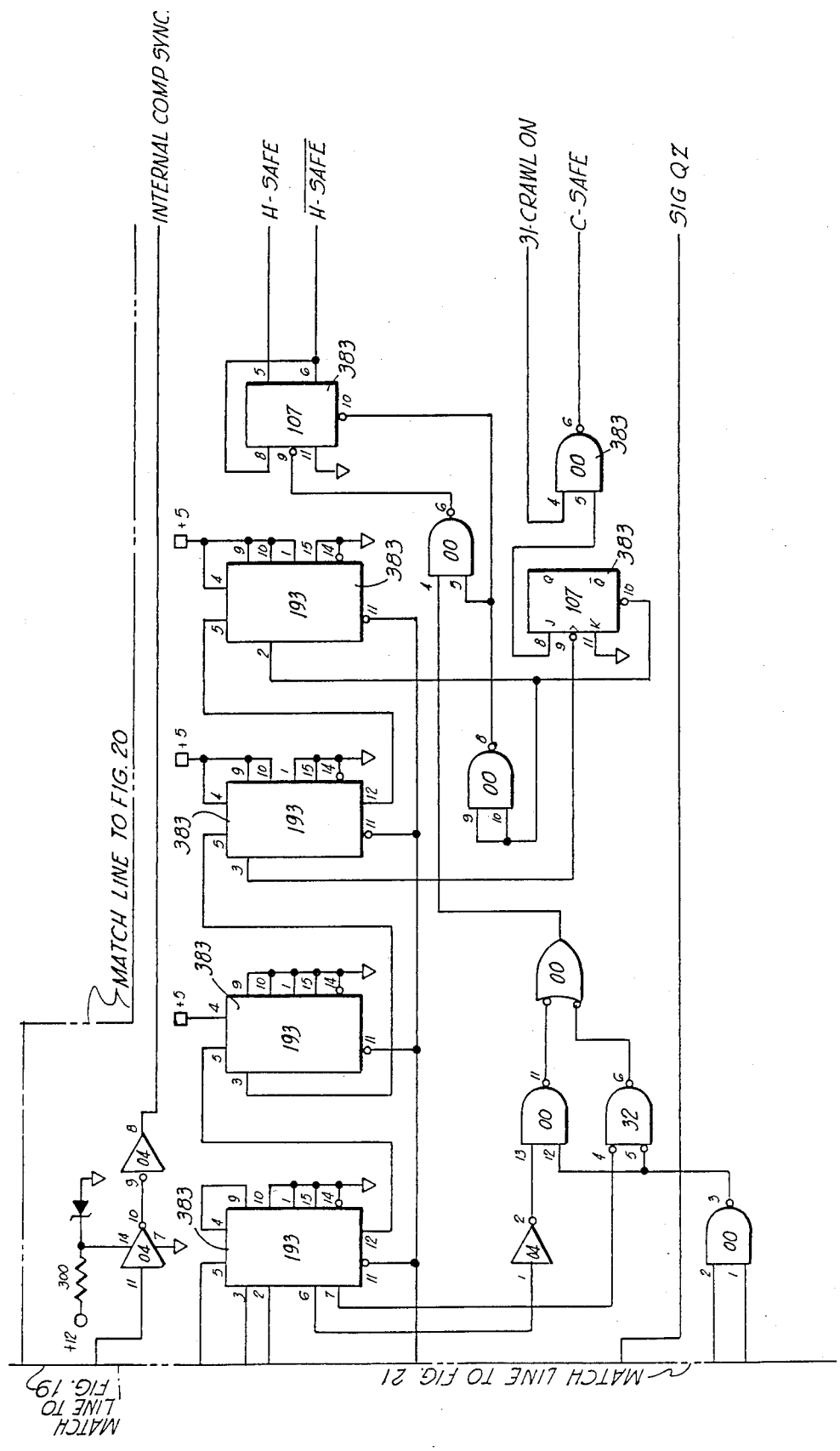

Display Area Control Section 377, shown in FIGS. 20 and 22, generates the signals necessary to establish the boundaries of the screen area for character display. The Burst Flag Signal 254 from Gen Lock and Sync Generator Section 251 is counted down in counter circuitry 381 to create the VSAFE signal 379 which indicates the vertical areas in which characters may not be displayed. The VSAFE counter circuitry 381 (FIG. 20) is reset by signals from Gen Lock and Sync Generator Section 251. Burst Flag Signal 254 also resets HSAFE counter circuitry 383 (FIG. 22) which counts a 25 MHz oscillator signal from Dot Clock and Width Control Section 393, discussed below. Circuitry 383 produces complimentary signals HSAFE 387 and NOT-HSAFE 389 which signals indicate the horizontal boundaries of the character display area. HSAFE counter circuitry 383 also provides a CSAFE signal 391 to indicate the special horizontal display area boundaries for text that is crawling horizontally across the screen. VSAFE 379, NOT-HSAFE 389 and CSAFE 391 signals are provided to Display Attribute Functions Section 427 discussed below, while HSAFE is provided to Character Serializer Control Section 409, also discussed below.

Dot Clock and Width Control Section 393, shown in FIG. 21, contains two gated oscillators 397 and 399. In the present embodiment, oscillator 397 is an 18.75 MHz Engineered Components Company STTLSWGM-168, while oscillator 399 is a 25 MHz Engineered Components Company TTLSWCM-25. The latter oscillator is trimmed by a 500 ohm potentiometer 401 to exactly four/thirds the frequency of the first oscillator. For stability, a dedicated power supply 403 is provided to both oscillators. Signals from Gen Lock and Sync Generator Section 251 resynchronize the two oscillators at the start of each horizontal line. The output of 25 MHz oscillator 399 feeds HSAFE counter circuitry 383 in Display Area Control Section 377, which returns divide-by-two and divide-by-four signals to a four port multiplexer 407 in Dot Clock and Width Control Section 393. Multiplexer 407 also receives input from each oscillator 397 and 399, and utilizes W0 and W1 width control signals 340 from Display Attribute Buffer Section 371 to select one of its four inputs as output to be provided to Character Serializer Section 359 for character serializing and timing purposes.

Figure 26:
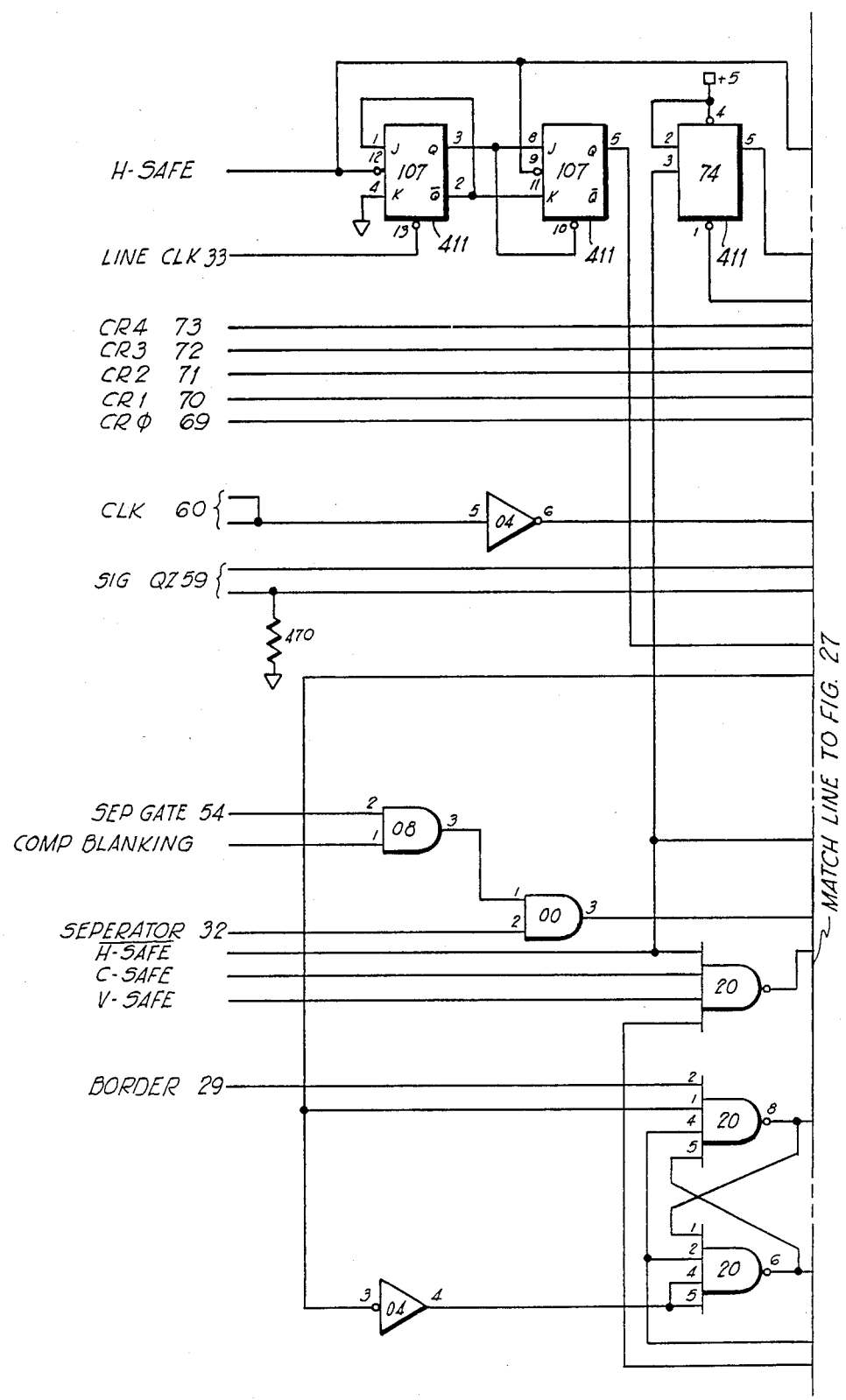

Character Serializer Control Section 409 shown in FIGS. 26-28, receives inter alia, HSAFE signal 387 from Display Area Control Section 377 and clocking information from Display Attribute Buffer Section 371. These signals are input to load timing circuit 411 (FIGS. 26-27), whose output causes crawl position register 413 to be loaded with a five-bit crawl position count from Display Attribute Buffer Section 371. The outputs from register 413 are decoded and latched to provide serializing and timing signals to Character Serializer Section 359, and register load signals to Character Buffer Section 333.

Figure 37:
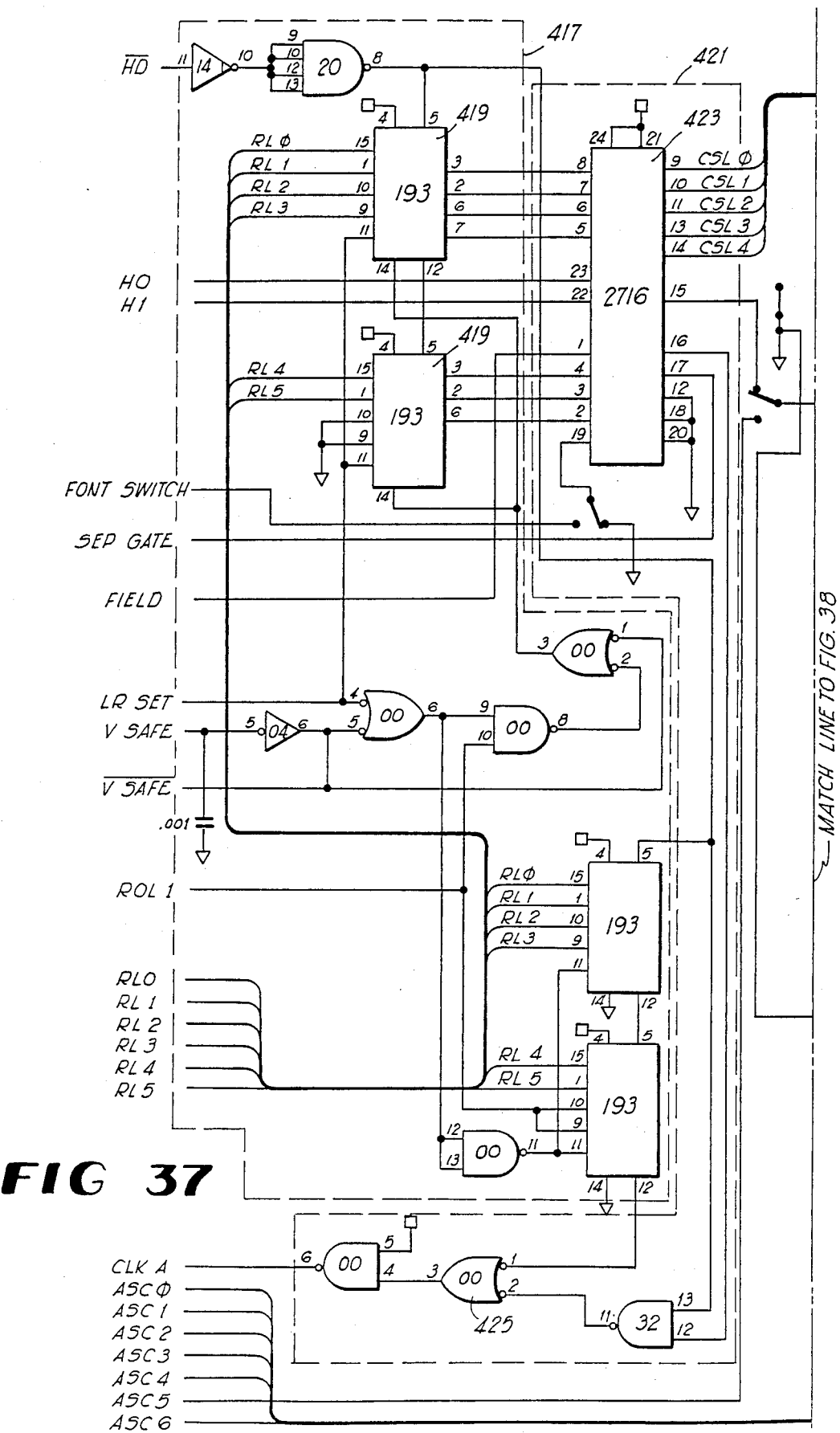
Figure 38:
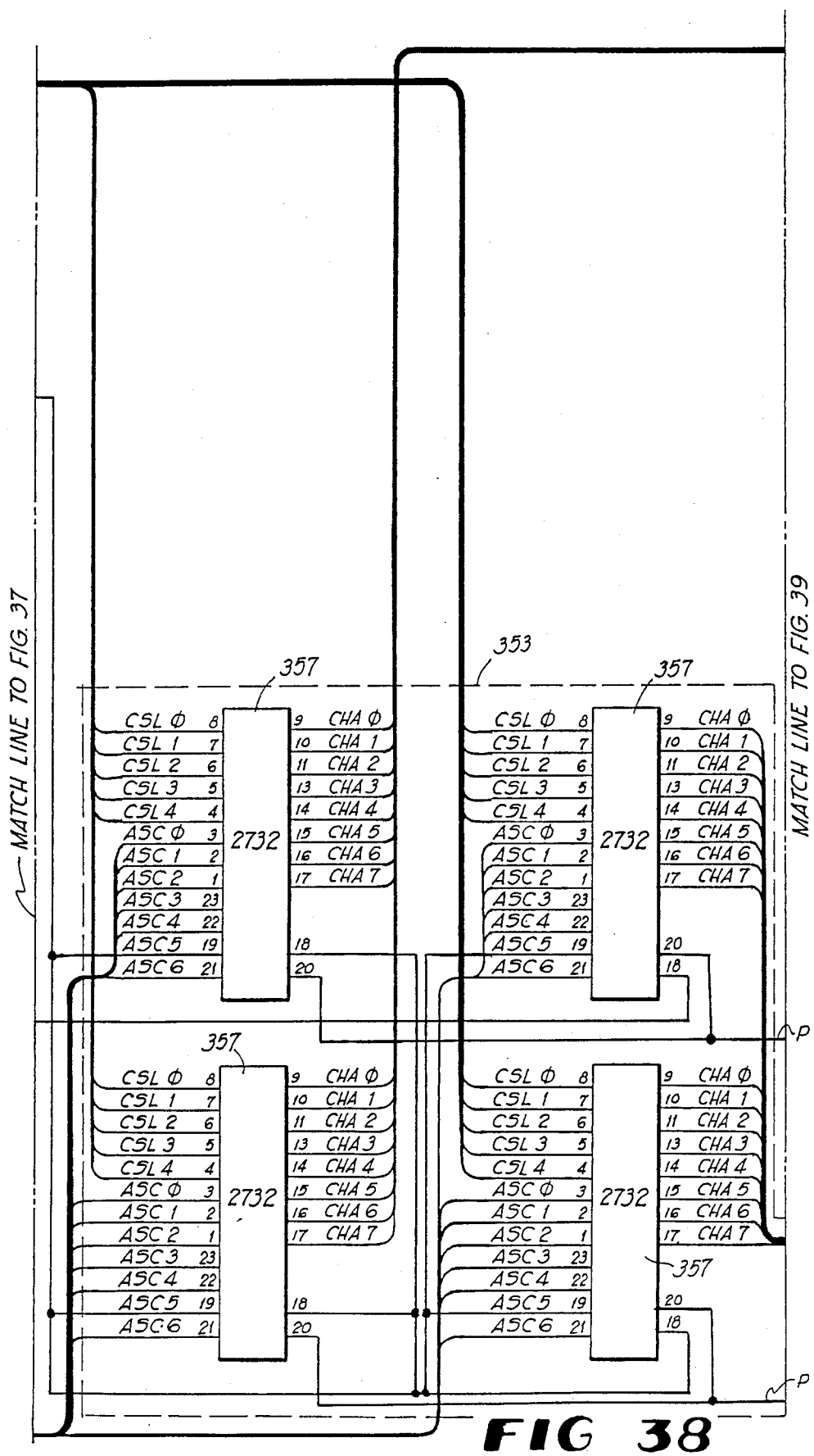

Roll inputs from Display Attribute Buffer Section 371 are loaded into counters 419 of Roll Control Section 417, which Section is shown in FIG. 37. Counters 419 send line count control signals to Character Line Control Section 1. VSAFE signal 379 from Display Area Control Section 377 inhibits counters 419 during the period when characters would fall outside the vertical display area.

Character Line Control Section 421, also shown in FIG. 37, contains a ROM 423 addressed by the line count control signals from Roll Control Section 417, timing signals from Gen Lock and Sync Generator Section 251, and height signals from Display Attribute Buffer Section 371. This section outputs data as follows: five bits provide input addressing to Font Memory Section 353 to allow that section to select the proper scan line; one bit is a separator gate signal to Display Attribute Functions Section 427, and an additional bit identifying the bottom line of the character cell is ORed with a signal from Roll Control Section 417 in OR gate 425, which indicates the bottom line of the roll area, to produce a signal which provides attribute clocking to Display Attribute Buffer Section 371.

Display Attribute Functions Section 427, shown in FIGS. 26-28, receives data from sections of the video teletext and character generator sections mentioned above to provide necessary gating to apply border, reverse, flash and separator attributes to the serial picture element bit stream. The outputs of this section are character switching signals and character picture element black/white control signals. The former are fed to Background Keyer 277, while the latter are fed to Character Keyer Section 279 of the video group. Inputs to the logic circuits of this section include NOT-HSAFE 389, VSAFE 379, and CSAFE 391 from Display Area Control Section 377; separator, border and character off/on from Display Attribute Buffer Section 371; separator gating from Character Line Control Section 421, composite blanking from Gen Lock and Sync Generator Section 251 of the video group and video select signal from Logic Output Section 139 of the teletext group.

Figure 30:
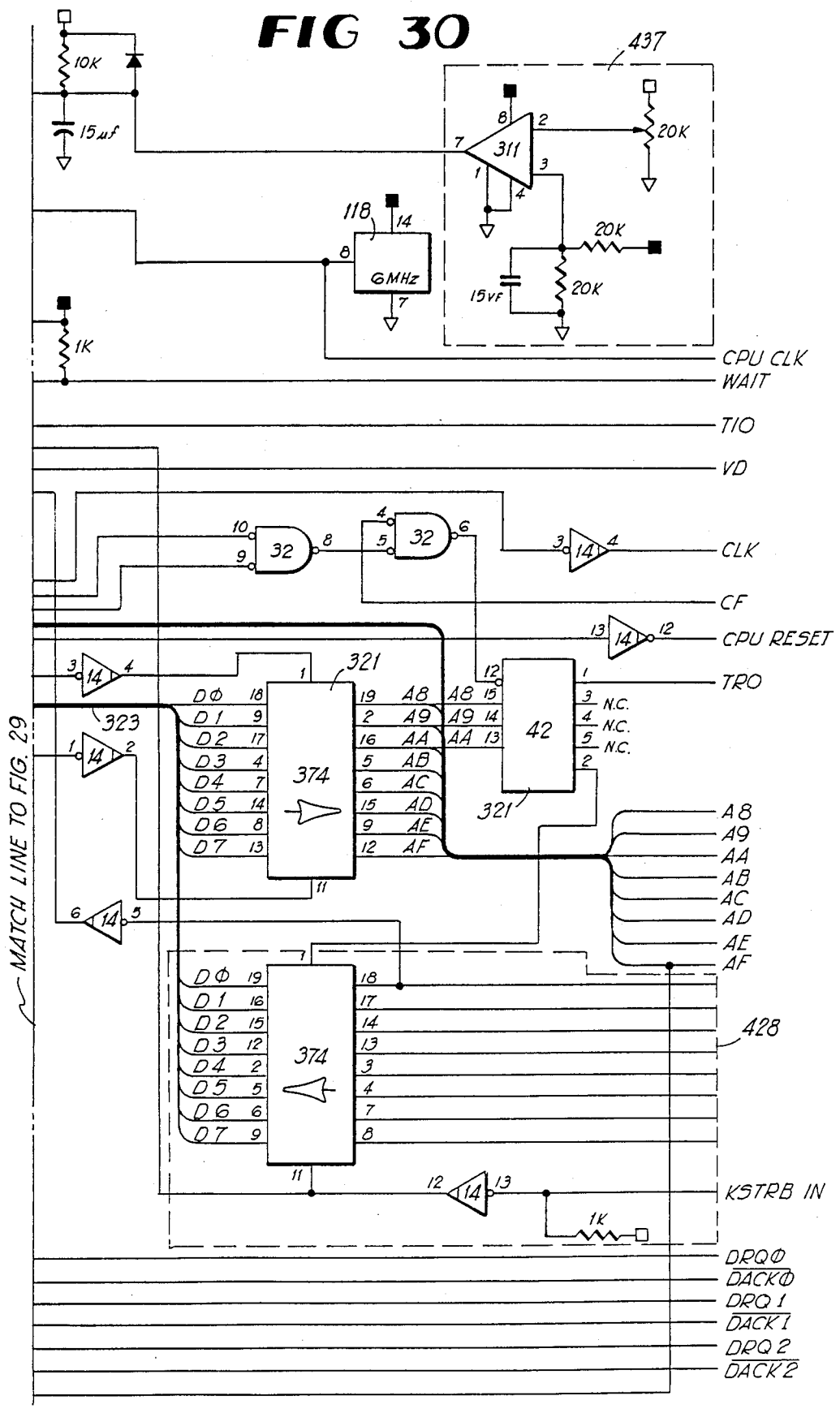
Figure 31:
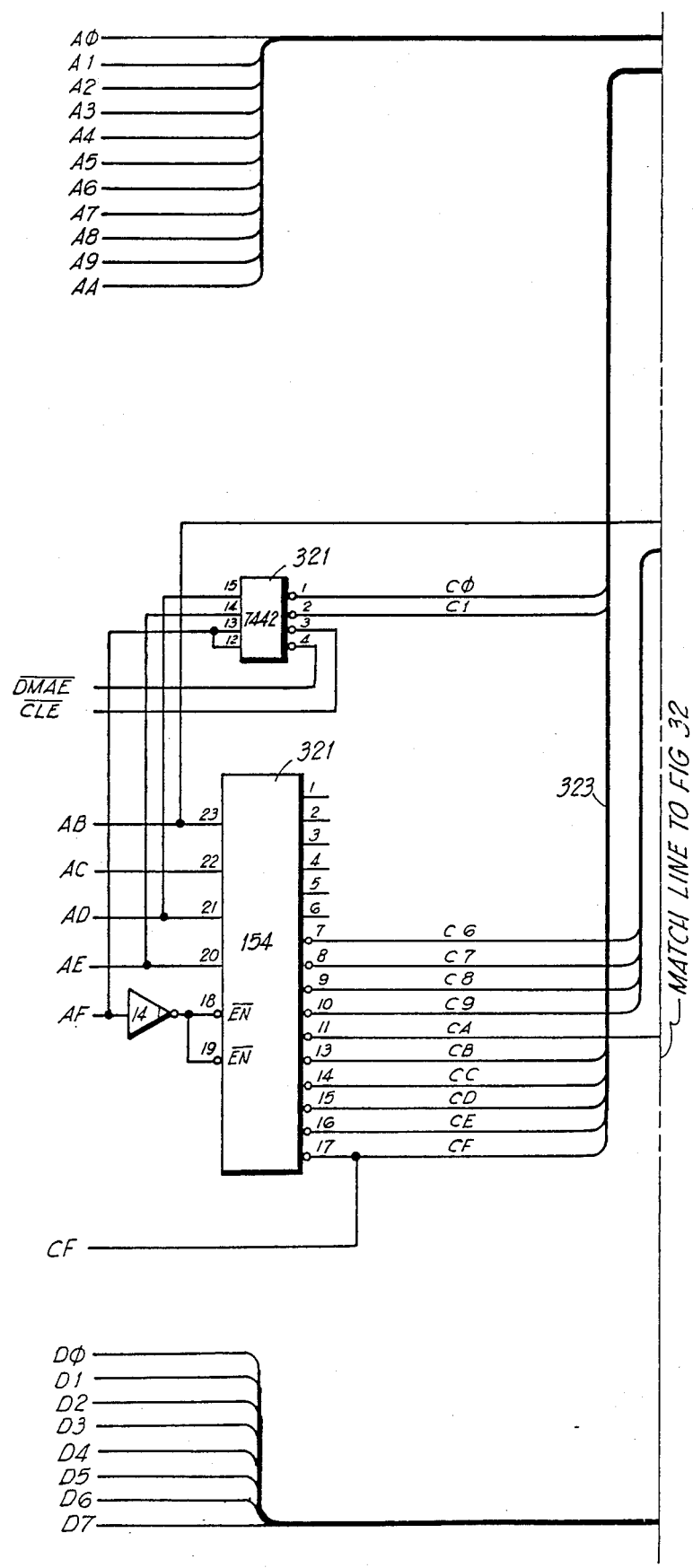

Inputs from an external keyboard such as an RCA VP-601 are made available to secondary common bus 323 of Character Generator Controller Section 313 by Keyboard Input Section 428, shown in FIG. 30. Such keyboard input ability allows local cable operators to (1) set month to date rainfall into the receiver 110; (2) set date and time; and (3) enter and edit text of messages, that will, upon teletext command, crawl across the screen.

Real Time Clock Section 429, shown in FIG. 34, provides date and time of day to secondary common bus 323 of Character Generator Controller Section 313. In the present embodiment, this section comprises a National Semiconductor MM5817-4 real time clock chip 431 which is written to or read from that bus. A 32 KHz crystal 433 provides timekeeping reference to clock chip 431.

In the present embodiment, DC Voltage Fail Detector 437, shown in FIG. 30, implements a voltage comparator whose output becomes active if the Normal 5 volt power supply falls below the Fail-Safe 5 volt power supply by more than five percent. The output of this Section 437 provides reset input to processor 317 of the Character Generator Controller Section 313 of the character generator group.

4. Power Supply Section

The present embodiment of the invention includes a conventional linear power supply having a brown-out detector, with a nominal 117 volt 60 Hz AC input and multiple DC output voltages, as required by the various sections, circuits and components described and shown herein. Also included is a 9.5 volt 6 amp-hour lead-acid storage battery pack, a trickle-charge circuit therefor, and a low battery shut-off circuit.

B. Data Transmission Format

Data is transmitted in accordance with the present invention on lines 14, 15, 16 and 17 of the vertical blanking interval of both video fields of an NTSC video signal, although other lines could also be used, and no analog video signal would be involved in embodiments for transmission of teletext data only. The data rate is nominally 5.7272 megabits per second (i.e., 364 times the NTSC television signal line frequency). At this data rate, 296 bits, which are treated in the present invention as 37 eight-bit bytes, are available per video line. Transmission is in accordance with the U.K. Broadcast Teletext Specification (Sept. 1976), which is incorporated herein by reference.

Referring to FIGS. 40–42, which show line (or row) framing in accordance with the present invention, the first two eight-bit bytes of each 37 byte row are clock run-in bytes and the third byte is a framing code bit. All of these first three bytes are in accordance with the 1976 U.K. Broadcast Teletext Specification. Transmission of bytes in the preferred embodiment of this system is accomplished low order bit first with odd parity, and the eighth bit is the parity bit. Critical system control information is transmitted using Hamming code bytes in which the four low order bits are data bits and the four high order bits are code or "protection" bits. Various conventional Hamming code may be used. Utilization of the Hamming code bytes provides single-bit error correction and double-bit error detection of system control data, and addition of the parity bit provides single bit error detection for text which is transmitted in seven bit ASCII code with the eighth (high order) bit used to establish odd parity. The Hamming code utilized in the preferred embodiment of the present invention is set forth below and followed by the Hamming code byte decode table of the present invention.

| | HAMMING CODE BYTES | | |
|---|---|---|---|
| DECIMAL VALUE | PROTECTION BITS | DATA BITS | HEXADECIMAL CODE |
| 0 | 1000 | 0000 | 80 |
| 1 | 0011 | 0001 | 31 |
| 2 | 0101 | 0010 | 52 |
| 3 | 1110 | 0011 | E3 |
| 4 | 0110 | 0100 | 64 |
| 5 | 1101 | 0101 | D5 |
| 6 | 1011 | 0110 | B6 |
| 7 | 0000 | 0111 | 07 |
| 8 | 1111 | 1000 | F8 |
| 9 | 0100 | 1001 | 49 |
| 10 | 0010 | 1010 | 2A |
| 11 | 1001 | 1011 | 9B |
| 12 | 0001 | 1100 | 1C |
| 13 | 1010 | 1101 | AD |
| 14 | 1100 | 1110 | CE |
| 15 | 0111 | 1111 | 7F |

| HAMMING BYTE DECODE TABLE | | | | | | | | | |
|---|---|---|---|---|---|---|---|---|---|
| A | B | A | B | A | B | A | B | A | B |
| 00 | FF | 30 | 01 | 60 | 04 | 90 | 00 | C8 | FF |
| 01 | FF | 31 | 01 | 61 | FF | 91 | FF | C9 | 09 |
| 02 | FF | 32 | FF | 62 | FF | 92 | FF | CA | 0E |
| 03 | 07 | 33 | 01 | 63 | 03 | 93 | 0B | CB | FF |
| 04 | FF | 34 | FF | 64 | 04 | 94 | FF | CC | 0E |
| 05 | 07 | 35 | 01 | 65 | 04 | 95 | 05 | CD | FF |
| 06 | 07 | 36 | 06 | 66 | 04 | 96 | 06 | CE | 0E |
| 07 | 07 | 37 | FF | 67 | FF | 97 | FF | CF | 0E |
| 08 | FF | 38 | FF | 68 | FF | 98 | FF | D0 | FF |
| 09 | 09 | 39 | 01 | 69 | 09 | 99 | 0B | D1 | 05 |
| 0A | 0A | 3A | 0A | 6A | 0A | 9A | 0B | D2 | 02 |
| 0B | FF | 3B | FF | 6B | FF | 9B | 0B | D3 | FF |
| 0C | 0C | 3C | 0C | 6C | 04 | 9C | 0C | D4 | 05 |
| 0D | FF | 3D | FF | 6D | FF | 9D | FF | D5 | 05 |
| 0E | FF | 3E | FF | 6E | FF | 9E | FF | D6 | FF |
| 0F | 07 | 3F | 0F | 6F | 0F | 9F | 0B | D7 | 05 |
| 10 | FF | 40 | FF | 70 | FF | A0 | 00 | D8 | 08 |
| 11 | 01 | 41 | 09 | 71 | 01 | A1 | FF | D9 | FF |
| 12 | 02 | 42 | 02 | 72 | 02 | A2 | FF | DA | FF |
| 13 | FF | 43 | FF | 73 | FF | A3 | 03 | DB | 0B |
| 14 | 0C | 44 | 04 | 74 | 04 | A4 | FF | DC | FF |
| 15 | FF | 45 | FF | 75 | FF | A5 | 0D | DD | 05 |
| 16 | FF | 46 | FF | 76 | FF | A6 | 06 | DE | 0E |
| 17 | 07 | 47 | 07 | 77 | 0F | A7 | FF | DF | FF |
| 18 | 0C | 48 | 09 | 78 | 08 | A8 | FF | E0 | FF |
| 19 | FF | 49 | 09 | 79 | FF | A9 | 0D | E1 | 03 |
| 1A | FF | 4A | FF | 7A | FF | AA | 0A | E2 | 03 |
| 1B | 0B | 4B | 09 | 7B | 0F | AB | FF | E3 | 03 |
| 1C | 0C | 4C | FF | 7C | FF | AC | 0D | E4 | 04 |
| 1D | 0C | 4D | 09 | 7D | 0F | AD | 0D | E5 | FF |
| 1E | 0C | 4E | 0E | 7E | 0F | AE | FF | E6 | FF |
| 1F | FF | 4F | FF | 7F | FF | AF | DD | E7 | 03 |
| 20 | FF | 50 | 02 | 80 | 00 | B0 | FF | E8 | 08 |
| 21 | 01 | 51 | FF | 81 | 00 | B1 | 00 | E9 | FF |
| 22 | 0A | 52 | 02 | 82 | 00 | B2 | 06 | EA | FF |
| 23 | FF | 53 | 02 | 83 | FF | B3 | FF | EB | 03 |
| 24 | 04 | 54 | FF | 84 | 00 | B4 | 06 | EC | FF |
| 25 | FF | 55 | 05 | 85 | FF | B5 | FF | ED | 0D |
| 26 | FF | 56 | 02 | 86 | FF | B6 | 06 | EE | 0E |
| 27 | 07 | 57 | FF | 87 | 07 | B7 | 06 | EF | FF |
| 28 | 0A | 58 | FF | 88 | 00 | B8 | 08 | F0 | 08 |
| 29 | FF | 59 | 09 | 89 | FF | B9 | FF | F1 | FF |
| 2A | 0A | 5A | 02 | 8A | FF | BA | FF | F2 | FF |
| 2B | 0A | 5B | FF | 8B | 0B | BB | 0B | F3 | 03 |
| 2C | FF | 5C | 0C | 8C | FF | BC | FF | F4 | FF |
| 2D | 0D | 5D | FF | 8D | 0D | BD | 0D | F5 | 05 |
| 2E | 0A | 5E | FF | 8E | 0E | BE | 06 | F6 | 06 |
| 2F | FF | 5F | 0F | 8F | FF | BF | FF | F7 | FF |
| | | | | | | C0 | 00 | F8 | 08 |
| | | | | | | C1 | FF | F9 | 08 |
| | | | | | | C2 | FF | FA | 08 |
| | | | | | | C3 | 03 | FB | FF |
| | | | | | | C4 | FF | FC | 08 |

HAMMING BYTE DECODE TABLE -continued

| A | B | A | B | A | B | A | B | A | B |
|---|---|---|---|---|---|---|---|---|---|
|   |   |   |   |   |   | C5 | 05 | FD | FF |
|   |   |   |   |   |   | C6 | 0E | FE | FF |
|   |   |   |   |   |   | C7 | FF | FF | 0F |

Columns
A - Received Data
B - Value (value of FF = Multi-bit Error)
All values are hexadecimal. Data 00 is likely to occur erroneously as a result of terresterial microwave interference with the received satellite signal. Therefore, 00 is treated as a double-bit error even though it represents only a single-bit Hamming code error.

FIGS. 40–42 present block diagrams showing the byte utilization of text page lines, and the following describes the row framing and significance assigned to bits within each row together with part of the control logic operation. Each text page comprises ten lines or rows numbered zero through nine. The first line (row zero) of each page is a page header, and each page is numbered. Page number zero is reserved so that a call for its display can be used to indicate that no text is to be displayed. Accordingly, the page header (row zero) for page zero is available for use in transmitting date and time information to accomplish clock correction within each addressable receiver of the present invention. As stated above, each of the rows comprises 37 bytes, which are numbered 1–37 in FIGS. 40–42.

The row number of every row, comprising byte 3, is a four bit binary number having a decimal range of 0 to 9. Zero identifies the row as a header. A value of 1 to 9 identifies a line of text and specifies its sequence in the page.

i. Page Header Row

Each page header includes a text line count field or byte, number 17. A text line count is treated as an attribute of the page to inhibit display of higher numbered lines. This eliminates the need to "clear" unused trailing lines in the memory in RAM 329 in Display and Programming Memory Section 327 of the character generator group of sections. If more than nine lines of text are needed to make up a single text display, sequentially numbered pages can be chained together. When this is done, the lowest page number in the chain will be used to call for a display of the text.

Referring to FIG. 40, bytes 4–37 of the page header, which include critical control information, are all Hamming code bytes. Similarly, bytes 4 and 5, which are the row number and heighth/width bytes of page text rows 1–9 are Hamming code bytes. Bytes 3–37 of the date/time row (row zero, page zero) are also Hamming code bytes.

Referring again to FIG. 40, the page header (row zero) for a text page includes in bytes 5–8 an "Output Mode Control Word" (abbreviated "OMCW") which is the mechanism for exercising real-time control over the "on-air" transmission at all receivers 110. As stated above, the four high order bits of each byte are Hamming code bits. The OMCW subfields containing data bits are, left to right, as follows:

a. A "Local Program" one bit flag is used in conjunction with a local video presence signal 268 from Local Video Section 267 to select the on-air audio and video source and to activate a corresponding LED 133 in LED Display Output Section 131 and solid state switches 147 in Logic Output Section 139. If the "Local Program" bit is on (i.e., "1") and local video is present then:
  1. local video is selected,
  2. local audio is selected regardless of the state of the Special Audio bit (described below),
  3. the local program LED 133 is turned on,
  4. the local program solid state switch 147 is turned on, and
  5. all character generator group output is suppressed regardless of other indications in the OMCW.

If the Local Program bit is off (i.e., "0"), or local video is not present, then:
  1. satellite video is selected,
  2. satellite audio is selected unless the Special Audio bit is on,
  3. the local program LED 133 is turned off
  4. the local program solid state switch 147 is turned off.
  5. character generator group output is as called for in the balance of the OMCW.

b. A "Local Pre-roll" one bit flag activates (0=off; 1=on) an isolated external control circuit 147 which may be used to cue-up a video recorder machine.

c. An "Auxiliary Audio" one bit flag selects the auxiliary local audio input as the on-air source, overriding the audio source specified by the Local Program bit. It also activates an isolated external control circuit which may be used to control a local audio source and LED indicator. Thus, 0=Audio follows video, and 1 =Auxiliary Audio over-ride.

d. An "Alarm" or "Weather Warning" one bit flag (0=off; 1=on) activates an electromechanical relay and an isolated external control.

e. A "Radar" one bit flag is used in conjunction with the local video present detector to select the local video source and to activate a solid state switch which may be used to turn on a video signal depicting a radar picture. It never affects the on-air audio source. If the Radar bit is on (i.e., = 1) and the local program bit is off and local video is present then:
  1. local video is selected,
  2. the radar solid state switch is turned on, and
  3. all character generator output is suppressed regardless of other indications in the OMCW.

If any of the conditions above are not met then the local program bit prevails.

f. A "Region Separator" one bit flag (0=on; 1=off) acts as the separator attribute of the first text line of the bottom text region.

g. A "Top Solid Background" one bit flag (0=titleover; 1=solid background) selects either titleover or solid color background display of text in the upper text region.

h. A "Bottom Solid Background" one bit flag (0=title-over; 1 =solid background) selects either titleover or solid color background display of text in the lower text region.

i. A "Top Text Page" six-bit binary number specifies the page to be displayed in the upper text region. Page number "0" is a pseudo-page of zero lines.

j. A "Bottom Text Page" two-bit binary number specifies the text to be displayed in the bottom text region. Bottom Text Page=0 is a pseudo-page of zero lines, = 1 means display date/time and weather instruments readings; =2 means display local crawl, and other numbers could be assigned other significances.

Bytes 9 and 10 are the "Page Number," an eight bit binary page number in the range 0 to the maximum number of pages. Page 0, Row 0, as stated above, is utilized as a date/time record.

The "Address" field, bytes 11-16, comprising twenty-four data bits (in addition to twenty-four Hamming Code Bits) allows a plurality of receivers 110 to be organized and addressed hierarchically for purposes of receiving and processing satellite video and teletext data. Thus, certain teletext messages may be addressed only to, and stored and processed only by, a particular receiver 110 (a "Unit") or a group or groups of receivers 110 ("County," "Zone" and "Service". In accordance with this ability, the address is a hierarchical structure of four sub-fields which are, left to right: "Service" (3 bits), "Zone" (10 bits), "County" (5 bits), and "Unit" (6 bits). The address of each receiver may consist of Service 001 and twenty-one bits, representing the remaining sub-field values, set into receiver 110 switches 127 in Switch Input Section 123, thereby utilizing only three levels of hierarchical addressibility. Address matching proceeds one sub-field at a time, from left to right. If a received sub-field contains a value of zero, that sub-field and all succeeding sub-fields are considered to match the corresponding subfields of the receiver without further comparison. Thus, for instance, an address containing a value of zero for "County" would match all receivers having the "Zone" of that address.

Byte 17 is the "Line Count," a four bit binary number in the range 0 to 9 establishing the line count attribute for display and the highest row number to be received in the current page.

Bytes 18 and 19 are "Page Attributes," a collection of one bit display attributes and one bit mode change commands. These mode change commands provide the only mechanism for forcing a change in operating mode on an addressable basis, since in the NORMAL mode (described below) the OMCW is processed independent of the destination address of the rest of the message. The eight Page Attribute bits are utilized, reading left to right, in the described embodiment as follows:

a. An "Unused" bit is reserved for future use.
b. A "Freeze" bit forces a transition into FREEZE mode.
c. A "Weather Advisory" bit forces a transition into ADVISORY mode.
d. A "Weather Warning" bit forces a transition into WARNING mode.
e. An "Unused" bit is reserved for future use.
f. A "Flip" bit indicates that the display of any chained pages will be accomplished by successive display of one page at a time.
g. A "Roll" bit indicates that the display of any chained pages will be accomplished by continuous text roll.
h. A "Chain" bit indicates that the next higher numbered page is logically attached to this page.

"Line Attributes" occupy nine successive fields of two bytes each, bytes 20 through 37. Each two-byte field contains display attributes for its corresponding text line. Left to right these are:

a. A "Separator" bit that indicates the display of a solid separator bar above the corresponding line of text.
b. A "Flash" bit that indicates that the text will flash off and on.
c. A "Reverse" bit that indicates that any text or separator will appear in black rather than white and that the character borders, if present, will be white rather than black.
d. A "Border" bit that indicates a contrast border around the edges of the characters.
e. A four bit "Color" code that indicates the background color associated with the line.

ii. Date/Time Row

The Date/Time Row (Row 0, Page 0) utilizes the framing described for a page header for its first ten bytes. Byte 11 of the Date/Time (Row 0, Page 0) line is "Time Zone" indicating the time zone that the accompanying date and time apply to, utilizing a three bit code designating time zone and whether daylight savings time is to be used.

Byte 12 is the day of the week; byte 13 is the month of the year; bytes 14 and 15 are the day of the month. Byte 16 is the hour of the day, byte 17 and 18 the minute, bytes 19 and 20 the second, and byte 21 communicates AM or PM.

As indicated in FIG. 42, subsequent bytes of the Date/Time (Row 0, Page 0) line may be used for alternative date and time information and are available for other purposes.

iii. Text Page Rows 1 through 9

Rows 1 through 9 utilize byte 5 to transmit the text line height and width in a four-bit code designating character height and width attributes for each line as follows:

Height

00=Single height
01=Double height
10=Triple height
11=Quadruple height

Width

00=Single width (32 characters/line)
01=1⅓ width (24 characters/line)
10=Double width (16 characters/line)
11=Quadruple width (8 characters/line)

The following 32 bytes (bytes 6-37) are used for row (i.e. text line) characters 1-32.

C. Receiver Modes

The system of the present invention contemplates receiver operation, under network control, in one of seven operative modes accomplished by receiver 110 response to the "Active" OMCW and mode change commands in Page Attributes bytes. Unique logical rules for updating that Active OMCW are the most significant functional difference between modes. The Active OMCW is that OMCW contained at a given time in the System Control Section 111.

At any time that the receiver is operational it will process all text pages addressed to it. This continues in all modes, and can result in changes to text that is currently being displayed.

Upon power-up of receiver 110, either the NOSAT mode or RESET mode is entered. If a test of RAM and the clock indicate that both are valid then NOSAT mode is entered; otherwise, RESET mode is entered;

both modes are further described in the following description of the modes.

i. Normal Mode

The NORMAL mode is entered from the NOCTL mode when the received OMCW is synchronized with the Active OMCW. Thus the NORMAL mode is the most common state of the receiver. In this mode, each error-free OMCW recovered twice from the received teletext data stream immediately replaces the Active OMCW.

The NORMAL mode will be exited, and the indicated mode entered, under any one of the following conditions:

1. Loss of satellite video. NOSAT mode is entered.
2. Failure to receive an error-free OMCW from the teletext data stream for one second. NOCTL mode is entered.
3. Receipt of the last line of a text page that has the Weather Warning bit "on" in the Page Attributes field of its header. WARNING mode is entered.
4. Receipt of the last line of a text page that has the Weather Advisory bit "on" in the page Attribute field of its header. ADVISORY mode is entered.
5. Receipt of the last line of a text page that has the Freeze bit "on" in the Page Attributes field of its header. FREEZE mode is entered.

ii. NOSAT Mode

The NOSAT mode is entered from NORMAL or NOCTL mode when the receiver detects the absence of satellite video. It can also be entered from RESET mode or entered directly upon power-up if a test of the RAM and the clock indicate that both are valid.

Upon entry into NOSAT mode the Active OMCW is forced to 2705-hex. This provides for bottom display of the local weather instruments and top display of the local forecast, which always begins on page one. Both are displayed on solid color backgrounds with a separator between them. In addition, the special audio input source is activated and switched on-air.

NOSAT mode will be exited to the mode indicated under either of the following conditions:

1. Restoration and retention for one second of satellite video. NOCTL mode is entered.
2. Three hours elapse in NOSAT mode. RESET mode is entered.

iii. NOCTL Mode

The NOCTL mode is entered from NORMAL mode when no error-free OMCW is received for one second. It can also be entered as part of the exit procedure from other modes. Upon entry into NOCTL mode, the Active OMCW is forced to 0001-hex. This provides for satellite audio and video with bottom title-over of the local weather instruments.

NOCTL mode will be exited to the mode indicated under any one of the following conditions:

1. Loss of satellite video. NOSAT mode is entered.
2. Recovery of an error-free OMCW with the Local Pre-roll bit "off." NORMAL mode is entered.
3. Receipt and storage of the last line of a text pag that has the Weather Warning bit "on" in the Page Attributes field of its header. WARNING mode is entered.
4. Receipt and storage of the last line of a text page that has the Weather Advisory bit "on" in the Page Attributes field of its header. ADVISORY mode is entered.
5. Receipt of the last line of a text page that has the Freeze bit "on" in the Page Attributes field of its header. FREEZE mode is entered.

iv. WARNING Mode

The WARNING mode is entered from the NORMAL, NOCTL or ADVISORY modes upon receipt and storage of the last line of a text page that has the Weather Warning bit "on" in the Page-Attributes field of its header.

Upon entry into the WARNING mode, the Active OMCW is forced to 00010011xxxxxx01-binary, where xxxxxx is the number of the page that invoked the WARNING mode. This provides for top display of the warning message text and bottom display of the local weather instrument data, both on solid color background. In addition it activates the external alarm circuits. Upon entry into the WARNING mode, the audio beeper is activated for a period of ten seconds.

If satellite video is lost while in WARNING mode the Special Audio bit will be turned "on" in the Active OMCW, and the WARNING mode will continue to normal conclusion.

The WARNING mode is exited, and the indicated mode entered under any one of the following conditions:

1. A new header that has both the Weather Warning and Weather Advisory bits "off" in the Page Attributes field is received for the same page number that invoked the mode. NOCTL mode is entered.
2. A new header that has the Weather Warning bit off and the Weather Advisory bit "on" in the Page Attributes field is received for the same page number that invoked the mode. ADVISORY mode is entered.
3. Two minutes elapse without the occurance of condition (1) or (2) above. NOCTL mode is entered.

v. ADVISORY Mode

The ADVISORY mode is entered from NORMAL, NOCTL, or WARNING mode upon receipt and storage of the last line of a text page that has the Weather Advisory bit "on" in the Page Attributes field of its header. Upon entry into ADVISORY mode the Active OMCW is forced to 00000011xxxxxx01-binary, where xxxxxx is the number of the page that invoked the ADVISORY mode. Since the Alarm bit is "off" in the OMCW, the external alarm circuits are not activated.

If satellite video is lost while in the ADVISORY mode, the Special Audio bit will be turned "on" in the Active OMCW, and the ADVISORY mode will continue to normal conclusion.

ADVISORY mode is exited, and the mode indicated entered, under any one of the following conditions:

1. A new header that has the Weather Warning and Weather Advisory bits "off" in the Page Attributes field is received for the same page number that invoked the mode. NOCTL mode is entered.
2. A new header that has the Weather Warning bit "on" and the Weather Advisory bit "off" in the Page attributes field is received for the same page number that invoked the mode. WARNING mode is entered.
3. Two minutes elapse without the occurance of condition (1) or (2) above. NOCTL mode is entered.

vi. RESET Mode

The RESET mode is entered upon power-up if a test of memory and the clock indicate that either is not valid. It may also be entered upon exit from NOSAT mode.

Upon entry into RESET MODE, the Active OMCW will be forced to 2300-hex. Then the Line Count is set to zero and the Chain attribute turned "off" in every text page. "Temporarily Unavailable" text pages, including their attributes, will then be moved from ROM into the page one through page five RAM area. The date and time display will be filled with ASCII "space" characters. Finally, RESET mode is exited and NOSAT mode is entered. (Note: In the case of an extended absence of satellite video, the system will loop between the NOSAT mode and the RESET mode, with RESET being entered once every three hours).

vii. FREEZE Mode

The FREEZE mode is entered from the NORMAL or NOCTL mode upon receipt and storage of the last line of a text page that has the Freeze bit "on" in the Page Attributes field of its header. Upon entry into FREEZE mode the Active OMCW is forced to 00000011xxxxxx00-binary, where xxxxxx is the number of the page that invoked FREEZE mode. This provides for top display of the text message and an empty bottom display, both on solid color background.

The FREEZE mode is exited only when a new header that has the FREEZE bit "off" in the Page Attributes field is received for the same page number that invoked the mode. Then, NOCTL mode is entered.

D. Receiver System Control or Teletext Program

The system control or teletext program, written in Intel 8085 Macro Assembly Language, is assembled and the resulting machine code stored in a ROM chip for inclusion in receiver 110. The complete assembly listing appears below. The main body of this program, which is entered as a result of a CPU hardware reset, performs certain system initialization functions and then repeatedly executes a loop consisting of various housekeeping chores. The balance of the program consists of interrupt service routines that are invoked by hardware interrupts, which occur asynchronously with respect to execution of the main program body, and by software RST instructions.

Main Program Body

Entry to this routine is through the 8085A reset vector address. The program begins system initialization by setting the stack pointer to the base address of the stack. Next, the alarm relay and all of the solid state switches are turned off and the satellite video signal is selected. Then the front panel LEDs are turned off and a delay loop of approximately two seconds' duration is entered to allow the rest of the receiver hardware to stabilize. The 32 switch inputs are then read and saved and all maskable interrupts are disabled.

A group of software controlled timers are then zeroed. All of these timers will subsequently be counted in half-second intervals. Since no half-second clock exists in the system, one is simulated using the TRAP interrupt which occurs at NTSC television vertical frequency (59.94 Hz) and a software counter that is initialized here for 30 counts.

Next a group of flags is initialized. Then a buffer that is used to format weather sensor readings is intialized and the first sensor input values are read and placed in the buffer. The USART control registers are then initialized to enable serial data communications. The program then performs set-up of the DMA Controller for subsequent teletext data storage. A value corresponding to a received double bit error is placed into the row number field of each line of the four-line teletext data buffer in memory. This insures that the contents of a line buffer will later be discarded by the program if no teletext data is received in the corresponding line of the satellite video signal.

Initialization continues with the sending of a reset message across the inter-processor link to the character generator control processor. Finally, the necessary actions are taken to establish NOSAT mode.

The main program then enters a loop where it will remain as long as the receiver continues in operation. In this loop the software timer for the audio beeper is checked. If it is active and its maximum count has been reached, the beeper is turned off. The 32 switch inputs are then read.

The Normal/Test mode switch is then checked. If it is in the test position a message is output to the teletext Serial to Parallel Converter Section where it will be used instead of a recovered teletext data stream. After the message has been output, a call to the RST5.5 vector address simulates an end of teletext interrupt. This concludes the test mode action and control is transfered back to the beginning of the loop.

If the Normal/Test mode switch is in the normal position, the Remote Sensors switch (one of the 32 switches read above) is checked. Provision is made at this point to add code to process weather sensor readings from remote sensors via the Serial Data Communications Section. If remote sensors are not being used, a software controlled timer is checked, and if it has expired the local weather sensors are read, a sensor message is formatted, and a flag is set to indicate that the sensor message is ready for transmission to the Character Generator Controller processor. Control is then returned to the beginning of the loop.

RST1 Routine

This software invoked routine saves the status of all of the 8085A registers on the stack.

RST2 Routine

This software invoked routine restores the previously saved status of the 8085A registers from the stack.

RST3 Routine

Unused.

RST4 Routine

Unused.

TRAP Routine

This is a hardware interrupt service routine. It is entered at the beginning of each vertical sync pulse (VDRIVE) from the Gen Lock Section. For proper system operation, the execution time of this routine must be short enough that it will be completed before the occurance of the RST5.5 interrupt caused by the sync pulse of video line 18. This routine must therefore complete in less than 1.08 milliseconds.

This routine first saves the processor state. Since the 8085A TRAP interrupt cannot be masked, a check is made to see if the main program is still performing initialization. If so, the processor state is restored and this routine is exited. Otherwise the routine continues.

All timers that use 1/60 second counts are incremented. If the ½ second interval counter has expired, it is reset and all of the timers that use ½ second counts are incremented. The satellite video present detector is read. If satellite video is not present and the system is not in NOSAT mode, WARNING MODE or ADVISORY mode, then NOSAT mode is established. If satellite video is not present and the system is already in NOSAT mode, the three hour timer is checked. If it has expired, a reset message is sent to the Character Generator Control processor to cause reinitialization of all stored text pages.

If video is present and the system is in NOSAT mode, the video present software timer is checked. If video has been present for one second, then NOSAT mode is exited and NOCTL mode is established.

If video is present and the system is in WARNING mode or ADVISORY mode, the two minute software warning and advisory timer is checked. If it has expired, the current mode is exited and NOCTL mode is established.

If video is present and the system is in NORMAL mode, the good OMCW software timer is checked to determine if a full second has elapsed without receiving a valid OMCW. If it has, then NORMAL mode is exited and NOCTL mode is established.

In all cases, this routine concludes by checking a five second software timer to determine if it is time to send sensor readings to the Character Generator Control processor. If so, it sets a flag and resets the timer. Finally the processor state is restored and the TRAP routine is exited.

RST5 Routine

Unused.

RST5.5

Routine This is a hardware interrupt service routine. It is entered at the beginning of the horizontal sync pulse for video line 18 as indicated by the signal WEN. It is this routine that processes received teletext data. Its execution must be completed before the next TRAP occurs. Execution must therefore not require more than 15.6 milliseconds.

This routine first saves the state of the processor on the stack and resets the signal that invoked it. It then checks to see if local video is present and sets an LED to so indicate. If local video is not present a check is made to determine if local video is currently selected. If so, it is deselected, satellite video is selected and the remaining functions of the current OMCW are appropriately activated.

A processing loop is then entered which will be executed four times, once for each of the four teletext data lines contained in the current video field. The ROW NUMBER field is de-hammed by table look-up. If the ROW NUMBER contains a double bit error then a flush flag is set so that the balance of the current message will be ignored and no further processing of this line is performed.

If the row number is zero then the OMCW, the ADDRESS and the PAGE NUMBER are de-hammed and packed. If the PAGE NUMBER contains a double bit error the flush flag is set and no further processing of this line is performed. If the PAGE NUMBER is zero, then this line is a DATE/TIME message and it is processed accordingly and sent to the Character Generator Control processor if its TIME ZONE field matches the code in the corresponding three switches of the switch inputs.

If the ROW NUMBER is zero, but the PAGE NUMBER is not zero, then this line is the header for a text message and it also contains an OMCW. In this case the OMCW is now processed. If it is error free and matches the last received OMCW then the current system mode is checked. If the system is in NORMAL mode, then the new OMCW is saved as the current OMCW and all of the conditions it specifies are established. If the system is in NOCTL mode and the newly received OMCW value has both its LOCAL PROGRAM and LOCAL PREROLL bits off then NOCTL mode is exited, NORMAL mode is established, the new OMCW is saved as the current OMCW and the conditions it specifies are established.

It is important to note that this OMCW processing occurs regardless of the contents of the ADDRESS field, and thus provides simultaneous real-time control of all of the receivers 110 in a network.

Processing of a line with ROW equal zero and PAGE not equal zero continues with the already de-hammed ADDRESS field. If this field contains any double bit errors then the flush flag is set and the balance of the line is not processed. Otherwise, hierarchical address checking is performed. This is done by left to right processing of the subfields SERVICE, ZONE, COUNTY and UNIT. For each subfield of the message address, the subfield is tested for a value of zero. If it is not zero it is compared to the corresponding sub-field of the receiver's address. If the message subfield is either zero or equal to this receiver's value then the sub-field is considered to be "matched." If all sub-fields are "matched" then the text message is for this receiver, so the flush flag is turned off, the "Unit Addressed" LED is turned on and processing of the balance of this line and of the ensuing lines of this message will be performed. If any sub-field fails to be "matched" then the flush flag is turned on, the "Unit Addressed" LED is turned off and the balance of this line is not processed further.

If the message is addressed to this receiver then the balance of the line is de-hammed and used to create a page header message which is sent to the Character Generator Control processor. The saved row number is set to zero, and the processing of the line is completed.

If the received line has a non-zero ROW NUMBER the flush flag is tested. If it is on then no further processing of this line is performed. If it is off and the received ROW NUMBER is not greater than the previously saved row number then the flush flag is turned on and no further processing of this line will be performed. If the flush flag is off and the ROW NUMBER is greater than the previously saved row number then the new ROW NUMBER value becomes the saved value and the line is processed. This is done by de-hamming the HEIGHT/WIDTH field and then sending the line to the Character Generator Control processor.

For all of the previously mentioned conditions, if the flush flag is on or is turned on then the received line does not have to be sent to the Character Generator Control processor. This creates an available period of time that is used to send a sensor message to the Character Generator Control processor if the main program has set the sensor message ready flag. Whenever a sensor message is sent, the ready flag is cleared.

After processing all four teletext lines in the above processing loop, this interrupt service routine performs the necessary initialization for the next DMA operation, restores the processor status from the stack and exits.

RST6 Routine

Unused.

RST6.5 Routine

This is a hardware interrupt service routine which is entered whenever the USART in the Serial Data Communications section completes the sending or receiving of a character.

RST7 Routine

Unused.

RST7.5 Routine

This hardware interrupt service routine is entered as the result of the Character Generator Control processor acknowledging receipt of a transfer of data across the interprocessor link. The RST7.5 interrupt is in fact masked at all times so that the routine is never actually entered. Instead, the RST7.5 interrupt pending status is used as a flag to synchronize transmission to the Character Generator Control processor.

The system control or teletext program utilized in the preferred embodiment of the present invention is found at frames 2-57 (pages 47-102) of the above-referenced Microfiche Appendix which forms a part of this document.

E. Receiver Character Generator Control Program

The Character Generator Control Program, written in Intel 8085 Macro Assembly Language, is assembled and the resulting machine code stored in a ROM chip for inclusion in the receiver. The complete assembly listing appears below. The main body of this program, which is entered as the result of a CPU hardware reset, performs certain system initialization functions and then repeatedly executes a loop consisting of various housekeeping chores. The balance of the program consists of interrupt service routines that are invoked by hardware interrupts, which occur asynchronously with respect to the main program body, and by software RST instructions.

Main Program Body

Entry to this routine is through the 8085A reset vector address. After performing system initialization the program enters a loop which is executed continuously. Within the loop the program checks for changes in the current OMCW and establishes the conditions specified by any change. In addition the program monitors the keyboard data input buffer for newly entered characters. If characters have been entered from the keyboard, the specified action is taken.

RST1 Routine

This software-invoked routine saves the status of all of the 8085A registers on the stack.

RST2 Routine

This software-invoked routine restores the previously saved status of the 8085A registers from the stack.

RST3 Routine

This software-invoked routine saves the status of the DE and HL register pairs on the stack.

RST4 Routine

This software-invoked routine restores the previously saved status of the DE and HL register pairs from the stack.

TRAP Routine

This is a hardware interrupt service routine. It is entered at the beginning of each vertical sync pulse (VDRIVE) from the Gen Lock Section. This routine initializes the DMA channels for screen updates. Screen refresh buffers are alternated in this routine so that changes in the screen display can be prepared in one buffer while the contents of another buffer is being displayed. This routine prepares the screen refresh buffer by calling a separate subroutine for each display region on the screen.

RST5 Routine

Unused.

RST5.5 Routine

This is a hardware interrupt service routine. It is entered each time a key is struck on the external keyboard. This routine reads a character from the keyboard when the corresponding key has been pressed. In addition, it implements an auto-repeat function so that holding down a key on the keyboard will cause repeated entry of the same character. The characters received from the keyboard are placed in a keyboard buffer.

RST6 Routine

Unused.

RST6.5 Routine

This is a hardware interrupt service routine. It is entered each time data from the System Control Processor is available. The received message, which will be stored as appropriate, will be of one of the following types:
1. OMCW
2. Page Header
3. Text Line
4. Date and Time
5. Weather Sensors
6. Reinitialize
7. Clear Screen

RST7 Routine

Unused.

RST7.5 Routine

This is a hardware interrupt service routine. This routine is entered as a result of completion of a DMA operation. This will occur at the end of each screen display region. The routine initializes DMA for the next display region.

The assembly listing for the receiver 110 character generator control program utilized in the preferred embodiment of the present invention is found at frames 61-244 (page 106-288) of the above-referenced Microfiche Appendix which forms a part of this document.

The foregoing description of the preferred embodiment of the present invention is for purposes of explanation and illustration. It will be apparent to those skilled in the art that modifications and changes may be made to the invention as described without departing from its scope and spirit. For instance, changes may be made to the format of video and/or teletext data utilized by the invention, to the program or assembly language utilized by either or both processors or to various components or circuits utilized in the invention. Similarly, various components, circuits and concomitant assembly language of programs may be substituted or added without departing from the scope and spirit of the present invention, including, for instance, substitution of processors and other components having 16 bit capacity, or components having larger memory capacity, or alternative components such as amplifiers and character generators.

We claim: .

1. An addressable receiver for receiving a composite video and digital data signal, transmitting video output signals and controlling external devices, comprising:
   a. means for processing the composite video and digital data signal into a first video signal available for receiver output, a synchronization signal available for receiver output and a serial digital data stream for controlling the receiver,
   b. means for processing the digital data stream to recognize within such stream control words,
   c. means for storing digital data contained in the digtal data stream,
   d. means for converting stored digital data into a second video signal containing characters and available for receiver output,
   e. means responsive to the control words for controlling the receiver output.

2. An addressable receiver in accordance wiht claim 1, further comprisng means for combining the first and second video signals into an output signal.

3. An addressable receiver in accordance with claim 1, further comprising:
   a. means for receiving a third video signal,
   b. means for combining the first or third and the second video signals into an output signal, and
   c. means for retransmitting the synchronization signal.

4. An addressable receiver in accordance with claim 1, further comprising:
   a. means for processing at least one of the control words into at least one control signal, and
   b. means for transmitting said at least one control signal.

5. An addressable receiver in accordance with claim 1, further comprising:
   a. means for receiving a second data
   b. means for processing the second data signal into a fourth video signal containing characters, and
   c. means for combining the first or third and either or both the second and fourth video signals into an output signal.

6. An addressable receiver in accordance with claim 1 further comprising means for recognizing with the digital data stream hierarchical addresses and controlling the means for storing digital data addressed to said receiver in accordance with the hierarchical address preceding such data.

7. An addressable receiver in accordance with claim 1, further comprising means responsive to a flag contained in the digital data for causing the receiver immediately to alter its output signal.

8. An addressable receiver in accordance with claim 7 further comprising means responsive to the flag for combining an audio tone with the receiver output signal.

9. An addressable receiver in accordance with claim 1, further comprising means responsive to interruption of receipt of the composite signal for transmitting a predetermined video output signal;

10. An addressable receiver for receiving a composite video and digital data signal, transmitting video output signals and controlling external devices comprising:
    a. means for processing the composite video and digital data signal into a first video signal, a synchronization signal and a serial digital data stream,
    b. means for processing the digital data stream to recognize within such stream control words,
    c. means for processing the digital data stream to recognize within such stream heirarchical addresses and for storing digital data addressed to said receiver accordance with an heirarchical address proceeding such data,
    d. means for converting stored digital data into a second video signal containing characters, which signal is synchronized with the synchronization signal,
    e. means for receiving a third video signal,
    f. means for processing at least one of the control words into at least one command signal,
    g. means for receiving a second data signal,
    h. means for processing the second data signal into a fourth video signal containing characters,
    i. means for combining the first or third and either or both the second and fourth video signals into an output-available signal,
    j. means responsive to the control words for transmitting, as the receiver output, the synchronization signal, th ecommand signal and the output-available signal,
    k. means responsive to a flag contained in the digital data for overriding said transmitting means responsive to the control words to cause the receiver immediately to alter its output signal, and
    l. means responsive to interruption of receipt of the composite signal for transmitting a predetermined video output signal.

11. An addressable receiver in accordance with claim 10, wherein said means (b), means (c), means (d), means (f), means (j), means (k) and means (l) include a programmable device.

12. An addressable receiver in accordance wiht claims 1 or 10 including at least one programmable device for controlling operation of a portion of the receiver.

13. An addressable receiver in accordance with claim 1, wherein each of said means for processing and for controlling is controlled by at least one programmable device.

14. A communication system comprising a teletext transmitter and a plurality of addressable receivers adapted to receive teletext transmissions from the transmitter, and, responsive to hierarchical addresses contained in such transmissions, process selected portions of such transmissions, in which system the hierarchical addresses define a plurality of hierarchical group levels in addition to the level comprising all the receivers and the level comprising only one receiver, such that receivers in subgroups of a hierarchical group level may be addressed by addressing that group level.

15. A process for retransmitting data messages comprising the steps of simultaneously:
 a. receiving with a first receiver a first transmission containing, in the following order:
  a first control word,
  a first address field,
  a first data message,
  a second control word,
  a second address field,
  a second data message; and
  at least one subsequent control word;
 b. storing the first data message in the first receiver as it is received and retransmitting the first data message with the first receiver upon receipt of at least one of the subsequent control words; and
 c. receiving with a second receiver the first transmission, storing the second data message in the second receiver as it is received and retransmitting the second data message with the second receiver upon receipt of at least one of the subsequent control words.

16. The process according to claim 15 further comprising the steps of:
 a. receiving a second transmission together with the first transmission;
 b. continuously retransmitting the second transmission with each of the receivers; and
 c. upon receipt of a subsequent control word, combining the respective data message retransmitted by each receiver with the retransmitted second transmission.

17. The process according to claim 15 and claim 16, further comprising the steps of:
 a. receiving analog data with at least one of the receivers;
 b. processing the analog data into a third signal within the one receiver; and
 c. upon receipt of one of the subsequent control words by the receiver, combining the third signal with the transmission then being transmitted by the receiver.

18. The process according to claim 15, further comprising the steps of:
 a. receiving with the first receiver the first transmission further comprising a third data message containing a flag; and
 b. immediately retransmitting the third data message from the first receiver responsive to the flag.

19. The process according to claim 17 further comprising the steps of:
 a. receiving with the first receiver the first transmission further comprising a third data message;
 b. storing the third data message in the first receiver as it is received, and
 c. retransmitting the third data message serially with the first data message upon receipt of one of the subsequent control words.

* * * * *